(12) United States Patent
Klinker et al.

(10) Patent No.: US 12,709,389 B2
(45) Date of Patent: Aug. 18, 2026

(54) HYDROFOIL TAKEOFF AND LANDING WITH MULTIPLE HYDROFOILS

(71) Applicant: Regent Craft, Inc., North Kingstown, RI (US)

(72) Inventors: Michael Klinker, North Kingstown, RI (US); Daniel Cottrell, North Kingstown, RI (US); William Bryan Baker, North Kingstown, RI (US); Andrew Gregg, North Kingstown, RI (US); Andrew Levin, North Kingstown, RI (US)

(73) Assignee: Regent Craft Inc., North Kingstown, RI (US)

( * ) Notice: Subject to any disclaimer, the term of this patent is extended or adjusted under 35 U.S.C. 154(b) by 7 days.

(21) Appl. No.: 19/101,870

(22) PCT Filed: Aug. 10, 2023

(86) PCT No.: PCT/US2023/029996
§ 371 (c)(1),
(2) Date: Feb. 6, 2025

(87) PCT Pub. No.: WO2024/035885
PCT Pub. Date: Feb. 15, 2024

(65) Prior Publication Data

US 2026/0042537 A1 Feb. 12, 2026

Related U.S. Application Data

(63) Continuation-in-part of application No. 17/885,463, filed on Aug. 10, 2022, now Pat. No. 12,116,139.
(Continued)

(51) Int. Cl.
*B64C 35/00* (2006.01)
*B63B 1/28* (2006.01)
(Continued)

(52) U.S. Cl.
CPC ............ *B64C 35/006* (2013.01); *B63B 1/286* (2013.01); *B63B 1/30* (2013.01); *B63B 1/26* (2013.01); *B64C 25/54* (2013.01)

(58) Field of Classification Search
CPC ..... B64C 35/006; B64C 35/007; B64C 35/00; B64C 25/52; B63B 1/24; B63B 1/286; B63B 1/26; B63B 1/285
See application file for complete search history.

(56) References Cited

U.S. PATENT DOCUMENTS 1,840,716 A 1/1932 Hitt
1,881,141 A 10/1932 Igor
(Continued)

FOREIGN PATENT DOCUMENTS

GB 1 557 539 A 12/1979
GB 2347909 9/2000
RU 2661277 7/2018

OTHER PUBLICATIONS

International Preliminary Report on Patentability, PCT/2023/029996, Feb. 20, 2024.
(Continued)

*Primary Examiner* — Philip J Bonzell
(74) *Attorney, Agent, or Firm* — Akerman LLP

(57) ABSTRACT

A craft comprises at least one hull, at least one wing configured to generate upwards aero lift as air flows past the at least one wing to facilitate wing-borne flight of the craft, at least one retractable hydrofoil configured to generate upwards hydrofoil lift during a first mode of operation as water flows past the at least one hydrofoil to facilitate hydrofoil-borne movement of the craft through the water, and a control system that comprises data storage having instruction code stored thereon that causes the control system to during a takeoff operation when the craft is accelerating through the water and is supported by the at least one
(Continued)

hydrofoil, control the at least one hydrofoil to generate downwards hydrofoil lift that maintains the at least one hydrofoil submerged at a predetermined hydrofoil depth threshold below the water surface; and when the craft reaches a takeoff condition, cause the least one retractable hydrofoil to release the craft from the water to facilitate wing-borne flight of the craft.

16 Claims, 30 Drawing Sheets

Related U.S. Application Data

(60) Provisional application No. 63/495,852, filed on Apr. 13, 2023, provisional application No. 63/493,575, filed on Mar. 31, 2023, provisional application No. 63/374,596, filed on Sep. 5, 2022.

(51) Int. Cl.

| | |
|---|---|
| ***B63B 1/30*** | (2006.01) |
| *B63B 1/26* | (2006.01) |
| *B64C 25/54* | (2006.01) |

(56) References Cited

U.S. PATENT DOCUMENTS

| | | | |
|---|---|---|---|
| D100,969 | S | 8/1936 | Molyneux |
| 2,214,945 | A | 9/1940 | Weihmiller |
| 2,400,173 | A | 5/1946 | Slate |
| 2,942,810 | A | 6/1960 | Hanning-Lee et al. |
| 3,139,059 | A | 6/1964 | Hanford |
| 3,213,818 | A | 10/1965 | Barkley |
| 3,498,247 | A | 3/1970 | Handler |
| 4,080,922 | A | 3/1978 | Brubaker |
| 4,484,721 | A | 11/1984 | Gue |
| 4,926,773 | A | 5/1990 | Manor |
| 5,018,686 | A | 5/1991 | Zimmer |
| 5,469,801 | A | 11/1995 | Payne |
| 6,547,181 | B1 | 4/2003 | Hoisington |
| 6,732,672 | B2 | 5/2004 | Shin |
| 7,275,493 | B1 | 10/2007 | Brass |
| 7,322,872 | B2 | 1/2008 | Butler |
| 8,651,431 | B1 | 2/2014 | White et al. |
| 9,156,550 | B2 | 10/2015 | Nam |
| 9,688,356 | B2 | 6/2017 | Schulz |
| D843,919 | S | 3/2019 | Tzarnotzky et al. |
| D872,681 | S | 1/2020 | Tzarnotzky et al. |
| D873,200 | S | 1/2020 | Langford et al. |
| D988,226 | S | 6/2023 | Bevirt et al. |
| D988,926 | S | 6/2023 | Prager et al. |
| D996,339 | S | 8/2023 | Moris et al. |
| D1,005,211 | S | 11/2023 | Cummings |
| D1,007,366 | S | 12/2023 | Moris et al. |
| D1,009,697 | S | 1/2024 | Hesselbarth |
| 2007/0245943 | A1 | 10/2007 | Rice |
| 2014/0312177 | A1 | 10/2014 | Gaonjur |
| 2016/0280332 | A1 | 9/2016 | Schulz |
| 2019/0291863 | A1 | 9/2019 | Lyasoff et al. |
| 2022/0250743 | A1 | 8/2022 | Thalheimer et al. |
| 2022/0324560 | A1 | 10/2022 | Klinker et al. |
| 2022/0382300 | A1 | 12/2022 | Larsen et al. |
| 2023/0062717 | A1 | 3/2023 | Thalheimer et al. |
| 2024/0158091 | A1 | 5/2024 | Klinker et al. |

OTHER PUBLICATIONS

International Search Report and Written Opinion, PCT/US2022/015979, May 30, 2022.
International Search Report and Written Opinion, PCT/US2022/040012, Nov. 17, 2022.
Van Beek et al., Progress Report on Aerodynamic Analysis of a Surface Piercing Hydrofoil-Controlled Wing-In-Ground Effect Seabus Configuration, Presentation at RTO Applied Technology Panel Symposium on Fluid Dynamics Problems of Vehicles Operating near or in the Air-Sea Interface, Amsterdam, Oct. 5-8, 1998.
Alcock, Charles, How Electric Propulsion and Blown-wing Technology Have Liberated Aircraft Design, Futureflight, www.ainonline.com/news-article/2022-01-13/how-electric-propulsion-and-blown-wing-technology-have-liberatedaircraft, Jan. 13, 2022.
Non-Final Office Action, U.S. Appl. No. 17/885,463, Apr. 17, 2024.
Non-Final Office Action, U.S. Appl. No. 17/885,523, Jul. 17, 2024.
Non-Final Office Action, U.S. Appl. No. 29/874,061, May 31, 2024.
Notice of Allowance, U.S. Appl. No. 17/570,090, Apr. 1, 2022.
Supplemental Notice of Allowance, U.S. Appl. No. 17/570,090, Jun. 10, 2022.
International Search Report and Written Opinion issued on Nov. 20, 2023 in PCT/US2023/029996 (9 pages).

HULL-BORNE OPERATION

HYDROFOIL-BORNE
MANEUVERING OPERATION 132
134
130

1000

| Procedure | Craft Pitch | | Hydrofoil Control Surfaces | | Hydrofoil Incidence Angle Adjustment | | | |
|---|---|---|---|---|---|---|---|---|
| | Constant Pitch | Increased Pitch | Control Ride Height | Control Extended Hold | Control Ride Height | Control Extended Hold | Control of Release | |
| | | | | | | | Active | Passive |
| A) Fixed Foil, Constant Pitch, No Hold | X | | x | | | | | |
| B) Fixed Foil, Constant Pitch, With Hold | X | | x | x | | | | |
| C) Fixed Foil, Increasing Pitch, With Hold | | x | x | x | | | | |
| D) Variable Foil, Passive Release, Increasing Pitch, With Hold | | x | x | x | x | x | | x |
| E) Variable Foil, Active Release, Increasing Pitch, With Hold | | x | x | x | x | x | x | |

FIG. 10

HYDROFOIL TAKEOFF AND LANDING WITH MULTIPLE HYDROFOILS

CROSS-REFERENCE TO RELATED APPLICATIONS

This application is a U.S. Nat'l Stage Application under 35 U.S.C. § 371 of Patent Cooperation Treaty App. PCT/US2023/029996, titled "Hydrofoil Takeoff and Landing with Mulitple Hydrofoils," filed on Aug. 10, 2023, and currently pending; PCT/US2023/029996 claims priority to (i) U.S. application Ser. No. 17/885,463, titled "Hydrofoil Equipped Seaglider Takeoff." filed Aug. 10, 2022, and issued as U.S. Pat. No. 12,116,139 on Oct. 15, 2024; (ii) U.S. Provisional App. 63/374,596, titled "Hydrofoil Takeoff and Landing with Multiple Hydrofoils," filed Sep. 5, 2022, and now expired; (iii) U.S. Provisional App. 63/493,575, titled "Water Landing of Airborne Craft with Hydrofoil," filed Mar. 31, 2023, and now expired; entitled "Water Landing of Airborne Craft with Hydrofoil," and (iv) U.S. Provisional App. 63/495,852, titled "On Water Inference of Airborne Craft with Hydrofoil," filed Apr. 13, 2023, and now expired. The entire content of the PCT/US2023/029996; 17/885,463; 63/374,596; 63/493,575; and 63/495,852 applications are incorporated herein by reference it its in their entirety.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 10 is a table that summarizes aspects of some procedures that facilitate foil-borne takeoff operations, in accordance with example embodiments.

DETAILED DESCRIPTION

Figure 1A:
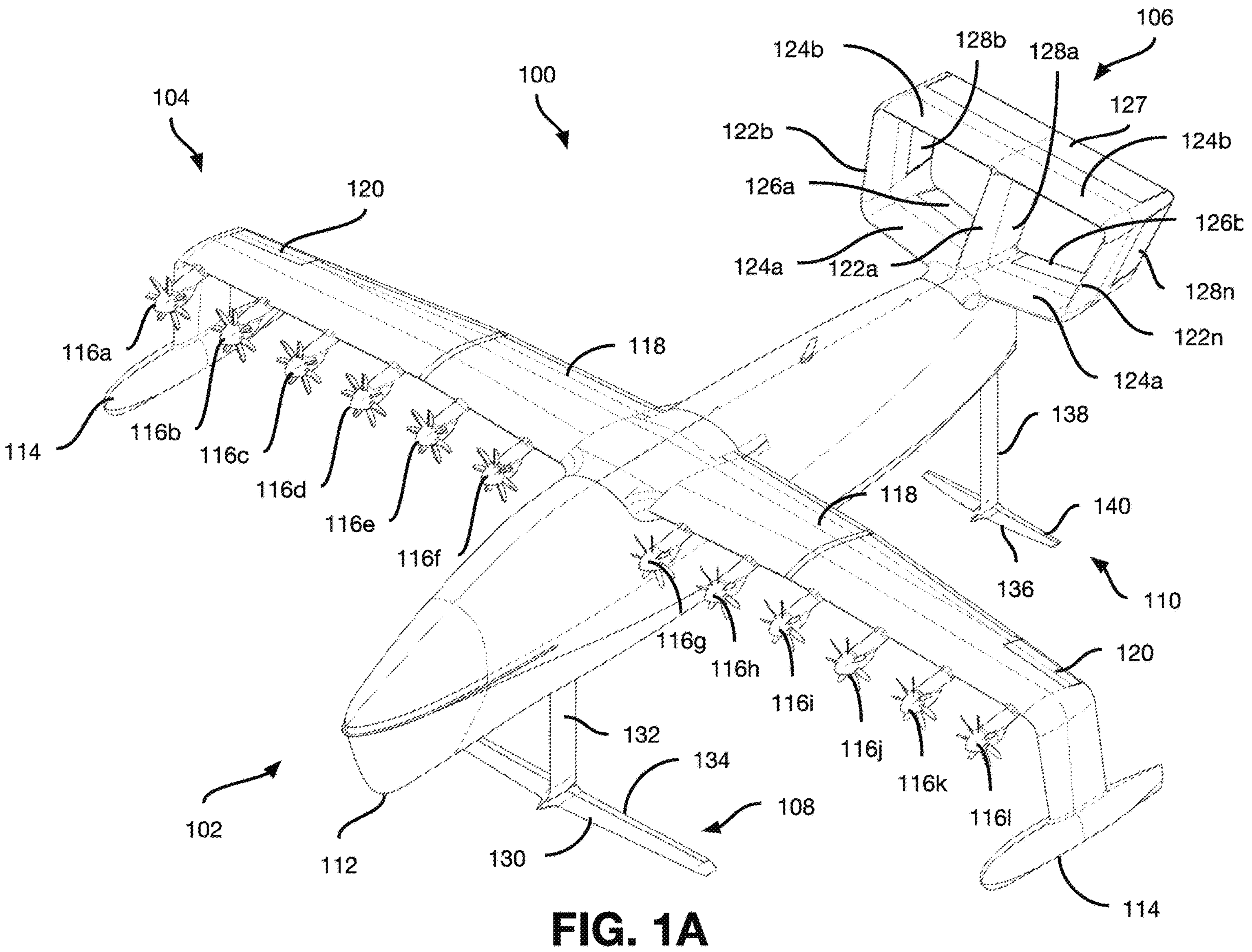
FIGS. 1A-1D illustrate various views of a craft, in accordance with example embodiments.
Figure 1B:
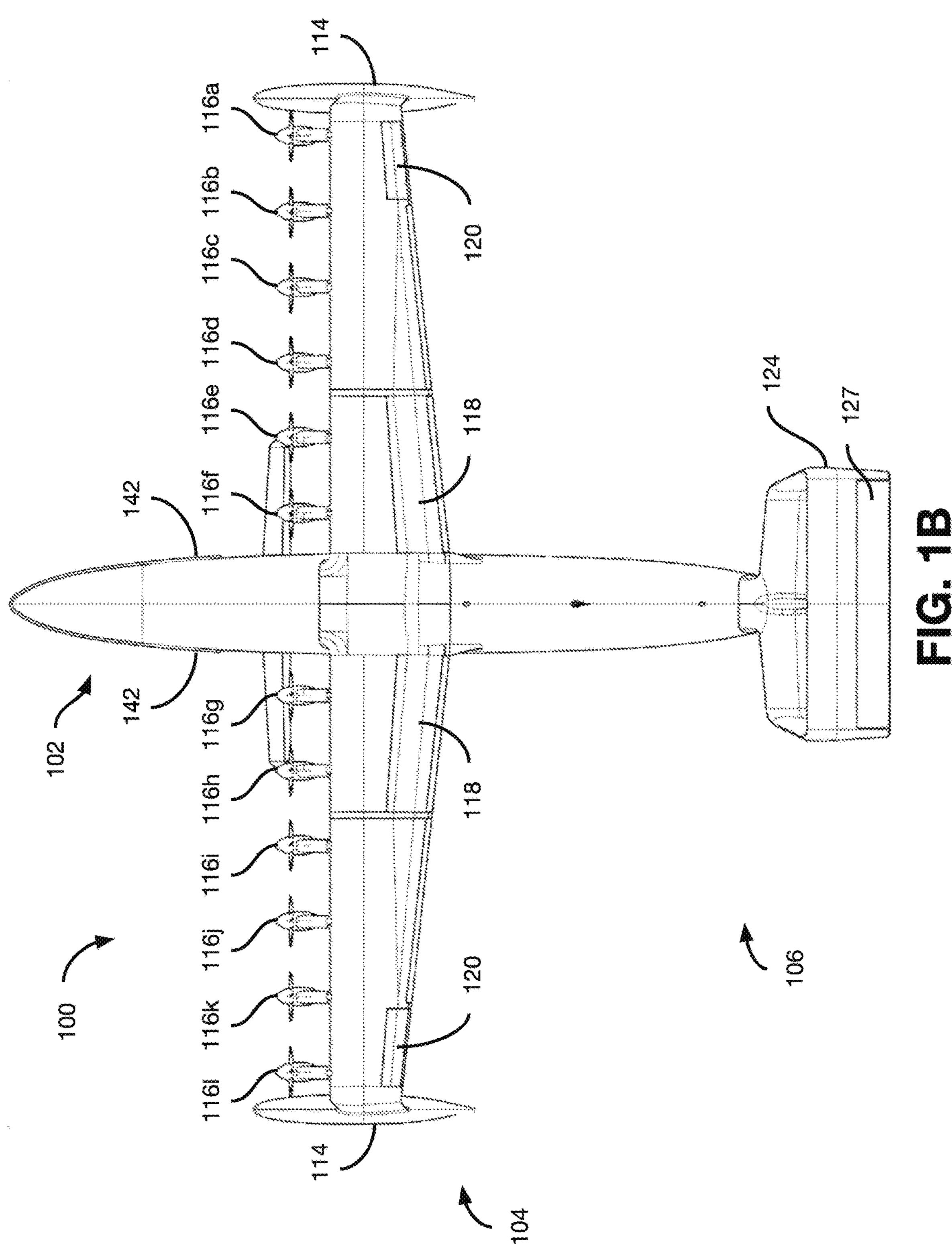
Figure 1C:
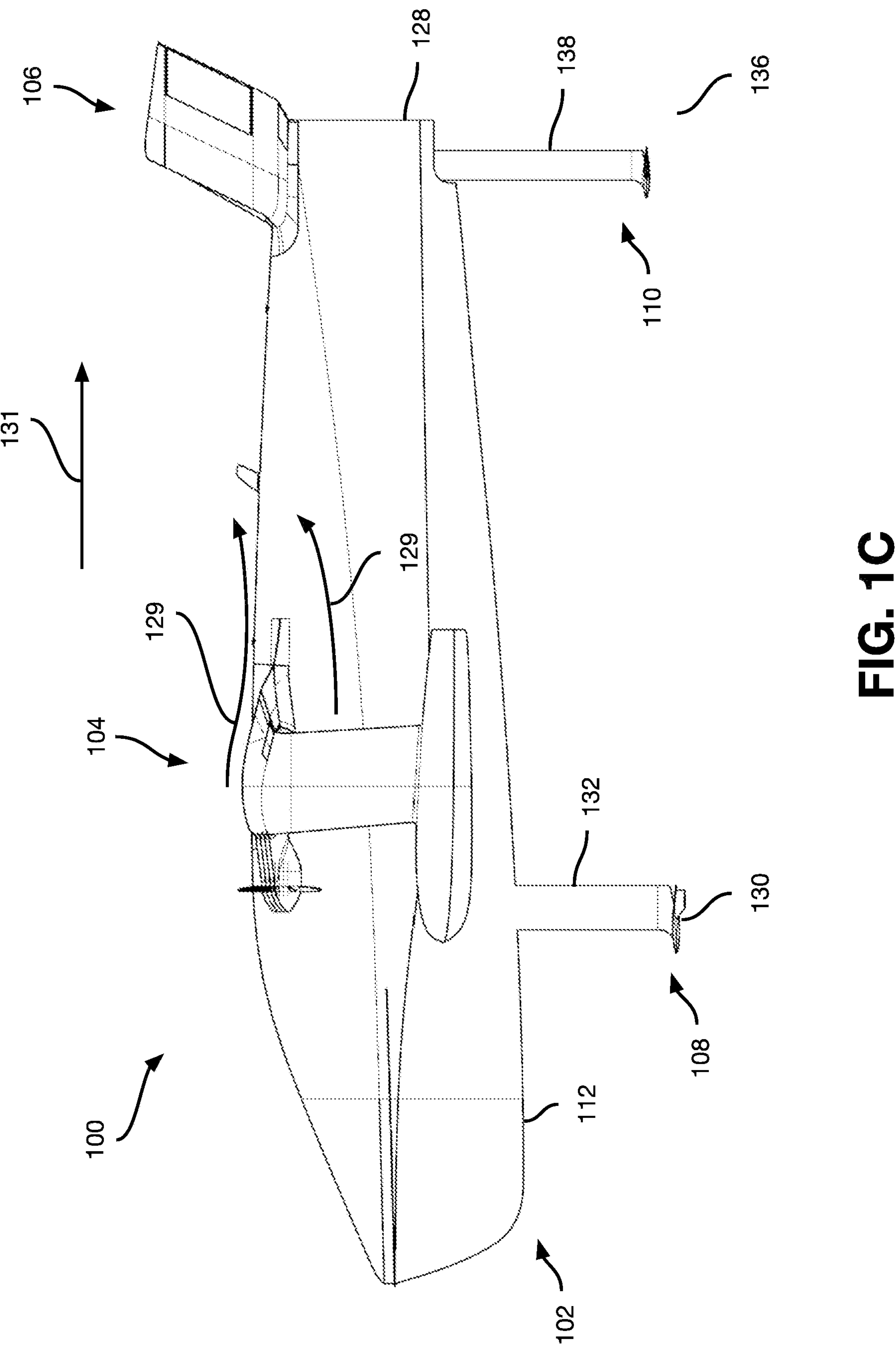

Various examples of systems, devices, and/or methods are described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

I. Introduction

Aspects described herein are generally related to craft, such as aircraft, including craft that are capable of taking off from, and landing on, water. Examples of such craft include crafts having extendible hydrofoils attached to the hull of the craft. For instance, a first (or "rear") hydrofoil may be positioned towards the tail section of the craft, and a second (or "main") hydrofoil may be positioned near the midsection of the craft, forward the first hydrofoil (e.g., proximate to the main wing of the craft). The hydrofoils may be controlled to extend and retract depending on the operating mode of the craft. For example, when airborne, the hydrofoils may be retracted towards the hull, and when waterborne, the hydrofoils may be extended.

In some examples, the craft may additionally or alternatively be wing-in-ground (WIG) effect craft. Such craft fly close to the ground or water surface by using the ground effect principle, where flying close to the surface reduces aerodynamic drag and increases lift. For example, the drag on the craft is reduced when its distance from the ground is within about half the length of the aircraft's wingspan.

A. Challenges

Operating such craft presents a number of challenges, especially when considering some applications, including some commercial applications, of such craft. For example, during takeoff procedures, as the craft increases speed while in hydrofoil-borne operation, the force of the water passing under the hydrofoils causes lift generated by the hydrofoils ($L_F$) to increase, and the force of the air passing under the wings causes lift generated by the wings ($L_W$) to increase. The combination of the hydrofoil lift ($L_F$) and the wing lift ($L_W$) tends to urge the craft up and out of the water as the combined lift ($L_F$+$L_W$) starts to approach and then exceed the total weight of the craft. But when the front hydrofoil leaves the water, the lift generated by the front hydrofoil goes to zero because there is no longer any water passing under the front hydrofoil to generate the upward lift. And when the front hydrofoil leaves the water, if the lift generated by the wing ($L_W$) on its own is not greater than the weight of the craft (or any other such force acting downward on the craft) at that point during the takeoff process, the craft tends to fall back down into the water, thereby disrupting (and in most cases preventing) the craft from successfully transitioning from hydrofoil-borne operation to wing-borne operation and ultimately preventing the craft from taking off while hydro foiling.

Once airborne, flying close to the water (e.g., within ground effect) presents certain challenges. For example, during landing procedures, because the craft flies close to the water there is relatively little flexibility for maneuvering and/or adjustment associated with descending from a cruising altitude to touch down. For instance, the final stage of the landing procedure may allow only relatively little room for banking (compared to, e.g., banking procedures carried out by conventional airplanes that land on typical runways for positioning during landing). This is because some amount of roll may risk a wingtip or pontoon striking the water. As another challenge for WIG craft landing on water, at the point of touch down where the hull (or fuselage) of the craft makes contact with the water, it is desirable to manage/minimize the disruption to protect the craft from damage and to maintain passenger comfort.

Various examples of WIG craft that overcome and/or at least ameliorate these challenges are described below. Some examples of these WIG craft correspond to seagliders and include and implement features disclosed in U.S. patent application Ser. No. 17/570,090, filed Jan. 6, 2022 (herein after '090 application), and U.S. patent application Ser. No. 17/845,480, filed Jun. 21, 2022 (herein after '480 application). The '090 and '480 applications are incorporated herein by reference in their entirety. The '090 application describes, among other things, a seaglider that includes a pair of retractable hydrofoils (e.g., front and rear hydrofoils) that facilitate a hydrofoil-borne operation, described further below. The '480 application describes, among other things, a seaglider that implements a bi-plane tail.

B. Hydrofoil-borne to Airborne Transitioning of Craft

Some examples of these craft are configured to transition through several operating modes when preparing for takeoff. For instance, an example of such a craft operates in a hull-borne mode while near docks or in no-wake zones. While in this mode, the hull of the craft is in the water, and the craft may move at low speeds (e.g., less than 20 mph). The craft next transitions to a hydrofoil-borne mode of operation. While in this mode, the craft is supported by the hydrofoils, and the hull is substantially lifted out of the water. The craft may operate in this mode while traveling through harbors and crowded waterways and may move at increased speeds (e.g., between 20-45 mph). The craft next transitions to a wing-borne mode of operation. While in this mode, the craft is urged out of the water by the lift generated by the wings. The craft may operate in this mode while in open waters and at further increased speeds (e.g., between 45 mph). It should be understood that the example parameters and characteristics (including operating heights and speeds) provided herein are provided for purposes of example and explanation only and should not be taken as limiting.

The hydrofoil-borne mode of operation allows for a wide range of benefits. For instance, operating in hydrofoil-borne mode facilitates a high degree of maneuverability and greater speed while in harbors and crowded waterways. Additionally, the one or more hydrofoils help address the challenges faced by other WIG craft that transition directly from a hull-borne mode to a wing-borne mode of operation. These WIG craft experience significant hull-induced drag while taking off. Such drag is not experienced by the craft disclosed herein because the craft are hydrofoil-borne during takeoff.

An ability for a craft to take off from the hydrofoil-borne mode is desirable for several reasons. For instance, the craft would be expected to be operating in hydrofoil-borne mode prior to initiating a takeoff procedure (e.g., while navigating a crowded harbor). Therefore, transitioning back to the hull-borne mode of operation prior to takeoff could be uncomfortable for passengers. Further, taking off while in the hydrofoil-borne mode of operation minimizes disturbances that would otherwise be felt by passengers due to choppiness/turbulence of the water waves, which can be exacerbated at higher speeds.

Thus, some examples of successful take-off procedures of the craft generally involve, when initially in a hull-borne borne mode of operation, causing the craft to increase speed over water. Once the craft reaches a sufficient speed, the craft enters the hydrofoil-borne mode of operation and continues to accelerate. Once sufficient lift is generated by the wings of the craft (e.g., lift corresponding to the weight of the craft or within some margin thereof), the craft transitions to a wing-borne mode of operation.

In general, to sustain takeoff and accomplish flight, the aero lift, $L_W$, generated by the wings of the craft and/or lift generated by other aspects of the craft such as, for example, tilted rotors that provide vertical thrust, should exceed the weight, $W_{CRAFT}$, of the craft. (See FIG. 7A). A variety of factors impact the magnitude of aero lift, including, for example, the size and shape of the wings of the craft, the angle at which the wings meet the oncoming air (angle of attack or "AOA"), the speed at which the wings move through the air, the density of the air, etc. Of particular importance are those factors that are controllable through the course of a takeoff procedure, e.g., the speed of the craft and the pitch of the craft (corresponding to the AOA of the wings). (Note, while the lift, $L_F$, generated by the hydrofoil can be positive, this lift does not generally contribute to the lift of the craft once in flight because (a) the hydrofoil is no longer in the water and (b) as described further below, the hydrofoil is eventually retracted into (or towards) the craft once the craft is operating in wing-borne mode.)

During takeoff procedures for a conventional land-based craft, the craft gradually increases speed, thereby gradually increasing the aero lift, $L_W$, prior to take-off and flight. Once the craft has achieved sufficient speed, the AOA of the craft is increased, e.g., by pitching the nose of the craft upward. This further contributes to an increase in the aero lift, $L_W$, and eventually causes the craft to take off and maintain flight.

Conceptually, the takeoff procedure of the example craft disclosed herein are similar in some respects. For instance, in one example, the craft gains the speed needed to obtain the required aero lift, $L_W$, while the craft is in the hydrofoil-borne mode of operation (i.e., traveling through water vs over the water). In some examples, additional lift can be generated, for example, using tilted rotors or the like that provide vertical thrust/lift. However, transitioning from the hydrofoil-borne mode of operation to the wing-borne mode of operation is complicated and/or may be interrupted or frustrated due to the effect/force on the craft by the hydrofoil in the water.

As noted above, hydrofoils, like wings, generate an associated lift, $L_F$, due to the force of water passing under the hydrofoils as the craft gains speed. In a normal/standard arrangement, the net lift, $L_{NET}$, is positive. That is, the lift is upward and urges the craft out of the water. In this respect, $L_F$ and $L_W$ normally act in concert to urge the craft out of the water as the craft increases in speed. Some approaches to takeoff might involve attempting to increase the speed of the craft sufficiently while in the hydrofoil-borne mode of operation to eventually take off and gain flight. Moreover, such approaches might involve, at some point during takeoff, increasing the pitch of the craft, leading to increased wing AOA, to assist in increasing $L_W$ (and/or perhaps $L_F$) to contribute to increased lift and achievement of flight.

However, there are several challenges with such approaches. For instance, in testing this approach, applicants found that craft were unable to take flight after the speed of the craft was ramped towards a threshold lift speed at which the combination of $L_W$ and $L_F$ would theoretically exceed the weight of the craft. When the craft reached the threshold lift speed, and the AOA was increased, both the nose of the craft and the hydrofoil rotated upward. However, the positive lift provided by the hydrofoil, $L_F$, became negligible after the hydrofoil breached the surface of the water, and the remaining aero lift, $L_W$, was insufficient to sustain flight as $L_W$ was not equal or greater to the mass of the craft. As a result, once the hydrofoil left the water, the craft came back down into the water, thereby disrupting and/or frustrating and ultimately preventing takeoff from hydrofoil-borne operation to wing-borne operation. In other testing, applicants found that the angle of attack of the craft would abruptly increase. This, in turn, induced a stall condition in the craft, which prevented the craft from sustaining flight.

The example craft disclosed herein address these issues by modifying and improving the takeoff procedures described above to ensure that the aero lift, $L_W$, is sufficiently large prior to the point in the procedure at which the hydrofoils are to be removed from the water to facilitate allowing the craft to become wing-borne.

In some examples, an additional "negative" lift, $L_F$, is introduced via the hydrofoil while the craft is increasing in speed in anticipation of takeoff to "hold" the hydrofoils and, therefore, the craft in the water. As a result, the craft can further increase in speed and generate greater overall aero lift, $L_W$, without causing the craft to take flight and/or pitch up such that the front hydrofoil breaches the surface of the water (possibly leading to the failure described above).

In some examples, at an appropriate time after the "negative" lift, $L_F$, is introduced (e.g., when $L_W$ exceeds or is within some margin of the weight, $W_{CRAFT}$, of the aircraft according to some predetermined threshold), the negative lift, $L_F$, implemented via the hydrofoil can be "released," and the craft can, as a result, proceed to take off and gain sustained flight. These aspects are discussed in more detail below.

In some examples, the "hold" is not released. Rather, as the craft accelerates, the hydrofoil lift, $L_F$, generated by the hydrofoil increases to a maximum amount, which can be a predetermined maximum amount and/or a maximum amount achievable due to the control capabilities of the hydrofoil. Afterwards, as the aero lift, $L_W$, generated by the wings continues to increase, the aero lift, $L_W$, pulls the craft from the water, because the aero lift $L_W$ is greater than the mass of the vehicle prior to takeoff. This can also help prevent an abrupt increase in the AOA of the craft, which can, in some instances, "throw" the craft out of the water and cause the craft to stall, thereby frustrating further takeoff procedures.

To implement aspects of the above-described take-off procedures, some examples of the craft comprise a control system configured to coordinate and control the transition of the craft from waterborne to hydrofoil-borne operation and from hydrofoil-borne to wing-borne operation. For instance, some examples of the control system are configured to cause one or more hydrofoils of the craft to extend and retract as needed (e.g., extend prior to taking off and retract when the craft is wing-borne). Some examples of the control systems are configured to control the actions of various control surfaces of the craft (e.g., flaps, ailerons, elevators, rudders, etc.) to stabilize the craft and control the altitude of the craft when near the water surface, etc.

Some examples of the craft are configured to control the articulation of the one or more hydrofoils and/or the various control surfaces of the one or more hydrofoils which can modify the amount of downwards hydrofoil lift, $L_F$, generated by the one or more hydrofoils when the craft is in hydrofoil-borne mode. For instance, some examples of the hydrofoils comprise one or more flaperons, flaps, ailerons, elevators, etc. The control system is configured to adjust respective deflection angles of one or more of these components to thereby control the downwards hydrofoil lift, $L_F$, generated by the hydrofoils. In some examples, the control system is configured to control the overall angle of attack of one or more of the hydrofoils to thereby control the hydrofoil lift, $L_F$, generated by the hydrofoils.

In some examples, while the craft is hydrofoil-borne, the control system is configured to control one or more of the hydrofoils to generate a downwards hydrofoil lift, $L_F$, that maintains the hydrofoil at least partially submerged in the water after the lift generated by the main wing of the craft reaches a threshold lift, while maintaining the desired ride height on the hydrofoil. In some examples, the threshold lift is greater than or equal to an amount of lift required to be generated by the main wing to allow the craft to transition from hydrofoil-borne movement through the water to wing-borne flight in the air. By controlling the hydrofoil to generate downwards lift that counteracts the upwards aero lift generated by the main wing until the amount of upwards aero lift exceeds the threshold amount of upwards aero lift, the control system prevents the craft from leaving the hydrofoil-borne mode of operation until after the main wing generates enough lift to facilitate the transition of the craft to the wing-borne mode of operation, from which the craft can proceed to gain altitude.

In some examples, the hydrofoil is controlled to generate an actively derived, predetermined, or fixed amount of downwards hydrofoil lift that is sufficient to keep the hydrofoil submerged after the main wing produces sufficient lift to sustain wing-borne flight after the craft leaves the water. For instance, in some examples, the downwards hydrofoil lift generated by the hydrofoil is sufficient to keep the hydrofoil at least within a margin of distance below the surface of the water until after the lift generated by the main wing is sufficient to sustain wing-borne flight. Afterward, the hydrofoil breaches the surface of the water and no longer exhibits any appreciable downwards hydrofoil lift. In some examples, the control system is configured to control the hydrofoil to increase the downwards hydrofoil lift generated by the hydrofoil in proportion to an increase in the lift generated by the main wing.

In some examples, the control system is configured to control the hydrofoil to decrease the downwards hydrofoil lift generated by the hydrofoil after the lift generated by the main wing reaches the threshold lift. For instance, in an example, the downwards hydrofoil lift generated by the hydrofoil is initially selected so that when the lift generated by the main wing reaches the threshold above, the hydrofoil is some distance below the surface of the water. At this point, the control system controls the hydrofoil to decrease or release the downwards hydrofoil lift. This, in turn, causes the craft to rise, bringing the hydrofoil out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

In some examples, as the craft accelerates, the control system is configured to control the hydrofoil to increase the hydrofoil lift, $L_F$, generated by the hydrofoil to a maximum amount, which can be a predetermined maximum amount and/or a maximum amount achievable due to the control capabilities of the hydrofoil. Afterwards, as the aero lift, $L_W$, generated by the wings continues to increase, the hydrofoil is elevated out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

Some examples of the control system are configured to determine the lift generated by the main wing based at least in part on one or more of the speed of the craft, an angle of attack of the main wing, a sensed load force imparted on the hydrofoil, etc.

In some examples, the craft comprises at least one hull, at least one wing, at least one hydrofoil, and a control system. The at least one wing is configured to generate upwards aero lift as air flows past the wing to facilitate wing-borne flight of the craft. The at least one hydrofoil is configured to generate upwards hydrofoil lift during a first mode of operation as water flows past the hydrofoil to facilitate hydrofoil-borne movement of the craft through the water. While the craft is hydrofoil-borne, the control system is configured to determine the upwards aero lift generated by the at least one wing. The control system is further configured to control the at least one hydrofoil to generate downwards hydrofoil lift that maintains the hydrofoil at least partially submerged in the water while the determined upwards aero lift is below a threshold lift.

In some examples, the craft comprises at least one hull, at least one wing, at least one hydrofoil, at least one processor system comprising one or more processors, and tangible, non-transitory computer-readable media. The at least one wing is configured to generate upwards aero lift as air flows past the at least one wing to facilitate wing-borne flight of the craft. The at least one hydrofoil is configured to generate upwards hydrofoil lift during a first mode of operation as water flows past the at least one hydrofoil to facilitate hydrofoil-borne movement of the craft through the water. The tangible, non-transitory computer-readable media comprises program instructions executable by the one or more processors to configure the craft to, among other features, (i) determine the upwards aero lift generated by the at least one wing as the craft accelerates over the water while in hydrofoil-borne operation, (ii) adjust downwards hydrofoil lift generated by the at least one hydrofoil based on the determined upwards aero lift (generated by the at least one wing) to maintain the at least one hydrofoil at least partially submerged in the water, and (iii) after determining that the upwards aero lift is above some predetermined threshold (e.g., in an example, a predetermined threshold that may be selected according to an amount of aero lift that is sufficient to allow the craft to sustain flight), decrease the amount of downwards hydrofoil lift generated by the at least one hydrofoil to allow the hydrofoil to exit the water. In operation, controlling when the hydrofoil exits the water allows the craft to improve control of the transition of the craft from hydrofoil-borne movement through the water to wing-borne movement through the air.

In some examples, a method for operating the craft comprises determining upwards aero lift generated by at least one wing of the craft as the craft accelerates while the craft is operating in a hydrofoil-borne mode over water. The method further comprises adjusting, based on the determined upwards aero lift (generated by the at least one wing), downwards hydrofoil lift generated by at least one hydrofoil of the craft to maintain the at least one hydrofoil at least partially submerged in the water, thereby causing the craft to remain in hydrofoil-borne operation. The method further comprises, after determining that the upwards aero lift is sufficient to allow the craft to sustain flight (or determining that the upwards aero lift generated by the at least one wing is above some threshold amount of upwards aero lift), decreasing the amount of downwards hydrofoil lift generated by the hydrofoil to allow the hydrofoil to exit the water, thereby transitioning the craft from hydrofoil-borne operation to wing-borne operation.

As noted above, in some examples, the downward hydrofoil lift generated by the hydrofoil(s) keeps the craft in hydrofoil-borne operation until the wing lift ($L_W$) is sufficient for the craft to successfully transition from hydrofoil-borne operation to wing-borne operation, i.e., sufficient for the craft to takeoff while hydro foiling. In some instances, if the rear hydrofoil were to remain in the water after the front hydrofoil leaves the water during a takeoff procedure, drag on the rear hydrofoil caused by the movement of the rear hydrofoil through the water may tend to generate a pivot effect that exerts a downward force on the front of the craft. Additionally, any upward hydrofoil lift generated by the rear hydrofoil further contributes to this pivot effect and the corresponding downward force on the front of the craft. As a result, pitching the front of the craft upward and increasing the angle of attack (AOA) to increase lift generated by the wing tends to additionally (and undesirably) increase the downward force on the front of the craft caused by the rear hydrofoil drag and any upward hydrofoil lift generated by the rear hydrofoil. This effect tends to increase the lift force required to transition from hydrofoil-borne operation to wing-borne operation. And if this additional force on the craft is large enough to offset the lift generated by the wing ($L_W$), the front of the craft may fall back down into the water, thereby disrupting (and in most cases preventing) the craft from successfully transitioning from hydrofoil-borne operation to wing-borne operation.

To overcome (or at least ameliorate) aspects of the above-described problem of rear hydrofoil drag (individually or perhaps in combination with upward hydrofoil lift generated by the rear hydrofoil) tending to generate a pivot effect that pulls the front of the craft back down into the water in situations where the rear hydrofoil remains in the water after the front hydrofoil leaves the water while attempting to transition from hydrofoil-borne operation to wing-borne operation, some embodiments additionally include coordinated control of both the front and rear hydrofoils to effectuate transitioning the craft from hydrofoil-borne operation to wing-borne operation. Additionally, coordinated control of both the front and rear hydrofoils can also help overcome or prevent problems arising from scenarios where the rear hydrofoil leaves the water before the front hydrofoil, which can in some instances cause the craft to pivot downward into the water.

In particular, in addition to controlling one or both of the front and/or rear hydrofoils to generate downward hydrofoil lift ($L_F$) as described above, some embodiments also include further controlling the rear hydrofoil in coordination with the front hydrofoil such that downward hydrofoil lift generated by the rear hydrofoil is "released" together with a "release" of downward hydrofoil lift generated by the front hydrofoil during takeoff. Within examples, coordinated "release" of the downward hydrofoil lift generated by the front and rear hydrofoils may be further understood to involve one or both of the front hydrofoil and/or the rear hydrofoil being configured to "push" the rear of the craft up and out of the water to effectuate the transition from hydrofoil-borne operation to wing-borne operation.

For example, some embodiments of craft (including WIG craft) disclosed herein include (i) a hull, (ii) one or more wings configured to generate upward aero lift as air flows past the one or more wings to facilitate wing-borne flight of the craft, (iii) a front hydrofoil connected to the hull via one or more front hydrofoil struts and configured to generate upward hydrofoil lift as water flows past the front hydrofoil to facilitate hydrofoil-borne movement of the craft through the water, (iv) a rear hydrofoil connected to the hull via one or more rear hydrofoil struts and configured to generate upward hydrofoil lift as water flows past the front hydrofoil to facilitate hydrofoil-borne movement of the craft through the water, and (v) a control system configured to facilitate transition of the craft from hydrofoil-borne operation to wing-borne operation.

In some embodiments, functions performed by the control system in connection with facilitating the transition of the craft from hydrofoil-borne operation to wing-borne operation include (i) while the upward aero lift generated by the one or more wings is below a threshold lift, controlling one or both of the front hydrofoil and the rear hydrofoil to generate a downward hydrofoil lift that causes the front hydrofoil and the rear hydrofoil to remain at least partially submerged in the water and (ii) after the upward aero lift generated by the at least one wing has increased above the threshold lift, transitioning the craft from hydrofoil-borne operation to wing-borne operation at least in part by controlling both the front hydrofoil and the rear hydrofoil to decrease the amount of downwards hydrofoil lift generated by each of the front hydrofoil and the rear hydrofoil. Within examples, this can further involve one or both of the front and rear hydrofoil switching from (a) generating downward hydrofoil lift to (b) generating upward hydrofoil lift that pushes the craft up and out of the water.

In some embodiments, transitioning the craft from hydrofoil-borne operation to wing-borne operation further comprises causing the rear hydrofoil and the front hydrofoil to exit from the water at about the same time. Within examples, causing the rear hydrofoil and the front hydrofoil to exit from the water at about the same time may involve configuring and/or controlling the relative height of the front hydrofoil and the rear hydrofoil via the front and rear hydrofoil struts such that upon exiting the water at a certain pitch angle, the rear hydrofoil and the front hydrofoil exit from the water at about the same time.

As previously noted, coordinating the release of the front hydrofoil and the rear hydrofoil from the water can enhance takeoff operations. In some examples, this coordination of the release involves ensuring that both the rear hydrofoil and the front hydrofoil remain submerged within the water until after the craft is ready to take off from the water. In some examples, this involves dynamically adjusting the hydrofoil deployment amounts while the craft is foiling prior to takeoff so that a particular amount (or section) of the hydrofoils is below the water surface. This amount of the hydrofoil that is below the surface of the water is referred to herein as the hydrofoil depth.

In some examples, one or more sensors are utilized to determine the hydrofoil depth. For instance, one or more optical sensors, conductivity sensors, pressure sensors, etc., may be arranged on each hydrofoil to facilitate determining the hydrofoil depth. In some examples, multiple sensors are arranged longitudinally along the rear hydrofoil and the front hydrofoil and have a predetermined spacing therebetween, such as 1 inch, to facilitate determining the hydrofoil depth to the nearest inch. In some examples, one or more sensors that facilitate measuring the strain on the struts of the rear hydrofoil and the front hydrofoil can be used to an extent to estimate the hydrofoil depth. For example, the amount of strain on the hydrofoils may increase from some baseline strain as more of the strut is below the water surface, and the measured change in strain may be used (together with other known condition information such as craft speed) to estimate hydrofoil depth. In some examples, the hydrofoil depth can be inferred based on the geometry of the craft. Such inferring of sections of the craft based on the geometry of the craft is described in later sections.

In some instances, some loss of control authority over the craft may occur if the hydrofoil depth of the rear hydrofoil and/or the front hydrofoil cannot be maintained at a desired hydrofoil depth threshold such that control authority is lost unexpectedly from either hydrofoil. For example, the wave height of the water may be such that the rear hydrofoil and/or the front hydrofoil exits the water from time-to-time when the respective hydrofoil hits a wave trough. The loss of control authority that may occur when either the front or rear hydrofoil exits the water may make it particularly difficult to control the craft and frustrate the transitioning of the craft from being hydrofoil-borne to being airborne. For example, if the rear hydrofoil depth cannot be maintained and the rear hydrofoil exits the water unexpectedly, the craft may pitch down towards the water to an undesirable extent. Accordingly, in some examples, to prevent or at least minimize losing control authority over the craft, if the rear hydrofoil depth cannot be maintained (e.g., the rear hydrofoil is close to or starts coming out of the water) the front hydrofoil depth may be automatically reduced to an extent, perhaps incrementally (e.g., 5% increments), until the rear hydrofoil depth returns back to the desired hydrofoil depth threshold or within a margin thereof. In some examples, if control authority cannot be maintained, the front hydrofoil may be automatically and fully retracted to prevent or at least minimize loss of control over the craft that may occur if the front hydrofoil were to remain in the water as the rear hydrofoil leaves the water. Full retraction of the front hydrofoil may ensure that the rear hydrofoil remains submerged to an extent within the water.

On the other hand, in some examples, such potential loss of control due to pitching is not of the same concern when the front hydrofoil depth cannot be maintained. Therefore, in some examples, if the front hydrofoil depth cannot be maintained (e.g., the front hydrofoil starts coming out of the water) the rear hydrofoil may nevertheless be maintained below the water (either at its original depth or at an adjusted depth) to facilitate exerting a continued degree of control authority over the craft.

C. Airborne to Hydrofoil-borne Transitioning of Craft

As noted above, flying close to the water presents challenges when attempting to land hydrofoil equipped craft. For instance, the final stage of the landing procedure may allow only relatively little room for banking (compared to, e.g., banking procedures carried out by conventional airplanes that land on typical runways for positioning during landing). Landing craft with hydrofoils or extendible hydrofoils on water is known. For example, U.S. Pat. No. 4,080,922 to Brubaker describes a flyable hydrofoil vessel having a retracted foil system that may be deployed during hullborne operations. However, Brubaker does not discuss the additional challenges that may be faced by such craft when landing in the water. For example, if the hydrofoils are not fully retracted within the hull of the craft, the hydrofoils may contact the water before the hull when landing. In such arrangements, the hydrofoils may tend to "skip" off the surface of the water at the point of contact, causing the craft to undesirably bounce off and perhaps splash against the water. In some instances, the hydrofoils may additionally or alternatively "attach" or "grab" the water, creating a pitching moment on the craft about which the hull of the craft may tend to rotate toward and into the water. Further, trailing bubbles may develop behind the hydrofoils, which may cause the craft to sink deeper into the water until the vertical descent into the water is arrested by the craft's buoyancy force. As such, these aspects of foil interaction with the water must be managed during landing.

On the other hand, when foils are deployed and extended into the water, and after the foils have "attached" to the water and started to generate lift, they can then be used to exert a degree of control over the positioning and heading of the craft. Thus, one consideration during landing is balancing the challenges and benefits of foil positioning and deployment throughout the process.

After the craft contacts the water, it is generally desirable to transition the craft to a hydrofoil borne mode operation as soon as practicable to facilitate high speed travel on the water and to promote passenger comfort. The aspects noted above, however, can tend to frustrate this transition. For example, the aspects above may necessitate rapidly decelerating the craft or even bringing the craft to a complete stop before the craft can be sped up again and transitioned to the hydrofoil borne mode of operation. Such maneuvers, however, can be somewhat uncomfortable for passengers. Moreover, bringing the craft to a complete stop may make the craft more susceptible to heaving up and down due to waves, which can also be uncomfortable for passengers.

Various techniques are described herein with respect to hydrofoil-equipped craft to address these and other aspects. Some examples of these craft include a first (or "rear") extendable hydrofoil and a second (or "main") extendable hydrofoil that facilitate hydrofoil-borne movement of the craft through water. These craft include a control system that, either directly or indirectly via other systems of the craft, controls various aspects of the operation of the craft to mitigate the aspects noted above. For instance, while the craft is airborne and traveling between destinations, the control system may receive an indication to land the craft. Prior to receiving the landing indication, the hydrofoils may be in a fully retracted position. Maintaining the hydrofoils in the fully retracted position reduces drag on the craft that may otherwise be present if the hydrofoils were to be extended to an extent. After receiving the landing indication, the control system controls or otherwise causes the craft to descend toward the water. For instance, the control system may initially lower the airspeed of the craft and maintain lift on the craft by selectively lowering the rotation rate of a subset of propellers of the craft in a manner that slows the craft but nonetheless facilitates maintaining lift on the craft. Afterwards, the control system may cause the lift on the craft to be reduced by, in examples, reducing the rotation speed of a different subset of propellers and/or by adjusting the angles of respective control surfaces of the craft to cause the craft to descend. Techniques for adjusting the airspeed of the craft and lift on the craft are further described in U.S. Application No. 63/490,342, filed Mar. 15, 2023, which is incorporated herein by reference in its entirety. For example, the rotational speed of a first group of propellers that produce a wake of air over the ailerons or flaperons along the wing may be maintained to provide control authority over the craft while a second group of propellers that produce a wake of air over different sections of the wing (and therefore provide a lesser degree of control authority) may be reduced to increase drag on the craft. Controlling the rotational speed of the different groups of propellers separately from each other, particularly during a landing procedure, allows for a reduction in the overall airspeed of the craft without a corresponding reduction in control authority over the craft that would otherwise follow from a reduction in propeller rotational speed. For instance, in some examples, after receiving an indication to land the craft, the control system causes the speed of the second group of propellers to decrease, which induces drag. The speed of the first group of propellers is maintained to provide control authority. After the craft reaches a target reduced airspeed, the speed of the first group of propellers may be increased to their original speed. In another example, the rotation rate of the first group of propellers is gradually reduced to allow for gradual adjustments of the control surfaces to compensate for or to minimize any loss of lift, while the speed of the second group of propellers is reduced to a greater degree to facilitate a more rapid decrease in the speed of the craft.

While descending, the control system may cause or ensure that the respective deflection angles of the main and rear hydrofoils are about zero degrees. The control system may directly or indirectly cause the angles of various control surfaces of the craft to be adjusted to set the craft on a desired landing heading and set the roll angle of the craft to be about zero degrees. When crosswinds are present, the control surfaces may be adjusted to perform a de-crabbing maneuver.

As the craft descends, the control system monitors the distance between the craft and the water to determine whether the craft is at or near a threshold proximity of the water at which point the rear hydrofoil is triggered to extend. The threshold proximity may correspond to the point at which the craft just begins to contact the water. In some examples, initial contact with the craft occurs when the rear hydrofoil contacts the water. For example, the craft may be pitched to an extent (e.g., about 2 degrees) to ensure that initial contact occurs at the rear hydrofoil. In this regard, some examples of the craft may include sensors that facilitate determining that the rear hydrofoil has contacted the water. In some examples, the control system is configured to determine the craft (e.g., a particular portion of the craft) has contacted the water based on an observed/sensed distance between particular sections of the craft and the geometry/orientation of the craft. This and other techniques for determining/inferring whether the craft or a section thereof has contacted the water are described in later sections.

In some examples, as the craft descends, and before the craft contacts the water, the control system causes the rear hydrofoil to extend from a first/retracted position to a second/partially extended position in preparation for landing (e.g., to about 25% of its maximum extended length). In some other examples, the extension of the rear hydrofoil occurs after the control system determines that the craft is within a threshold proximity of the water. In some examples, the main hydrofoil is maintained in the retracted position during these procedures. Partial extension of the rear hydrofoil during this stage places the rear hydrofoil meaningfully below the surface of the water before and/or shortly after the hull and/or main hydrofoil contact the water. In some examples, after contact with the water, the extent to which the rear hydrofoil is extended may be further adjusted to an extent. The partial extension of the rear hydrofoil causes the craft to slow while at the same time provides a greater degree of control authority over the craft. As the craft continues to slow down, the pitch of the craft may flatten, and the hull of the craft may contact the water. Once hull-borne, the rear hydrofoil and the main hydrofoil may be fully extended so as to eventually facilitate hydrofoil-borne movement of the craft through the water.

In some examples, the amount by which the rear hydrofoil is extended is dynamically determined based on one or more factors, such as the water speed of the craft, the desired amount of drag on the craft, the desired amount of pitch of the craft, etc. For instance, the rear hydrofoil may be extended relatively more as the water speed of the craft is reduced. The degree to which the rear hydrofoil is extended may be selected to maintain the pitch of the craft below a target pitch (e.g., below 2 degrees) or within a target range (e.g., 0 to 2 degrees).

In some examples, just before the craft reaches the threshold proximity to the water at which the rear hydrofoil is extended, the control system cuts power to the motors of the craft so as to facilitate final descent onto the water. Cutting power to the motors helps prevent or lessen the chances of damage to the motors that might otherwise occur from water spray/splashing exhibited when landing. When power is cut, the craft will lose lift (assuming the craft is maintained at a relatively flat pitch). Therefore, the control system may cause the power to be reduced or cut when the craft is at a relatively close distance from the water (e.g., a threshold distance from the water of about 1 meter) and, in some examples, cause the rotation of the motors to cease. In some examples, the craft may cruise at this distance from the water for a short period (e.g., 5 seconds) before cutting power to the motors. In this regard, the control system may control one or more control surfaces of one or more wings of the craft to maintain the craft at the threshold distance from the water prior to cutting power to the motors of the craft.

In this regard, some examples of craft disclosed herein implement various techniques that facilitate inferring when the craft has contacted the water. These craft include a control system that, either directly or indirectly via other systems of the craft, controls various aspects of the operation of the craft. For instance, after receiving a landing indication, the control system controls or otherwise causes the craft to descend toward the water. As the craft descends, the control system monitors the distance between the craft and the water to determine whether the craft is at or near a threshold distance from the water. After determining that the craft is within the threshold distance, the control system enters a mode in which it uses the sensed altitude and orientation of the craft to infer whether one or more hydrofoils of the craft have made contact with the water. After the control system infers that one or more hydrofoils have made contact with the water, the control system causes the craft to change one or more operational settings of the craft. For instance, the control system may cause the rear hydrofoil to extend from the fully retracted position to a partially extended position or, if the rear hydrofoil is already partially extended, adjust the extension amount to provide additional control authority over the craft. The control system may also control the main hydrofoil to extend to the fully extended position.

In some examples, the control system performs a rigid body translation and displacement calculation on a rigid body model of the craft to infer whether the craft has contacted the water. Some examples of the rigid body model represent the craft in terms of a group of points that are arranged relative to a particular point of the craft (e.g., the center of mass of the craft) and which correspond/represent components of the craft. For example, the body model may include a pair of points for each hydrofoil. The pair of points may represent the position of the tips of the hydrofoils. Other points may represent other components of the craft, such as the front, back, top, and bottom of the hull, the wing tips, etc. In some examples, surfaces that extend to or through these points (e.g., the shape of the lower surface of a hydrofoil) are specified in the rigid body model. In some examples, the surfaces are specified according to a mathematical model. For example, a particular surface may correspond to a planar surface that extends between the points that define the extents of a hydrofoil. Some examples of the surface can be curved and may be defined using various mathematical functions, such as non-uniform rational B-splines (NURBS), Chebyshev polynomials, and polynomial or piecewise continuous polynomial representations of the geometry.

In some examples, the rigid body model is dynamic in that points that represent the components are adjusted based on the configuration of the craft. For example, during hydrofoil retraction operations, the coordinates of the points representing the hydrofoils may be adjusted so that the points representing the hydrofoils are moved closer to the point representing the center of gravity. During hydrofoil extension operations, the coordinates of the points representing the hydrofoils may be adjusted so that the points representing the hydrofoils move further from the point representing the center of gravity. The coordinates of the points representing the hydrofoils may be adjusted relative to each other, and the point representing the center of gravity to reflect the angle of attack (AOA) of the hydrofoils.

In some examples, contact with the water is inferred when any point (or surface) that represents a hydrofoil is determined to be below (or intersects) a plane or other modeled surface that represents the water surface. In this regard, in some examples, the surface of the water is represented according to a mathematical model that estimates the shape of the water surface (e.g., the size, direction, frequency, etc., of waves on water). In some examples, contact between a component (e.g., hydrofoil) and the water is inferred when any point that represents the component is below the plane (or modeled surface) that represents the water surface. In some examples, contact between a component (e.g., hydrofoil) and the water is inferred after all the points that represent the component are below the plane (or modeled surface) that represents the water surface. In some examples, the craft is inferred to have made contact with the water after any one of the hydrofoils has been inferred to have made contact with the water. In some examples, the craft is inferred to have made contact with the water after both of the hydrofoils have been inferred to have made contact with the water.

In some examples, the control system implements a "Digital Twin" model of the craft that receives information that specifies aspects of the environment in which the craft is operating (or expecting to operate) and makes one or more predictions as to how the craft will behave in the environment. For instance, some examples of the model receive information that specifies the craft's heading, altitude, and orientation, information about the wind direction and magnitude, etc. The model then generates predictions of how the craft will behave under such conditions, which in some examples includes indicating how modifying various control surfaces of the craft will change an outcome. In some examples, information used by the control system in inferring whether water contact has occurred is input to the digital twin model. For instance, in some examples, information that characterizes the surface of the water (e.g., size, direction, periodicity, etc., of waves) is input to the digital twin model along with information that specifies the configuration of one or more components of the craft (e.g., rear hydrofoil extension amount, angle of attack, etc.). The digital twin model may use this information to predict, for example, when water contact will occur.

In some examples, aspects of the operation described above are used during takeoff procedures. For instance, the craft may be cruising in the water, the rear hydrofoil and the main hydrofoil may be fully extended, and the hull of the craft may be lifted out of the water by the hydro lift acting on the rear hydrofoil and the main hydrofoil. The operator of the craft may indicate via a cockpit control that take-off should commence. Alternatively, an autopilot system of the craft may generate the indication. After receiving the indication, the control system of the craft may cause the speed of the craft to increase and adjust the AOA of the rear hydrofoil and the main hydrofoil to cause the respective hydrofoils to move toward the surface of the water. A rigid body model transformation matrix that specifies the sensed altitude and orientation of the craft may be applied to a rigid body model of the craft to infer that components such as the hydrofoils are no longer in contact with the water. After the craft is inferred to no longer be in contact with the water, the craft is transitioned to a wing-borne mode of operation. For example, the control system may cause the rear hydrofoil and the main hydrofoil to fully retract. The control system may cause the motor speed to increase and may control the angles of one or more control surfaces of the craft to change so that the craft will gain altitude.

Some examples of WIG craft that are configured to take off from water are described herein. These craft include retractable hydrofoils that are extended during takeoff to generate additional upward lift as the craft approaches take-off speeds. The upward lift raises the hull of the craft above the water. This action i) reduces the wetted surface area of the craft and therefore drag on the craft and ii) allows the craft to cruise through rough waters during takeoff without colliding with waves. Once airborne, the hydrofoils may be retracted. Some examples of these craft include and implement features disclosed in U.S. patent application Ser. No. 17/570,090, filed Jan. 6, 2022 (herein after '090 application), and U.S. patent application Ser. No. 17/845,480, filed Jun. 21, 2022 (herein after '480 application). The '090 and '480 applications are incorporated herein by reference in their entirety. The '090 application describes, among other things, a seaglider that includes a pair of retractable hydrofoils (e.g., main and rear hydrofoils) that facilitate hydrofoil-borne operation of the craft. The '480 application describes, among other things, a seaglider that implements a bi-plane tail.

Other examples of craft to which the aspects described herein can be applied correspond to blown wing craft. In these craft, air is blown over the wings of the craft by propellers, and the blowing of the air over the wings contributes meaningfully to the overall lift acting on the craft. Examples of these craft can include 4, 5, 6, or even more propellers on each wing. Some examples of the WIG craft described herein are blown wing craft. Some of these craft include six propellers on each wing, making these craft better suited for commercial travel.

These and other aspects are discussed in more detail in the passages that follow.

II. Example Wing-In-Ground Effect Vehicles

FIGS. 1A-1D illustrate different views of an example of a craft 100. As shown, some examples of the craft 100 include a hull 102, a main wing 104, a tail 106, a main hydrofoil assembly 108, and a rear hydrofoil assembly 110.

D. Hull

Some examples of the craft 100 operate in a first water-borne mode for an extended period of time, during which the hull 102 is at least partially submerged in water. As such, some examples of the hull 102 are configured to be watertight, particularly for surfaces of the hull that contact the water during this first waterborne operational mode. Further, some examples of the hull 102, as well as the entirety of the craft 100, are configured to be passively stable on all axes when floating in water. To help achieve this, some examples of the hull 102 include a keel (or centerline) 112, which provides improved stability and other benefits described below. Some examples of the craft 100 include various mechanisms for adjusting the center of mass of the craft 100 so that the center of mass aligns with the center of buoyancy of the craft 100. For instance, in some examples, a battery system (described in further detail below in connection with FIG. 4) of the craft 100 is electrically coupled to one or more moveable mounts. Some examples of the mounts are moved by one or more servo motors or the like. In some examples, a control system of the craft 100 is configured to detect a change in its center of buoyancy, for instance, by detecting a rotational change via an onboard gyroscope, and responsively operate the servo motors to move the battery system until the gyroscope indicates that the craft 100 has stabilized. Some examples of the craft 100 include a ballast system for pumping water or air to various tanks distributed throughout the hull 102 of the craft 100. The ballast system facilitates adjusting the center of mass of the craft 100 so that the center of mass aligns with the center of buoyancy of the craft 100. Other example systems may be used to control the center of mass of the craft 100 as well.

Additionally, or alternatively, some examples of the hull 102 are configured to reduce drag forces when both waterborne and wing-borne. For instance, some examples of the hull 102 have a high length-to-beam ratio (e.g., greater than or equal to 8), which facilitates reducing hydrodynamic drag forces when the craft 100 is under forward waterborne motion. Some examples of the keel 112 are curved or rockered to improve maneuverability when waterborne. Further, some examples of the hull 102 are configured to pierce the surface of waves (e.g., to increase passenger and crew comfort) by including a narrow, low-buoyancy bow portion of the hull 102.

E. Wing and Distributed Propulsion System

As shown in FIGS. 1A-1D, some examples of the main wing 104 include an outrigger 114 at each end of the main wing 104. The outriggers 114 (which are sometimes referred to as "wing-tip pontoons") are configured to provide a buoyant force to the main wing 104 when submerged or when otherwise in contact with the water, which improves the stability of the craft 100 during waterborne operation. Some examples of the outriggers 114 may also include integrated pumps (e.g., propeller pumps) that facilitate providing thrust in some scenarios, as described in more detail below.

Figure 1D:
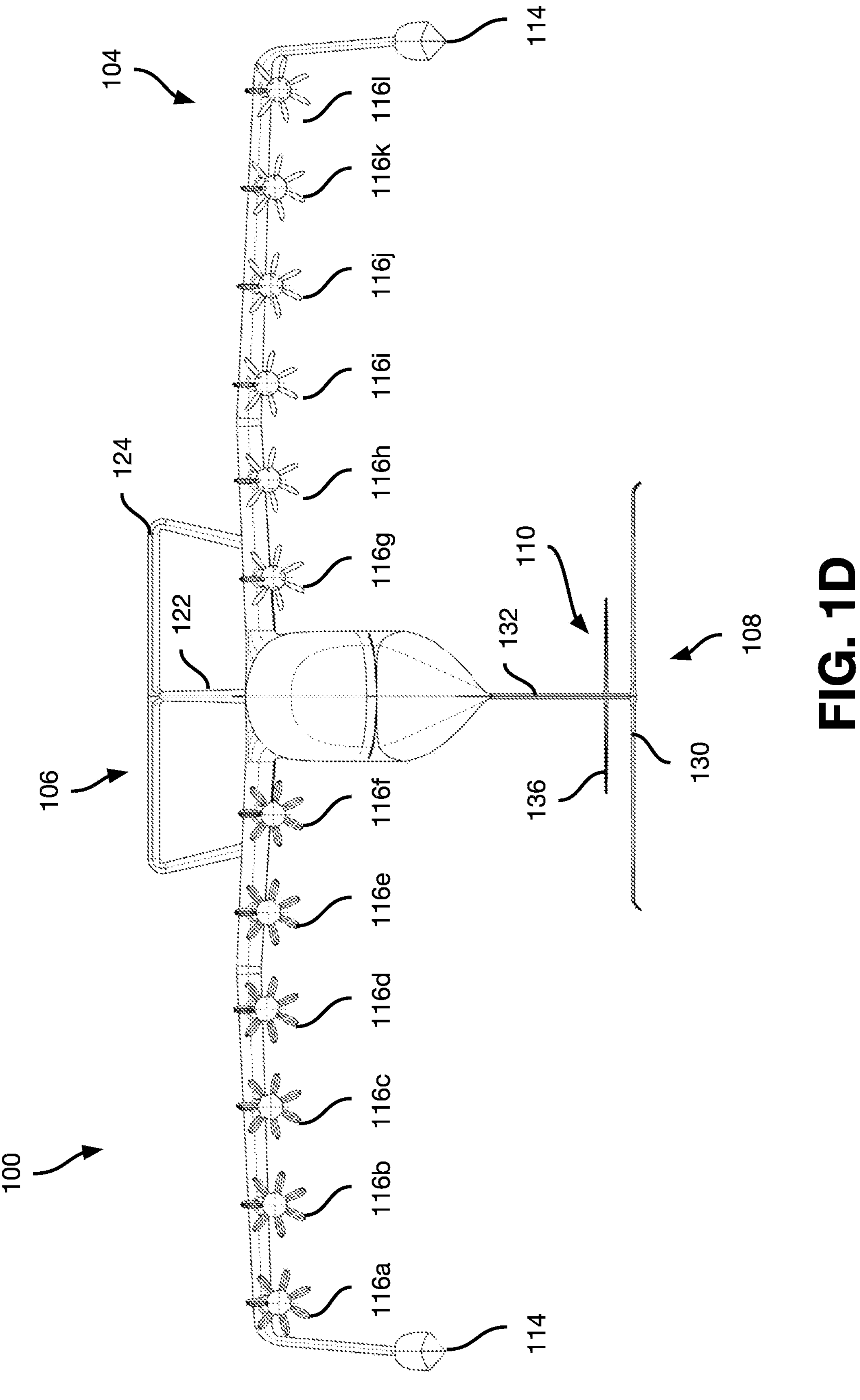

As shown in FIG. 1D, some examples of the main wing 104 have a gull-wing shape such that the outriggers 114 at the ends of the main wing 104 are at the lowest point of the main wing 104 and are positioned approximately level with (or slightly above) a waterline of the hull 102 when the hull 102 is waterborne.

Some examples of the main wing 104 have a high aspect ratio, which is defined as the ratio of the span of the main wing 104 to the mean chord of the main wing 104. In some examples, the aspect ratio of the main wing 104 is greater than or equal to five, or greater than or equal to six, but other example aspect ratios are possible as well. Such wings tend to have reduced pitch stability and maneuverability due to lower roll angular acceleration. These issues are ameliorated by various mechanisms described below. On the other hand, such wings tend to have increased roll stability and increased efficiency resulting from higher lift-to-drag ratios. Further, high aspect ratio wings provide a longer leading edge for the mounting of a distributed propulsion system along the wing.

As shown in the figures, some examples of the main wing 104 include a number of electric motor propeller assemblies 116 distributed across a leading edge of the main wing 104. This arrangement corresponds to a blown-wing propulsion system. Arranging the propeller assemblies 116 in this manner increases the speed of air moving over the main wing 104, which increases the lift generated by the main wing 104. This increase in lift allows the craft 100 to take off and become wing-borne at slower vehicle speeds. This facilitates, for example, taking off on water which can be difficult at higher speeds due to the various forces that would otherwise act on the craft 100.

The electric motor propeller assemblies 116 tend to be much lighter, less complex, and smaller than the liquid-fueled engines used on conventional craft. Some examples of the electric motor propeller assemblies 116 are controlled by an electronic speed controller and powered by an onboard battery system (e.g., a lithium-ion system, magnesium-ion system, lithium-sulfur system, etc.). Some examples of the electric motor propeller assemblies 116 are controlled by a fuel cell or a centralized liquid-fueled electricity generator. In some examples, the onboard electrical supply system includes multiple systems for supplying power during different operational modes, such as a first battery system configured to deliver large amounts of power during takeoff and a second system with a higher energy density but lower peak power capability for delivering sustained lower power during cruise operation (e.g., during hydrofoil waterborne operation or during wing-borne operation, each of which are described in further detail below).

In some examples, the positioning of the electric motor propeller assemblies 116 along the leading edge of the main wing 104 is determined based on a variety of factors including, but not limited to, (i) the required total thrust for all modes of operation of the craft 100, (ii) the thrust generated by each individual propeller of the propeller assemblies 116, (iii) the radius of each propeller in the respective propeller assemblies 116, (iv) the required tip clearance between each propeller and the surface of the water, and (v) the additional freestream speed over the main wing 104 required for operation.

As shown in the figures, in some examples, the number of propeller assemblies 116 is symmetrical across both sides of the hull 102. In some examples, the propeller assemblies 116 are identical. In some examples, the propeller assemblies 116 have different propeller radii or blade configurations along the span so long as the configuration is symmetrical across the hull 102. The different radii facilitate adequate propeller tip clearance from the water or vehicle structure. In some examples, the different propellers are optimized for different operational conditions, such as wing-borne cruise. The propeller placement and configuration may vary to increase the airflow over the main wing 104 or tail system 106 to improve controllability or stability. While eight total propeller assemblies 116 are illustrated, the actual number of propeller assemblies 116 can vary based on the requirements of the craft 100.

In some examples, the propeller assemblies 116 have different pitch settings or variable pitch capabilities based on their position on the main wing 104. For instance, in some examples, a subset of the propeller assemblies 116 have fixed-pitch propellers sized for cruise speeds, while the remainder of the propeller assemblies 116 have fixed-pitch propellers configured for takeoff or can allow for varying the propeller's pitch.

In some examples, different propeller assemblies 116 are turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the craft 100, allowing the craft 100 to turn without large bank angles and increasing the turning maneuverability of the craft 100. For instance, in order to yaw right, the craft 100 may increase the rotational speeds of the propellers of one or more of propeller assemblies 116*g-l* while decreasing the rotational speeds of the propellers of one or more of propeller assemblies 116*a-f*. Similarly, to yaw left, the craft 100 may increase the rotational speeds of the propellers of one or more of propeller assemblies 116*a-f* while decreasing the rotational speeds of the propellers of one or more of propeller assemblies 116*g*-1.

Similarly varying rotational speeds or propeller pitches may be used to yaw or roll the aircraft in flight or while foiling due to varied forces and lift distributions imposed over the wing and its control surfaces or in general used to tailor the lift distribution across the wing for optimized efficiency.

In some examples, the propeller assemblies may tilt to vector thrust either to provide directly more vertical lift or to change how the wing is blown depending on the mode of operation so as to tailor the blown lift distribution.

Some examples of the main wing 104 include one or more aerodynamic control surfaces, such as flaps 118 and ailerons 120. Some examples of these controls comprise movable hinged surfaces on the trailing or leading edges of the main wing 104 for changing the aerodynamic shape of the main wing 104. Some examples of the flaps 118 are configured to extend downward below the main wing 104 to reduce stall speed and create additional lift at low airspeeds, while some examples of the ailerons 120 are configured to extend upward above the main wing 104 to decrease lift on one side of the main wing 104 and induce a roll moment in the craft 100. In some examples, the ailerons 120 are additionally configured to extend downward below the main wing 104 in a flaperon configuration to help the flaps 118 generate additional lift on the main wing 104, which, in some examples, is used to either create a rolling moment or additional balanced lift depending on coordinated movement of both ailerons. Some examples of the flaps 118 and ailerons 120 include one or more actuators for raising and lowering the flaps 118 and ailerons 120. Within examples, the flaps 118 include one or more of plain flaps, split flaps, slotted flaps, Fowler flaps, slotted Fowler flaps, Gouge flaps, Junkers flaps, or Zap flaps. Further, in some examples, the flaps 118 (and the ailerons 120 when configured as flaperons) are positioned to be in the wake of one or more of the propeller assemblies 116. In some examples, the ailerons 120 are positioned so that they are in the wake of one or more of the propeller assemblies 116 to increase the effectiveness of the ailerons at low forward velocities. Some of the propeller assemblies 116 are positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

F. Tail System

As illustrated in FIGS. 1A-1D, some examples of the tail 106 include a vertical stabilizer 122, a horizontal stabilizer 124, and one or more control surfaces, such as elevators 126. Similar to the flaps 118 and ailerons 120, some examples of the elevators 126 comprise movable hinged surfaces on the trailing or leading edges of the horizontal stabilizer 124 for changing the aerodynamic shape of the horizontal stabilizer 124 to control a pitch of the craft 100. Some examples of the horizontal stabilizer 124 are combined with the elevator 126, creating a fully articulating horizontal stabilizer (e.g., a stabilator). Raising the elevator 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. Some examples of the elevators 126 include actuators, which are operated by a control system of the craft 100 to raise and lower the elevators 126.

As illustrated in FIGS. 1A-1D, some examples of tail 106 include a rudder 128. Some examples of the rudder 128 comprise a movable hinged surface on the trailing edge of the vertical stabilizer 122 for changing the aerodynamic shape of the vertical stabilizer 122 to control the yaw of the craft 100 when operating in an airborne mode. In some examples, the rudder 128 additionally changes a hydrodynamic shape of the hull 102 to control the yaw of the craft 100 when operating in a waterborne mode. To facilitate such hydrodynamic control, in some examples, the rudder 128 is positioned low enough on the tail 106 that the rudder 128 is partially or entirely submerged when the hull 102 is floating in water. For instance, the rudder 128 is positioned partially or entirely below the waterline of the hull 102. Some examples of the rudder 128 include one or more actuators, which are operated by a control system of the craft 100 to rotate the hinged surface of the rudder 128 to the left or right of the vertical stabilizer 122. Actuating the rudder 128 to the left (relative to the direction of travel) causes the craft 100 to yaw left. Actuating the rudder 128 to the right (relative to the direction of travel) causes the craft 100 to yaw right. As such, the rudder 128 may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

Some examples of the tail 106 include one or more vertical stabilizers 122*a*, 122*b*, 122*n*, one or more horizontal stabilizers 124*a*, 124*b*, one or more control surfaces, such as elevators 126, and one or more tail flaps 127 for enhanced pitch control configured to exert enhanced net downward force on the tail system. It should be understood that although the figures show only two horizontal stabilizers, it is contemplated that more than two of each can be used within the scope of the present teachings. In some applications, it has been found that the transition from waterborne operation to airborne or wing-borne operation can require a larger pitching moment to overcome the larger drag forces existing between the hull 102 and/or the hydrofoil assemblies 108, 110 and the water. This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the craft 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124*a* and a second horizontal stabilizer 124*b*. It should be understood that one or more additional horizontal stabilizers can be used.

In some examples, a first horizontal stabilizer 124*a* is a lower horizontal stabilizer relative to a second horizontal stabilizer 124*b*. However, it should be appreciated that the horizontal stabilizers in some examples can be interchanged for performance purposes (e.g., the disclosed structure of the first horizontal stabilizer 124*a* can be incorporated in the upper horizontal stabilizer and the disclosed structure of the second horizontal stabilizer 124*b* can be incorporated in the lower horizontal stabilizer). In some non-limiting examples, the structure, shape, and/or performance of each horizontal stabilizer can be tailored as desired such that the lower horizontal stabilizer (in this example, the first horizontal stabilizer 124*a*) is more likely to experience aerodynamic effect from being in the wake of the blown-wing propulsion system disclosed herein or associated wake produced by alternative propulsion systems. In this way, greater aerodynamic control and/or downwards lift can be generated during desired phases of operation.

Some examples of the horizontal stabilizers 124*a*, 124*b* include one or more aerodynamic control surfaces, such as tail flaps 127 and elevators 126, which may comprise movable hinged surfaces on the trailing or leading edges of the horizontal stabilizer 124*a*, 124*b* for changing the aerodynamic shape of the respective horizontal stabilizer 124*a*, 124*b*. It should be recognized that at least one of the horizontal stabilizers 124*a*, 124*b* can be sized, shaped, and/or spaced relative to a second of the horizontal stabilizers 124*a*, 124*b* to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124*a*, 124*b* can be actuated in an opposing direction. In some embodiments, at least one of the horizontal stabilizers 124*a*, 124*b* can define a ratio of a surface area of the first horizontal stabilizer to a surface area of the second horizontal stabilizer in the range of 0.9 to 1.6. In some non-limiting example configurations, the surface area of the first horizontal stabilizer is 5.7 m2, the surface area of the second horizontal stabilizer is 3.9 m2, both have a chord of about 1 m and a vertical separation of 1.8 m. In some embodiments, a vertical separation distance between the first horizontal stabilizer and the second horizontal stabilizer is in the range of 0.25 to 0.75 of the lower horizontal stabilizer span. In some examples, a vertical separation distance can be dependent on the required rudder authority and thus elevator size (driven by, e.g., yaw stability, or the need to counteract asymmetric thrust following powerplant failure). In some examples, a sweep offset moves the center of pressure further aft from the center of gravity, thus allowing the airfoil of the horizontal stabilizer to have less surface area overall, thus being smaller and lighter. In some examples, a dihedral in the bottom surface of the horizontal stabilizer adds stability. In some examples, the box tail design itself increases the efficiency due to the elimination of wingtip vortices of a typical tail. In some embodiments, a lower horizontal stabilizer may have approximately a 15% thickness-to-chord ratio to support the weight of the upper components, whereas the vertical and upper surfaces may be thinner, such as, for example, 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128*a*, 128*b*, 128*n* can change the pressure distribution across the elevator 126, for example, commanding a left 5 degree deflection in the left vertical control surface may move the mean pressure distribution left/right by a percentage of the elevator width.

Some examples of the tail flaps 127 are configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at Ih the horizontal stabilizer 124 becomes aerodynamically effective by creating additional net downward force at low airspeeds to aid in exerting a nose-up pitching moment of the craft 100. The elevators 126 may be configured for changing the aerodynamic shape of the horizontal stabilizer 124 to further control or vary a pitch of the craft 100.

In some examples operations, the tail flaps 127 are deployed for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed for other phases of operation, such as hull-borne mode, to reduce downforce on the tail system and reduce drag.

In some examples, the elevators 126 are additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122*a*, 122*b*, 122*n*, which can reduce complex hinge systems or external arms, thereby reducing wetted area and excrescences drag), an electric servo motor mounting within the vertical stabilizers 122*a*, 122*b*, 122*n* and/or horizontal stabilizers 124*a*, 124*b*, and/or a central vertical strut system generally mounted in the hull 102 or the fuselage of the craft 100 (to provide the potential for reduced cross-sectional area and associated drag).

Further, in some examples, the elevators 126 and/or the tail flaps 127 are positioned so that they are in the wake 129 of one or more of the propeller assemblies 116 of main wing

104. The elevators 126 and/or the tail flaps 127 may be positioned so that they are in the wake 129 of one or more of the propeller assemblies 116 to increase the effectiveness of the elevators at low forward velocities. In some examples, the propeller assemblies 116 are positioned so that no elevators 126 and/or tail flaps 127 are in the wake 129 to ensure consistent and/or predictable aerodynamic forces, independent of power application, are exerted during critical operational phases. In some examples, the propeller assemblies 116 are positioned so that the elevators 126 are in their wake 129 and the tail flaps 127 are not in the wake 129 (e.g., above the wake 129) and are exposed to clean air 131. It should be understood that positioning of the tail flaps 127 in the second horizontal stabilizer 124*b*, or at a distance above the center of gravity of the craft 100, will have the added unexpected benefit of creating additional nose-up pitching moment as a result of induced drag acting about the center of gravity causing the craft 100 to pitch upward.

Similar to the flaps 118 and the ailerons 120 of the main wing 104, some examples of the elevators 126 comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 in order to raise and lower the elevators 126.

In some examples, the tail 106 includes one or more rudders 128*a*, 128*b*, 128*n*. The rudders 128*a*, 128*b*, 128*n* may each comprise a movable hinged surface on the trailing edge of the corresponding vertical stabilizers 122*a*, 122*b*, 122*n* for changing the aerodynamic shape of the vertical stabilizer 122 to control the yaw of the craft 100 when operating in an airborne mode. It should be understood that rudders 128*a*, 128*b*, 128*n* can operate independently or in combination as desired. Moreover, in some examples, rudders 128*a*, 128*b*, 128*n* can be used as redundant systems, particularly useful in the event of one or more failures.

In some examples, the rudders 128*a*, 128*b*, 128*n* additionally change a hydrodynamic shape of the hull 102 to control the yaw of the craft 100 when operating in a waterborne mode. In order to facilitate such hydrodynamic control, the rudders 128*a*, 128*b*, 128*n* may be positioned low enough on the tail 106 that one or more of the rudders 128*a*, 128*b*, 128*n* is partially or entirely submerged when the hull 102 is floating in water. Namely, the rudders 128*a*, 128*b*, 128*n* may be positioned partially or entirely below a waterline of the hull 102. The rudders 128*a*, 128*b*, 128*n* may include one or more actuators, which may be operated by a control system of the craft 100 in order to rotate the hinged surface of the rudders 128*a*, 128*b*, 128*n* to the left or right of the vertical stabilizer 122. Actuating the rudders 128*a*, 128*b*, 128*n* to the left (relative to the direction of travel) causes the craft 100 to yaw left. Actuating the rudders 128*a*, 128*b*, 128*n* to the right (relative to the direction of travel) causes the craft 100 to yaw right. As such, the rudders 128*a*, 128*b*, 128*n* may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

It should be understood that the fundamental shape of tail 106, having one or more vertical stabilizers 122*a*, 122*b*, 122*n* and one or more horizontal stabilizers 124*a*, 124*b*, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

Some examples of the craft 100 include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the craft 100 at lower travel speeds. When determining the number and size of propeller assemblies to include on the tail 106, one may apply the same factors described above when determining the number and size of propeller assemblies to include on the main wing 104.

G. Hydrofoil Systems

As noted above, some examples of the craft 100 include a main hydrofoil assembly 108 and a rear hydrofoil assembly 110. In some examples, the main hydrofoil assembly 108 is positioned proximate to the middle or bow of the craft 100, and the rear hydrofoil assembly 110 is positioned proximate to the stern. For instance, some examples of the main hydrofoil assembly 108 is positioned between the bow and a midpoint (between the bow and stern) of the craft 100, and some examples of the rear hydrofoil assembly 110 is positioned below the tail 106 of the craft 100.

The main hydrofoil assembly 108 and the rear hydrofoil assembly 110 are configured to facilitate the breaking of contact between the hull of the craft and the water surface during takeoff, which, as noted above, can otherwise be challenging in some conventional craft designs. Some examples of the main hydrofoil assembly 108 and the rear hydrofoil assembly 110 are configured to be retractable, large enough to lift the entire craft out of the water and not impact the water surface, and to enable sustained operation in the hydrofoil-borne mode (where the entire weight of the craft is supported by the one or more hydrofoil assemblies).

Some examples of the main hydrofoil assembly 108 include a main hydrofoil 130, one or more main hydrofoil struts 132 that couple the main hydrofoil 130 to the hull 102, and one or more main hydrofoil control surfaces 134. Similarly, some examples of the rear hydrofoil assembly 110 include a rear hydrofoil 136, one or more rear hydrofoil struts 138 that couple the rear hydrofoil 136 to the hull 102, and one or more rear hydrofoil control surfaces 140.

Some examples of the main hydrofoil 130 and the rear hydrofoil 136 take the form of one or more hydrodynamic lifting surfaces (also referred to as "foils") configured to be operated partially or entirely submerged underwater while the hull 102 of the craft 100 remains above and clear of the water's surface. In operation, as the craft 100 moves through water with the main hydrofoil 130 and the rear hydrofoil 136 submerged, the hydrofoils generate a lifting force that causes the hull 102 to rise above the surface of the water. In general, the lifting force generated by the hydrofoils must be at least equal to the weight of the craft 100 to cause the hull 102 to rise above the surface of the water. The lifting force of the hydrofoils depends on the speed and angle of attack at which the hydrofoils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main hydrofoil struts 132 that couple the main hydrofoil 130 to the hull 102 and the length of the one or more rear hydrofoil struts 138 that couple the rear hydrofoil 136 to the hull 102. In some examples, the main hydrofoil strut 132 and the rear hydrofoil strut 138 are long enough to lift the hull 102 at least five feet above the surface of the water during hydrofoil-borne operation, which facilitates operation in substantially choppy waters. Struts of other lengths may be used as well. For instance, in some examples, longer struts that allow for better wave-isolation of the hull 102 (but at the expense of the stability of the craft 100 and increasing complexity of the retraction system) are utilized.

In practice, hydrofoils have a limited top speed before cavitation occurs, which results in vapor bubbles forming and imploding on the surface of the hydrofoil. Cavitation not only may cause damage to a hydrofoil but also significantly reduces the amount of lift generated by the hydrofoil and increases drag. Therefore, it is desirable to reduce the onset of cavitation by designing the main hydrofoil 130 and the rear hydrofoil 136 in a way that allows the hydrofoils to operate at higher speeds (e.g., ~20-45 mph) and across the entire required hydrofoil-borne speed envelope before cavitation occurs. For instance, in some examples, the onset of cavitation is controlled based on the geometric design of the main hydrofoil 130 and the rear hydrofoil 136. Additionally, in some examples, the structural design of the main hydrofoil 130 and the rear hydrofoil 136 is configured to allow the surfaces of the hydrofoils to flex and twist at higher speeds, which may reduce loading on the hydrofoils and delay the onset of cavitation.

Further, in some examples, the distributed blown-wing propulsion system described above further facilitates the delay of onset of cavitation on the main hydrofoil 130 and the rear hydrofoil 136. Cavitation is caused by both (i) the amount of lift generated by a hydrofoil and (ii) the profile of the hydrofoil (which is affected by both the hydrofoil's angle of attack and its vertical thickness) as it moves through water. Reducing the amount of lift generated by the hydrofoil delays the onset of cavitation. Because the blown-wing propulsion system creates additional lift on the main wing 104, the amount of lift exerted on the main hydrofoil 130 and the rear hydrofoil 136 to lift the hull 102 out of the water is reduced. Further, because the main hydrofoil 130 and the rear hydrofoil 136 do not need to generate as much lift to raise the hull 102 out of the water, their angles of attack may be reduced as well, which further delays the onset of cavitation. In some examples, combining the blown-wing propulsion system with the hydrofoil designs described herein facilitates operating the craft 100 in a hydrofoil-borne mode at speeds above 35 knots before cavitation occurs.

As noted above, some examples of the main hydrofoil assembly 108 and the rear hydrofoil assembly 110 include one or more main and rear hydrofoil control surfaces 134, 140, respectively. Some examples of the main hydrofoil control surfaces 134 include one or more hinged surfaces on a trailing or leading edge of the main hydrofoil 130 as well as one or more actuators which are operated by the control system of the craft 100 to rotate the hinged surfaces so that they extend above or below the main hydrofoil 130. Some examples of the main hydrofoil control surfaces 134 on the main hydrofoil 130 are operated in a similar manner as the flaps 118 and ailerons 120 on the main wing 104 of the craft 100. In some examples, lowering the control surfaces 134 to extend below the main hydrofoil 130 changes the hydrodynamic shape of the main hydrofoil 130 in a manner that generates additional lift on the main hydrofoil 130, similar to the aerodynamic effect of lowering the flaps 118. In some examples, asymmetrically raising one or more of the control surfaces 134 (e.g., raising a control surface 134 on only one side of the main hydrofoil 130) changes the hydrodynamic shape of the main hydrofoil 130 in a manner that generates a roll force on the main hydrofoil 130, similar to the aerodynamic effect of raising one of the ailerons 120.

Likewise, some examples of the rear hydrofoil control surfaces 140 include one or more hinged surfaces on a trailing or leading edge of the rear hydrofoil 136 as well as one or more actuators, which are operated by the control system of the craft 100 to rotate the hinged surfaces so that they extend above or below the rear hydrofoil 136. In some examples, the rear hydrofoil control surfaces 140 on the rear hydrofoil 136 are operated in a similar manner as the elevators 126 on the tail 106 of the craft 100. In some examples, lowering the control surfaces 140 to extend below the rear hydrofoil 136 changes the hydrodynamic shape of the rear hydrofoil 136 in a manner that causes the craft 100 to pitch downwards, similar to the aerodynamic effect of lowering the elevators 126. In some examples, raising the control surfaces 140 to extend above the rear hydrofoil 136 changes a hydrodynamic shape of the rear hydrofoil 136 in a manner that causes the craft 100 to pitch upwards, similar to the aerodynamic effect of raising the elevators 126.

In some examples, one or both of the main hydrofoil control surfaces 134 or the rear hydrofoil control surfaces 140 include rudder-like control surfaces similar to the rudder 128 on the tail 106 of the craft 100. For instance, some examples of the main hydrofoil control surfaces 134 include one or more hinged surfaces on a trailing edge of the main hydrofoil strut 132 as well as one or more actuators, which are operated by the control system of the craft 100 to rotate the hinged surfaces so that they extend to the left or right of the main hydrofoil strut 132. Similarly, some examples of the rear hydrofoil control surfaces 140 include one or more hinged surfaces on a trailing edge of the rear hydrofoil strut 138 as well as one or more actuators, which are operated by the control system of the craft 100 in order to rotate the hinged surfaces so that they extend to the left or right of the rear hydrofoil strut 138. In some examples, actuating the main hydrofoil control surfaces 134 or the rear hydrofoil control surfaces 140 in this manner changes the hydrodynamic shape of the main hydrofoil strut 132 or the rear hydrofoil strut 138, respectively, which facilitates controlling the yaw of the craft 100 when operating in a waterborne or hydrofoil-borne mode, similar to the effect of actuating the rudder 128 of the craft 100, as described above.

In some examples, instead of (or in addition to) actuating hinged control surfaces on the main hydrofoil 130 and/or the rear hydrofoil 136, a control system of the craft 100 actuates the entire main hydrofoil 130 and/or the entire rear hydrofoil 136 themselves. In some examples, the craft 100 includes one or more actuators for rotating the main hydrofoil 130 and/or the rear hydrofoil 136 around the yaw axis. In some examples, the craft 100 includes one or more actuators for controlling the angle of attack of the main hydrofoil 130 and/or the rear hydrofoil 136 (i.e., rotating the main hydrofoil 130 and/or the rear hydrofoil 136 around the pitch axis). Some examples of the craft 100 include one or more actuators for rotating the main hydrofoil 130 and/or the rear hydrofoil 136 around the roll axis. Some examples of the craft 100 include one or more actuators for changing a camber or shape of the main hydrofoil 130 and/or the rear hydrofoil 136. Some examples of the craft 100 include one or more actuators for flapping the main hydrofoil 130 and/or the rear hydrofoil 136 to help propel the craft 100 forward or backward. Other examples are possible as well.

Further, some examples of the craft 100 dynamically control an extent to which the main hydrofoil 130 and/or the rear hydrofoil 136 are deployed based on an operational mode (e.g., hull-borne, hydrofoil-borne, or wing-borne modes) of the craft 100. For instance, in some examples, during hull-borne mode, the rear hydrofoil assembly 110 is partially deployed or retracted to increase turning authority. The amount of partial deployment or retraction may be a function of the desired overall vehicle draft when operating in a shallow water environment. In some examples, during hydrofoil-borne mode, the main hydrofoil assembly 108 is partially retracted to reduce the distance between the hull of the vehicle and the water's surface. This increases the amount of lift generated by the main wing 104 by operating the wing closer to the surface of the water, increasing the effects of the aerodynamic ground effect.

As noted above, some examples of the main hydrofoil assembly 108 and rear hydrofoil assembly 110 interface with a deployment system that facilitates retracting the respective hydrofoil assemblies 108, 110 into or toward the hull 102 for hull-borne or wing-borne operation and for extending the respective hydrofoil assemblies 108, 110 below the hull 102 for hydrofoil-borne operation. As described further below, in some embodiments, the deployment system is used in connection with extending, retracting, and/or otherwise controlling the positioning of the hydrofoil assemblies 108, 110 during takeoff when the craft is transitioning from hydrofoil-borne operation to wing-borne operation.

H. Hydrofoil Deployment Systems

Figure 2:
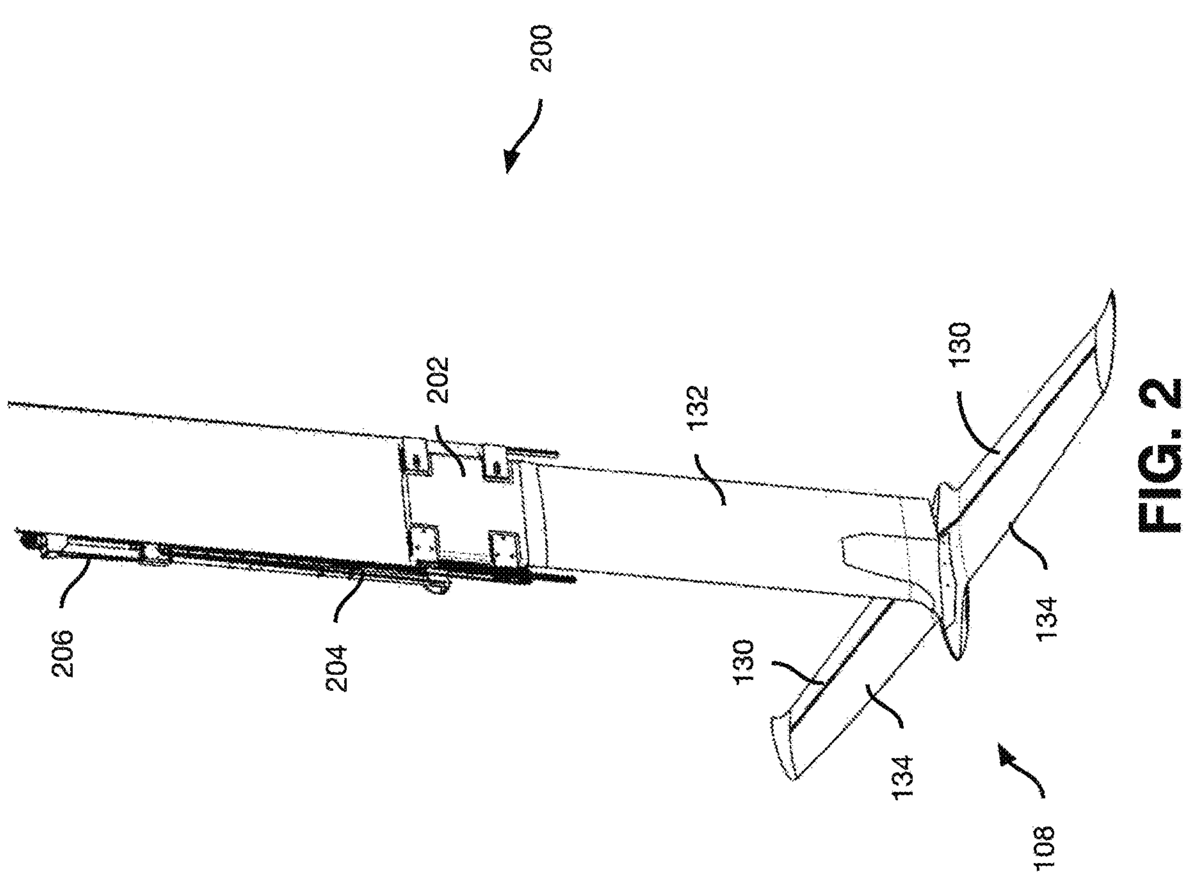
FIG. 2 illustrates a main hydrofoil deployment system of a craft, in accordance with example embodiments.

FIG. 2 illustrates an example of a main hydrofoil deployment system 200 that facilitates retracting and extending of the main hydrofoil assembly 108. As shown, some examples of the main hydrofoil deployment system 200 take the form of a linear actuator that includes one or more brackets 202 that couple the main hydrofoil assembly 108 (by way of the main hydrofoil strut 132) to one or more vertical tracks 204. Some examples of the brackets 202 are configured to move vertically along the tracks 204, such that when the brackets 202 move vertically along the tracks 204, the main hydrofoil assembly 108 likewise moves vertically. Some examples of the brackets 202 are coupled to a leadscrew 206 that, when rotated, causes vertical movement of the brackets 202. Some examples of the leadscrew 206 are rotatable by any of various sources of torque, such as an electric motor coupled to the leadscrew 206 by a gear assembly.

Some examples of the main hydrofoil deployment system 200 further include one or more sensors 210 configured to detect a vertical position of the main hydrofoil assembly 108. For example, a first sensor senses when the main hydrofoil assembly 108 has reached a fully retracted position and a second sensor senses when the main hydrofoil assembly 108 has reached a fully extended position. However, the main hydrofoil deployment system 200 may include additional sensors for detecting additional discrete positions or continuous positions of the main hydrofoil assembly 108. Some examples of the sensors are included as part of, or otherwise configured to communicate with, the control system of the craft 100 to provide the control system with data that indicates the position of the main hydrofoil assembly 108. Some examples of the control system use this data to determine whether to operate the electric motor to retract or extend the main hydrofoil assembly 108.

In some examples, such as examples where the linear actuator is not a self-locking linear actuator, the main hydrofoil deployment system 200 includes a locking or braking mechanism for holding the main hydrofoil strut 132 in a fixed position (e.g., in a fully retracted or fully extended position). An example of the locking mechanism corresponded to a dual-action mechanical brake that is coupled to the electric motor, the leadscrew 206, or the gear assembly.

While the above description provides various details of an example main hydrofoil deployment system 200, it should be understood that the main hydrofoil deployment system 200 illustrated in FIG. 2 is for illustrative purposes and is not meant to be limiting. For instance, the main hydrofoil deployment system 200 may include any of various linear actuators now known or later developed that are capable of retracting and extending the main hydrofoil assembly 108.

Figure 3:
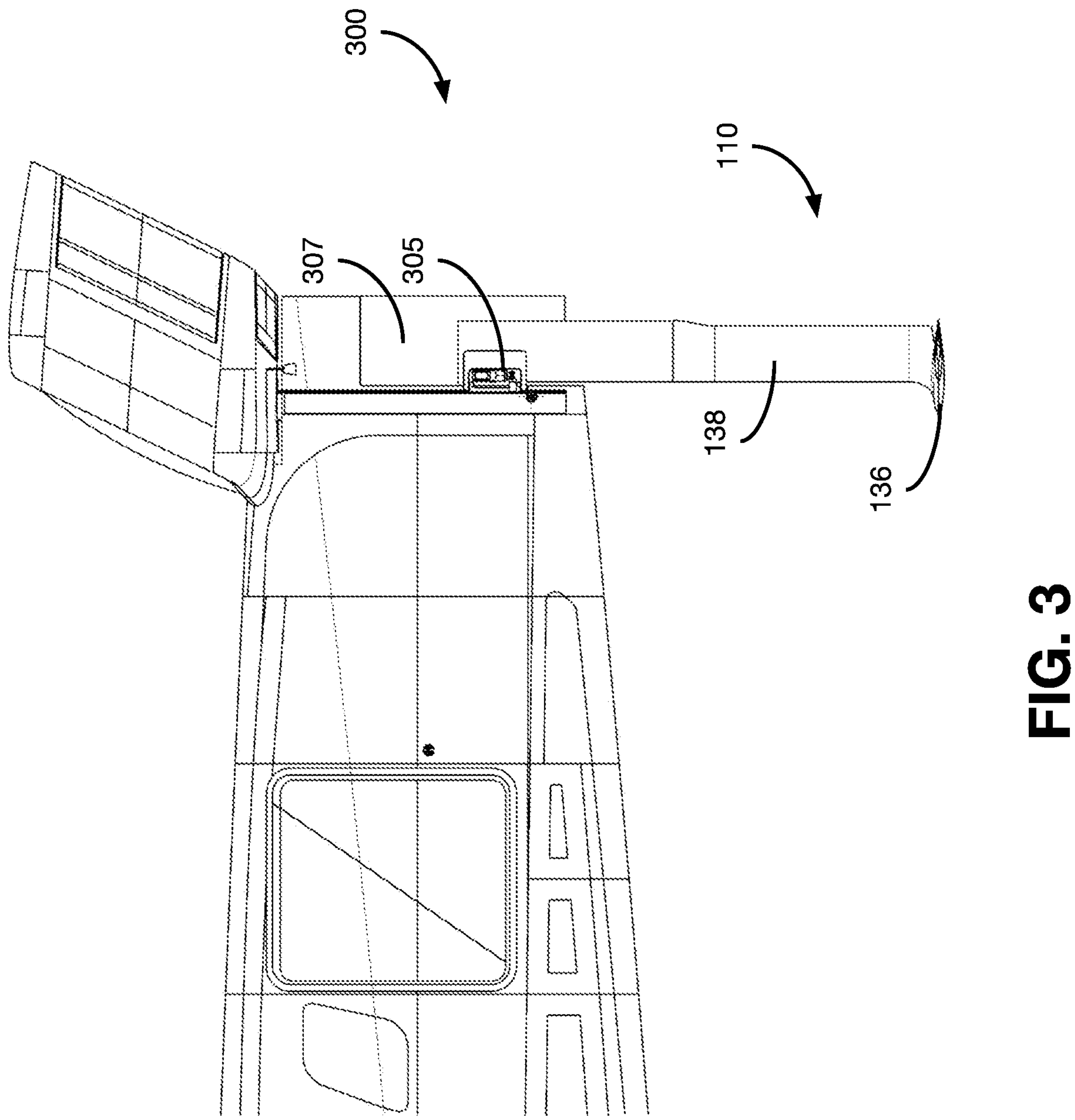
FIG. 3 illustrates a rear hydrofoil deployment system of a craft, in accordance with example embodiments.

FIG. 3 illustrates an example of a rear hydrofoil deployment system 300 that facilitates retracting and extending the rear hydrofoil 136. As shown, some examples of the rear hydrofoil deployment system 300 include an actuator 305 to the rear hydrofoil strut 138. When actuated, the actuator 305 causes the rear hydrofoil strut 138 to raise or lower by causing the rear hydrofoil strut 138 to slide vertically along a shaft 307. While not illustrated in FIG. 3, in some examples, the rudder 128 is mounted to the shaft 307 such that, when the actuator 305 raises the rear hydrofoil strut 138, the rear hydrofoil strut 138 retracts at least partially into the rudder 128. Additionally, some examples of the rear hydrofoil deployment system 300 include one or more servo motors configured to rotate the rear hydrofoil strut 138 around the shaft. In this respect, in some examples, the rear hydrofoil strut 138 is rotated around the shaft to act as a hydro-rudder when submerged in water or to act as an aero-rudder when out of the water. Further, because the rudder 128 is mounted to the same shaft 307 as the rear hydrofoil strut 138 and the rear hydrofoil strut 138 can be retracted into the rudder 128, the same servo motor can also be used to control the rotation of the rudder 128.

The actuator 305 of the rear hydrofoil deployment system 300 may take various forms and may, for instance, include any of various linear actuators now known or later developed that are capable of retracting and extending the rear hydrofoil assembly 110. Further, in some examples, the actuator 305 has a non-unitary actuation ratio such that a given movement of the actuator 305 causes a larger corresponding induced movement of the rear hydrofoil assembly 110. This can help allow for faster retractions of the rear hydrofoil assembly 110, which may be beneficial during takeoff, as described in further detail below.

Some examples of the main hydrofoil assembly 108 and/or the rear hydrofoil assembly 110 are configured such that, when fully retracted, the hydrofoil assembly is flush, conformal, or tangent to the hull 102. For instance, some examples of the hull 102 include one or more recesses configured to receive the main hydrofoil assembly 108 and/or the rear hydrofoil assembly 110. In this regard, some examples of the main hydrofoil assembly 108 and/or the rear hydrofoil assembly 110 have a shape such that when the main hydrofoil assembly 108 and/or the rear hydrofoil assembly 110 are fully retracted into the recesses of the hull 102, the outer contour of the hull 102 forms a substantially smooth transition at the intersection of the hull 102 and the main hydrofoil assembly 108 and/or the rear hydrofoil assembly 110.

Other examples of the main hydrofoil assembly 108 and/or the rear hydrofoil protrude slightly below the hull 102 when retracted. These examples of the main hydrofoil assembly 108 and/or the rear hydrofoil assembly 110 are configured to have a non-negligible effect on the aerodynamics of the craft 100. Some examples of the craft 100 are configured to leverage these effects to provide additional control of the craft 100. For instance, in some examples, when the main hydrofoil assembly 108 and/or the rear hydrofoil assembly 110 are retracted but still exposed, the exposed hydrofoil is manipulated in flight to impart forces and moments on the craft 100 similar to an aero-control surface.

Some examples of the hydrofoil assemblies 108, 110 disclosed herein are mounted on a pivot that is locked underwater but is unlocked to allow the hydrofoil to move around the pivot in the air. At that point, the control surfaces act like trim tabs and are able to effect movement of the entire unlocked, pivoting hydrofoil, which would otherwise require impractically large and heavy servo motors. This configuration facilitates unlocking and moving of the hydrofoil using a slow servo and/or a combination of control surface movement combined with forward movement through water, and then re-locked such that the hydrofoil is at a selected angle of incidence.

As noted above, some examples of the main hydrofoil assembly 108 are configured to be retractable. Some examples of the hull 102 include openings through which the strut 132 of the main hydrofoil assembly 108 are retracted and extended. Some examples of the hull 102 are configured to isolate water that enters through these openings (e.g., when the hull 102 contacts the water surface) and to allow for the water to drain from the hull 102 after the hull 102 is lifted out of the water. For instance, some examples of the hull 102 include pockets 142 on each side of the hull 102 aligned above the strut 132. Some examples of the pockets 142 are isolated from the remainder of the interior of the hull 102 so that water that accumulates in the pockets 142 does not reach any undesired areas (e.g., the cockpit, passenger seating area, areas that house the battery system 400, components of the control system of the craft 100, etc.). Further, some examples of the pockets 142 include venting holes or other openings located at or near the bottom of the pockets 142. The venting openings are configured to allow water that enters the pockets 142 to vent out of the pockets 142 when the hull 102 is lifted out of the water.

Some examples of the main hydrofoil assembly 108 and/or the rear hydrofoil assembly 110 include one or more propellers for additional propulsion when submerged underwater. For instance, in some examples, one or more propellers are mounted to the main hydrofoil 130 and/or the rear hydrofoil 136. In some examples, the propellers are configured to provide additional propulsion force to the craft 100 during hydrofoil-borne or hull-borne operation.

In some examples, propellers are mounted to the hull 102. The propellers are submerged during hull-borne operation. In some examples, the propellers are configured to provide additional propulsion force to the craft 100 during hull-borne operation.

Some examples of the main and/or rear hydrofoil assemblies 108, 110 include various failsafe mechanisms in case of malfunction. For instance, in some examples, when one or both of the main and rear hydrofoil deployment systems 200, 300 cannot be retracted due to a malfunction, the craft 100 is configured to jettison the malfunctioning assembly. In this regard, some examples of the main and/or rear hydrofoil assemblies 108, 110 are coupled to the hull 102 by a releasable latch. Some examples of the control system of the craft 100 are configured to identify a retraction malfunction (e.g., based on data received from the positional sensors 210) and responsively open the latch to release the connection between the hull 102 and the malfunctioning hydrofoil assembly. In some examples, the weight of the malfunctioning hydrofoil assembly is sufficient to jettison the malfunctioning hydrofoil assembly out of the hull 102 when the latch is opened. Some examples of the craft 100 include an actuator or some other mechanism to jettison the malfunctioning hydrofoil assembly out of the hull 102. In some examples, the main and/or rear hydrofoil assemblies 108, 110 are configured to break in a controlled manner upon impact with water. For instance, in some examples, a joint between the main hydrofoil strut 132 and the hull 102 and/or a joint between the rear hydrofoil strut 138 and the hull 102 is configured to disconnect when subjected to a torque significantly larger than standard operational torques at the joints. Other designs for providing controlled breaks are possible as well.

I. Battery System

Figure 4:
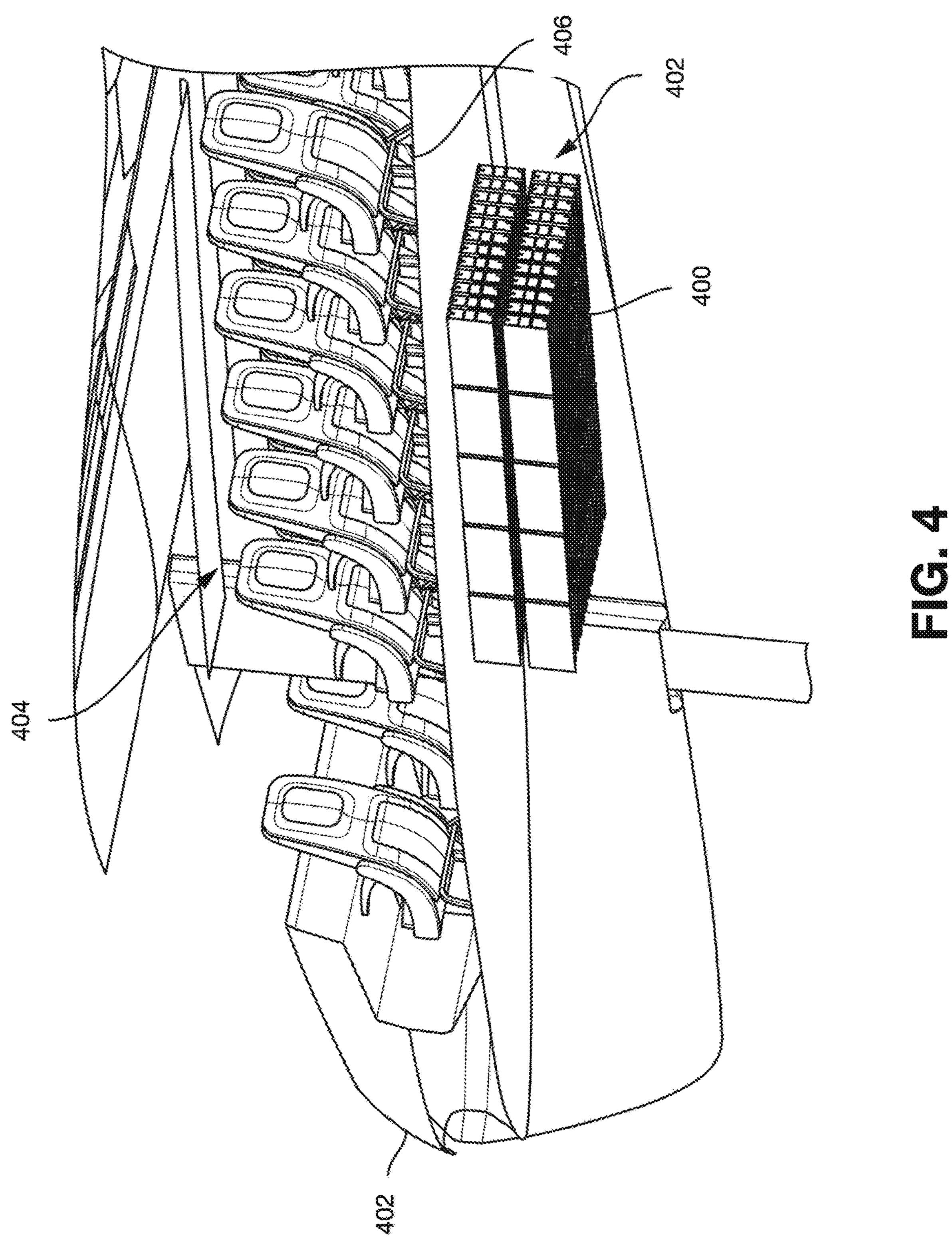
FIG. 4 illustrates a battery system of a craft, in accordance with example embodiments

FIG. 4 illustrates an example of an onboard battery system. In some examples, the battery system 400 is arranged in a protected area 402 of the hull 102 below a passenger seating area 404. Some examples of the battery system 400 are separated from the passenger seating area 404 by a firewall 406 to protect the passengers from harm if a thermal runaway occurs. In this regard, some examples of the craft 100 include a battery management system comprising voltage, current, and/or thermal sensors for detecting thermal runaway or some other fire detection system for detecting a fire in the protected area 402.

Some examples of the craft 100 include one or more mechanisms for flooding the battery system 400 (e.g., with an inert gas fire, with water, etc.) upon detecting a thermal runaway or a fire in the protected area 402. For instance, some examples of the hull 102 comprise one or more valves or other controllable openings. The control system of the craft 100 is configured to open the valves and/or controllable openings upon detecting a fire in the protected area 402 or thermal runaway in the battery system 400 to allow water to enter the protected area 402 and to extinguish or prevent a fire in the protected area 402.

In some examples, the battery system 400 is configured to be jettisoned through one or more of the controllable openings in the hull 102 described above. In this regard, in some examples, the weight of the battery system 400 is sufficient to jettison the battery system 400 out of the hull 102 when the hull 102 is opened. In some examples, the craft 100 comprises an actuator or the like configured to jettison the battery system 400 out of the hull 102.

In other examples, the craft 100 may take measures to become waterborne in response to detecting a fire in the protected area 402 or thermal runaway in the battery system 400. Some examples of the control system of the craft 100 determine a fire suppression operation to perform based on the operational state of the craft 100 (e.g., operating in hull-borne, hydrofoil-borne, or wing-borne mode). For instance, when operating in hull-borne mode and upon detecting a thermal runaway or a fire in the protected area 402, some examples of the control system are configured to flood the battery system 400 as described above. When operating in hydrofoil-borne or a wing-borne mode, the control system is configured to cause the craft 100 to transition to hull-borne mode upon detecting a thermal runaway or a fire in the protected area 402 and then flood the battery system 400.

J. Control System

Figure 5:
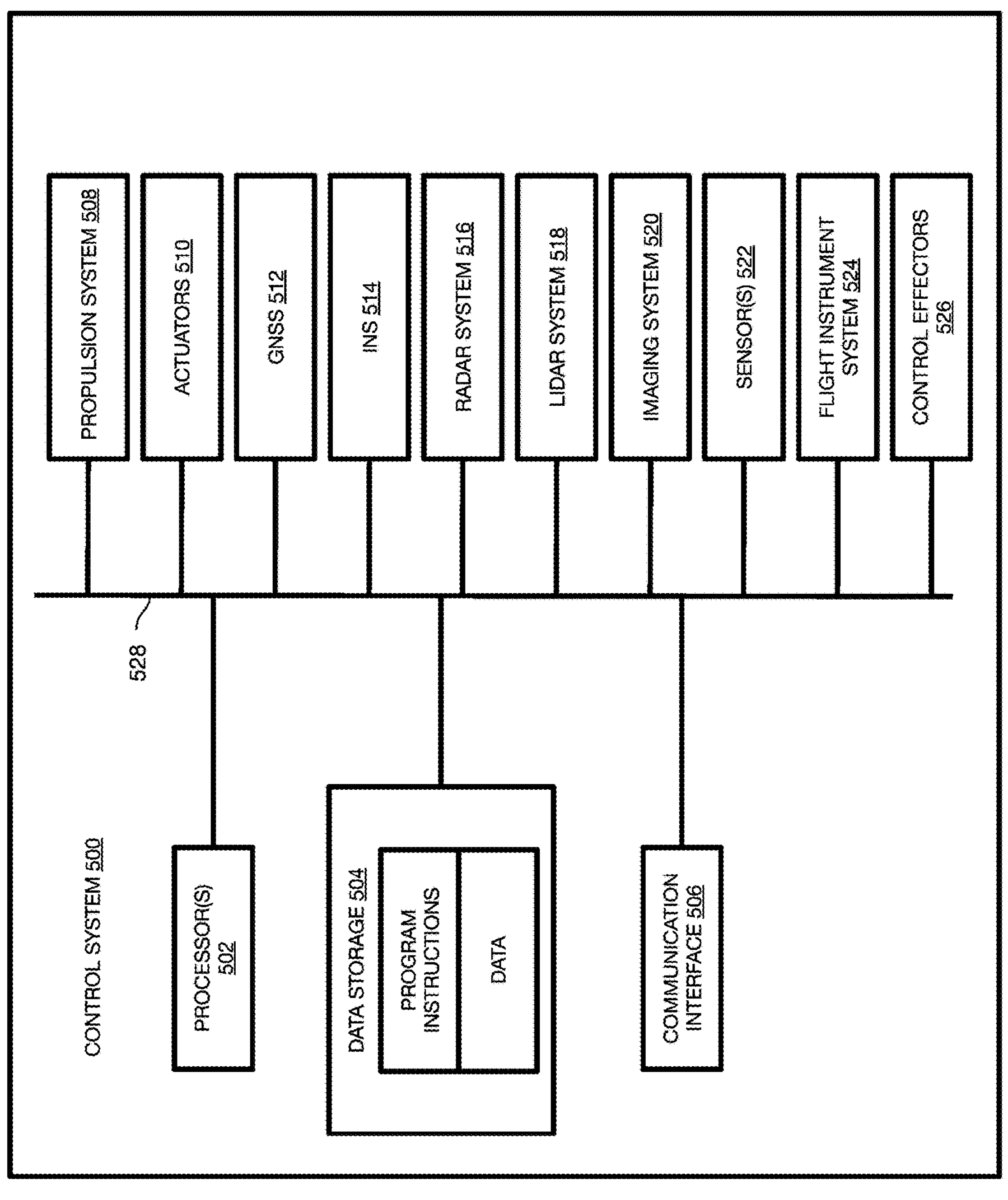
FIG. 5 illustrates a control system of a craft, in accordance with example embodiments.

FIG. 5 illustrates an example of a control system 500 of the craft 100. As shown, some examples of control system 500 include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and flight controls 526. In some examples, some or all of these components communicate with one another via one or more communication links 528 (e.g., a system bus, a public, private, or hybrid cloud communication network, etc.)

Some examples of processors 502 correspond to or comprise general-purpose processors (e.g., a single- or multi-core microprocessor), special-purpose processors (e.g., an application-specific integrated circuit or digital-signal processor), programmable logic devices (e.g., a field-programmable gate array), controllers (e.g., microcontrollers), and/or any other processor components now known or later developed. Further, while the one or more processors 502 are illustrated as a separate stand-alone component of the control system 500, it should also be understood that the one or more processors 502 could comprise processing components that are distributed across one or more of the other components of the control system 500.

Some examples of the data storage 504 comprise one or more non-transitory computer-readable storage mediums that are collectively configured to store (i) program instructions executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is illustrated as a separate stand-alone component of the control system 500, it should also be understood that the data storage 504 may comprise computer-readable storage mediums that are distributed across one or more of the other components of the control system 500.

Some examples of the communication interface 506 include one or more wireless interfaces and/or one or more wireline interfaces, which allow the control system 500 to communicate via one or more networks. Some example wireless interfaces provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Some example wireline interfaces include an Ethernet interface, a Universal Serial Bus (USB) interface, CAN Bus, RS-485, or similar interface to communicate via a wire, a twisted pair of wires, a coaxial cable, an optical link, a fiber-optic link, or other physical connection to a wireline network.

Some examples of the propulsion system 508 include one or more electronic speed controllers (ESCs) for controlling the electric motor propeller assemblies 116 distributed across the main wing 104 and, in some examples, across the horizontal stabilizer 124. Some examples of the propulsion system 508 include a separate ESC for each respective propeller assembly 116, such that the control system 500 individually controls the rotational speeds of the electric motor propeller assemblies 116.

Some examples of the actuators 510 include any of the actuators described herein, including (i) actuators for raising and lowering the flaps 118, ailerons 120, elevators 126, main hydrofoil control surfaces 134, and rear hydrofoil control surfaces 140, (ii) actuators for turning the rudder 128, the main hydrofoil control surfaces 134 positioned on the main hydrofoil strut 132, and the rear hydrofoil control surfaces 140 positioned on the rear hydrofoil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Some examples of the actuators correspond to linear actuators, rotary actuators, hydraulic actuators, pneumatic actuators, electric actuators, electro-hydraulic actuators, and mechanical actuators. Some examples of the actuators correspond to electric motors, stepper motors, and hydraulic cylinders. Other examples are contemplated herein as well.

Some examples of the GNSS system 512 are configured to provide a measurement of the location, speed, altitude, and heading of the craft 100. The GNSS system 512 includes one or more radio antennas paired with signal processing equipment. Data from the GNSS system 512 may allow the control system 500 to estimate the position and speed of the craft 100 in a global reference frame, which can be used for route planning, operational envelope protection, and vehicle traffic deconfliction by both understanding where the craft 100 is located and comparing the location with known traffic.

Some examples of the INS 514 include motion sensors, such as angular and/or linear accelerometers, and rotational sensors, such as gyroscopes, to calculate the position, orientation, and speed of the craft 100 using dead reckoning techniques. In some examples, one or more of these components are used by the control system to calculate actuator outputs to stabilize or otherwise control the vehicle during all modes of operation.

Some examples of the radar system 516 include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the craft 100. This radar system 516 may be utilized to detect, for example, the water surface, maritime or wing-borne vehicle traffic, wildlife, or weather.

Some examples of the lidar system 518 comprise a light source and an optical receiver. The light source emits a laser that reflects off an object and returns to the optical receiver. The lidar system 518 measures the time for the reflected light to return to the receiver to determine the distance between the craft 100 and the object. This lidar system 518 may be utilized by the flight control system to measure the distance from the craft 100 to the surface of the water in various spatial measurements.

Some examples of the imaging system 520 include one or more still and/or video cameras configured to capture image data from the environment of the craft 100. Some examples of the cameras correspond to or comprise charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. Some examples of the imaging system 520 are configured to perform obstacle avoidance, localization techniques, water surface tracking for more accurate navigation (e.g., by applying optical flow techniques to images), video feedback, and/or image recognition and processing among other possibilities.

As noted above, some examples of the control system 500 include various other sensors 522 for use in controlling the craft 100. Examples of such sensors 522 correspond to or comprise thermal sensors or other fire detection sensors for detecting a fire in the hull 102 or for detecting thermal runaway in the battery system 400. As further described above, the sensors 522 may include position sensors for sensing the position of the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

Some examples of the sensors 522 facilitate determining the altitude of the craft 100. For instance, some examples of the sensor 522 include an ultrasonic altimeter configured to emit and receive ultrasonic waves. The emitted ultrasonic waves reflect off the water surface below the craft 100 and return to the altimeter. The ultrasonic altimeter measures the time for the reflected ultrasonic wave to return to the altimeter to determine the distance between the craft 100 and the water surface. Some examples of the sensor 522 include a barometer for use as a pressure altimeter. The barometer measures the atmospheric pressure in the environment of the craft 100 and determines the altitude of the craft 100 based on the measured pressure. Some examples of the sensor 522 include a radar altimeter to emit and receive radio waves. The radar altimeter measures the time for the radio wave to reflect off of the surface of the water below the craft 100 to determine a distance between the craft 100 and the water surface. In some examples, these sensors are placed in different locations on the craft 100 to reduce the impact of sensor constraints, such as sensor deadband or sensitivity to splashing water.

Some examples of the control system 500 are configured to use one or more of the sensors 522 or other components of the control system 500 to help navigate the craft 100 through maritime traffic or to avoid any other type of obstacle. For example, some examples of the control system 500 determine the position, orientation, and speed of the craft 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. Some examples of the control system 500 determine the location of an obstacle using the Automatic Identification System (AIS). Some examples of the control system 500 are configured to maneuver the craft 100 to avoid collision with an obstacle based on the determined position, orientation, and speed of the craft 100 and the determined location of the obstacle by actuating various control surfaces of the craft 100 in any of the manners described herein.

Some examples of the flight instrument system 524 include instruments for providing data about the altitude, speed, heading, orientation (e.g., yaw, pitch, and roll), battery levels, or any other information provided by the various other components of the control system 500.

Some examples of the flight controls 526 include one or more joysticks, thrust control levers, buttons, switches, dials, levers, or touch screen displays, etc. In operation, a pilot may use the flight controls 526 to operate one or more control surfaces (e.g., flaps, ailerons, elevators, rudder, propulsion propellers, etc.) of the craft 100 to thereby maneuver the craft 100 (e.g., control the direction, speed, altitude, etc., of the craft 100)

In some examples, the combinations of control surfaces on the craft 100 used by the control system 500 to control operations of the craft 100 depends on the mode of operation of the craft 100 and is determined based at least in part on aspects such as vehicle position, speed, attitude, acceleration, rotational rates, and/or altitude above water. Table 1 summarizes an example of the relationship between the control surfaces and the operation mode

TABLE 1

| Control Surface | Hull-borne | Foil-borne | Wing-borne |
|---|---|---|---|
| Propulsion | Y | Y | Y |
| Aerodynamic Elevator | N | Y | Y |
| Aerodynamic Ailerons | N | Y | Y |
| Aerodynamic Rudder | Y | Y | Y |
| Aerodynamic Flaps | N | Y | Y |
| Hydrodynamic Elevator | Y | Y | N |
| Hydrodynamic Flaps | Y | Y | N |
| Hydrodynamic Rudder | Y | Y | N |

In some examples, the propulsion control surfaces in the table include the propeller assembly 116, as well as any propellers mounted to the hull 102, main hydrofoil assembly 108, or rear hydrofoil assembly 110. In some examples, the aerodynamic elevator control surfaces include elevator 126, the aerodynamic ailerons include ailerons 120, the aerodynamic rudder includes rudder 128 (when not submerged), the aerodynamic flaps include flaps 118, the hydrodynamic elevator includes rear hydrofoil control surfaces 140, the hydrodynamic flaps include main hydrofoil control surfaces 134, and the hydrodynamic rudder includes rudder 128 (when submerged).

In some examples, when actuating the control surfaces in the various examples, operational modes identified in Table 1 above, the control system 500 executes different levels of stabilization along the various vehicle axes during different modes of operation. Table 2 below identifies examples of stabilization controls that the control system 500 applies during the various modes of operation for each axis of the craft 100. Closed-loop control may comprise feedback and/or feed-forward control.

TABLE 2

| Vehicle Axis | Hull-borne | Foil-borne | Wing-borne |
|---|---|---|---|
| Pitch Axis | None | Closed-loop control on vehicle ride height | Closed-loop control on vehicle altitude |
| Roll Axis | None | Closed-loop control around vehicle bank angle = 0 | Stabilization and closed-loop control on heading |
| Yaw Axis | Rate stabilization | Closed-loop control on vehicle heading | Closed-loop control on vehicle heading |
| Speed Control | Closed-loop control on vehicle GPS Speed | Closed-loop control on vehicle GPS Speed | Closed-loop control on vehicle airspeed |

Further, in some examples, the control system 500 is configured to actuate different control surfaces to control the movement of the craft 100 about its different axes. Table 3 below identifies example axial motions that are affected by the various control surfaces of the craft 100.

TABLE 3

| Control Surface | Axis Control Function |
|---|---|
| Propulsion | (a) accelerate and decelerate the vehicle |
| | (b) turn the vehicle about yaw axis |
| | (c) create a rolling moment |
| Aerodynamic Elevator | (a) create a pitch up or pitch down moment |
| Aerodynamic Ailerons | (a) create a rolling moment |
| | (b) increase lift on aerodynamic wing |
| | (c) create a pitch-down moment |
| Aerodynamic Rudder | (a) create a yawing moment |
| Aerodynamic Flaps | (a) increase lift on aerodynamic wing |
| | (b) create a pitch-down moment |
| Hydrodynamic Elevator | (a) create a pitch moment |
| | (b) generate heave force on rear hydrofoil |
| Hydrodynamic Flaps | (a) generate heave force on main hydrofoil |
| Hydrodynamic Rudder | (a) create a yaw moment |

III. Example Modes of Operation

A. Hull-Borne Operation

Figure 6A:
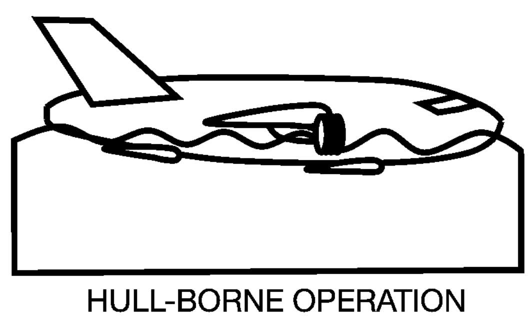
FIG. 6A illustrates a craft in a hull-borne mode of operation, in accordance with example embodiments.

FIG. 6A illustrates an example of the craft 100 when the craft 100 is operating in a hull-borne mode. During this mode, the craft 100 is docked and floating on the hull 102, with the buoyancy of the outriggers 114 providing for roll stabilization of the craft 100. While docked, the battery system 400 of the craft 100 may be charged. In some examples, rapid charging is aided by an open or closed-loop water-based cooling system. In some examples, the surrounding body of water is used in the loop or as a heat sink. In some examples, the craft 100 includes a heat sink integrated into the hull 102 for exchanging heat from the battery system 400 to the surrounding body of water. In other examples, the heat sink is located offboard in order to reduce the mass of the craft 100.

Additionally, in some examples, the propeller assemblies 116 are folded in a direction away from the dock while the craft 100 is docked to help avoid collision with nearby structures or people. This folding may be actuated in various ways, such as by metal spring force, hydraulic pressure, electromechanical actuation, or centrifugal force due to propeller rotation. Other examples are possible as well. Further, in some examples, the main hydrofoil assembly 108 and the rear hydrofoil assembly 110 are retracted (or partially retracted) to avoid collisions with nearby underwater structures.

In some examples, when the craft 100 is ready to depart, the craft 100 uses its propulsion systems, including the propeller assemblies 116 and/or the underwater propulsion system (e.g., one or more outrigger propulsion systems, one or more propeller pods mounted to the hull 102, the main hydrofoil 130, and/or the rear hydrofoil 136), to maneuver away from the dock while remaining hull-borne. In some examples, the main hydrofoil assembly 108 and the rear hydrofoil assembly 110 remain retracted (or partially retracted) during this maneuvering to reduce the risk of hitting underwater obstacles near docks or in shallow waterways. However, when there is a limited risk of hitting underwater obstacles, the craft 100 may partially or fully extend the main hydrofoil assembly 108 and/or the rear hydrofoil assembly 110. With the main hydrofoil assembly 108 and/or the rear hydrofoil assembly 110 extended, the craft 100 actuates the main hydrofoil control surfaces 134 and/or the rear hydrofoil control surfaces 140 to improve maneuverability as described above.

In some examples, at low speeds during hull-borne operation, the control system 500 controls the position and/or rotation of the craft 100 by causing all of the propeller assemblies 116 to spin at the same idle speed, but with a first subset spinning in a forward direction and a second subset spinning in a reverse direction. For instance, in some examples, the control system 500 causes propeller assemblies 116*a*, 116*c*, 116*e*, 116*h*, 116*j*, and 116*l* to idle in reverse and propeller assemblies 116*b*, 116*d*, 116*f*, 116*g*, 116*i*, and 116*k* to idle forward. In this arrangement, the control system 500 causes the craft 100 to make various maneuvers without having to change the direction of rotation of any of the propeller assemblies 116. For instance, to induce a yaw on the craft 100, in some examples, the control system 500 increases the speed of the reverse propeller assemblies on one side of the main wing 104 while increasing the speed of the forward propeller assemblies on the other side of the main wing 104 and without causing any of the propeller assemblies to transition from forward to reverse or from reverse to forward. For example, idling the propellers at a nominal RPM may allow for a faster response in generating a yaw moment on the craft 100 because the propellers required for generating the yaw moment do not have to increase from zero RPM to the desired RPM value. They can spin from the idle RPM to the desired RPM value.

B. Foil-borne Maneuvering Operation

Figure 6B:
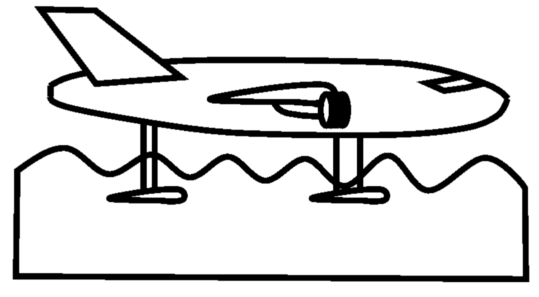
FIG. 6B illustrates a craft in a hydrofoil-borne maneuvering mode of operation, in accordance with example embodiments.

FIG. 6B illustrates an example of the craft 100 when the craft 100 is operating in hydrofoil-borne maneuvering mode. During this mode, the craft 100 is configured to, for example, move through harbors and crowded waterways at speeds generally between 20-45 mph. In this regard, the craft 100 may extend the main hydrofoil assembly 108 and the rear hydrofoil assembly 110 (if not already extended) and accelerate using the previously described propulsion system towards a desired takeoff speed. During acceleration, the craft 100 reaches a speed at which the main hydrofoil assembly 108 and the rear hydrofoil assembly 110 alone support the weight of the craft 100, and the hull 102 is lifted above the surface of the water (e.g., by 3-5 ft) so that the hull is clear of any surface waves. After the hull 102 leaves the surface of the water, the drag forces exerted on the craft 100 drop significantly, and the amount of thrust required to maintain acceleration can be reduced. Therefore, in some examples, after the hull 102 has left the water, the control system 500 reduces the speed of the propeller assemblies 116 to lower the thrust of the craft 100.

Some examples of the control system 500 sustain this operational mode by actively controlling the pitch and speed of the craft 100 so that the main hydrofoil assembly 108 and the rear hydrofoil assembly 110 continue to entirely support the weight of the craft 100. In this regard, some examples of the control system 500 actuate the main hydrofoil control surfaces 134 and/or the rear hydrofoil control surfaces 140 and/or the propulsion system to stabilize the attitude of the craft 100 to maintain the desired height above the surface of the water, vehicle heading, and vehicle forward speed. In this regard, some examples of the control system 500 are configured to detect various changes in the yaw, pitch, or roll of the craft 100 based on data provided by the INS 514 and to make calculated actuations of the main hydrofoil control surfaces 134 and/or the rear hydrofoil control surfaces 140 to counteract the detected changes.

C. Foil-borne Takeoff Operation

Figures 7A, 7B:
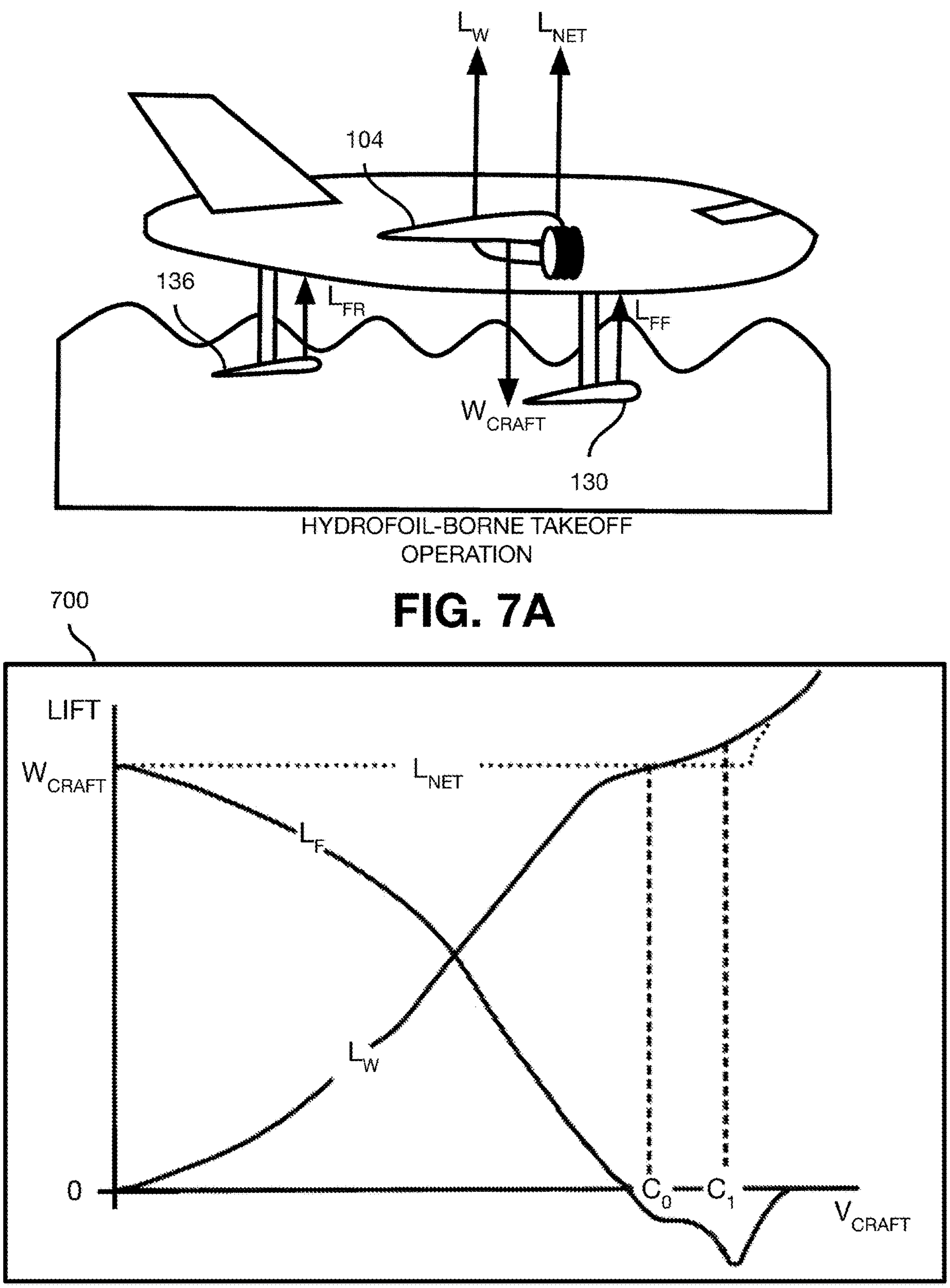
FIG. 7A illustrates a craft in a hydrofoil-borne takeoff mode of operation, in accordance with example embodiments.
FIG. 7B is a graph that illustrates various lift forces acting on a craft, in accordance with example embodiments.

FIG. 7A illustrates an example of the craft 100 when the craft 100 is operating in hydrofoil-borne takeoff mode. During this mode, the craft 100 is configured to, for example, move through open waters and obtain speeds generally between 40-50 mph to facilitate generating the lift required to become wing-borne.

Referring to FIG. 7A, aero lift, $L_W$, generally represents the lift generated by the main wing 104 of the craft 100 but can also include the lift generated by other surfaces such as the tail wing, hull, or propulsive devices such as propellers, rotors, jets, etc. $L_F$ generally corresponds to the lift generated by one or more hydrofoils 130, 136 of the craft 100, where LFF corresponds to the lift generated by the front foil and the LFR corresponds to the lift generated by the rear foil. $W_{CRAFT}$ corresponds to the force of gravity exerted on the craft 100 and is also referred to as the weight of the craft. During steady state operation, $W_{CRAFT}$ generally corresponds to $L_W$+LFR+LFF which also corresponds to $L_{NET}$. Throughout the description, the term $L_F$ is generally understood to correspond to LFR+LFF.

As previously noted, some experimental craft developed by Applicant that include aero foils were unable to achieve the lift required to sustain flight. In these experimental craft, in an attempt to become airborne, the craft 100 would ramp up to a speed at which point the hydrofoil would breach the surface of the water, as $W_{CRAFT}<L_W+L_F$, and $L_F>0$, resulting in $L_W<W_{CRAFT}$. However, in order to takeoff from the water's surface, the aero lift must be greater than or equal to the weight of the craft, however prior to takeoff, the hydrofoils are still under the water's surface, and up until takeoff, have been generating lift ($L_F>0$) as the aerodynamic lift has been insufficient for takeoff up until this point. If the hydro lift and the aero lift sum to greater than the weight of the craft, the vehicle will accelerate upwards and potentially create a premature takeoff condition (prior to condition C0 in FIG. 7B) as the aero lift, $L_W$, generated by the wings, etc., of the craft 100 would be insufficient to sustain flight, and, as a result, the craft 100 would come back down and breach the water, ultimately preventing takeoff. The techniques disclosed below ameliorate these problems by controlling the hydrofoil lift vector, $L_F$, specifically by generating downward forces of one or more hydrofoils 130, 136 of the craft 100 to keep the hydrofoils 130, 136 submerged until after the upwards aero lift, $L_W$, is sufficient to allow the craft 100 to sustain flight.

In some examples, the lift $L_F$ is in the downward direction, and is introduced via the hydrofoil(s) as $L_W$ increases beyond $W_{CRAFT}$ while the craft 100 is increasing in speed in anticipation of takeoff. This allows the craft 100 to generate a greater overall aero lift, $L_W$, prior to actual takeoff than would otherwise be possible. Then, at the appropriate time (e.g., when $L_W$ reaches some predetermined threshold such as the weight of the craft 100 or some margin thereof), the negative lift, $L_F$, can be "released" from the craft 100, and the craft 100 can, as a result, proceed to become wing-borne.

FIG. 7B is an example of a graph 700 that relates these aspects. The relationships shown in the graph 700 and the ways in which various lift forces, thresholds, etc., are depicted are merely examples and are provided to aid understanding of the various operations and procedures described herein. As shown, the net lift, $L_{NET}$, on the craft 100 initially corresponds to the combination of the aero lift, $L_W$, generated by the wing (e.g., main wing, tail wing, etc.) and the lift, $L_F$, generated by the hydrofoils 130, 136 (e.g., $L_{NET}=L_W+L_F$). On the left side of the graph 700, the speed of the craft 100 is such that $L_{NET}$ is sufficient to allow the craft 100 to operate in hydrofoil-borne maneuvering mode but is insufficient to allow the craft 100 to become wing-borne. Moving to the right of the graph 700 as speed increases, $L_W$ increases with increased craft 100 water speed. To maintain ride height and prevent the hydrofoils 130, 136 from breaching the water surface, $L_F$ is reduced in proportion to an increase in $L_W$. For example, $L_F$ is adjusted with the speed of the craft 100 to maintain $L_{NET}$ at a margin equal to the weight, $W_{CRAFT}$, of the craft 100, or small deviations about equal to control ride height. The overall lift provided by the hydrofoils 130, 136 may decrease at the same rate at which lift from the wing is increased towards zero or even become negative with increased speed. For example, just before the speed of the craft 100 reaches the speed associated with condition C0, $L_F$ may be reduced to zero. The conditions at C0 (e.g., speed of the craft 100, angle of attack of craft 100, deflection angles of control surfaces, angle of incidence of hydrofoils, etc.) may be such that $L_F$ may be zero or close to zero. At C0, the aero lift, $L_W$, generated by the main wing 105 may be expected to be able to transition the craft 100 to a wing-borne mode of operation if the downwards hydrofoil lift, $L_F$, were to be removed as $L_W=W_{CRAFT}$. Accordingly, at some time and/or increased speed after this point (e.g., speed associated with condition C1) where $L_W>W_{CRAFT}$, $L_F$ may be gradually or abruptly removed/released. This, in turn, allows $L_{NET}$ to approximately equal to or greater than $W_{CRAFT}$ which allows the craft 100 to take off and become wing-borne.

While not shown in the graph, in some examples, $L_F$ is not removed/released as described. Rather, as the craft 100 continues to accelerate, the downwards hydrofoil lift, $L_F$, increases to a maximum downwards amount (e.g., a predetermined maximum amount and/or a maximum amount achievable due to the limitations of the control capabilities of the hydrofoil). As the aero lift, $L_W$, generated by the main wing 105 continues to increase past this maximum amount of downwards hydrofoil lift, $L_F$, $L_{NET}$ increases in the upwards direction beyond $W_{CRAFT}$ and the craft 100 is pulled from the water. This, in turn transitions the craft 100 to a wing-borne mode of operation.

FIGS. 8A-8G illustrate examples of ways in which one or more of the hydrofoils 130, 136 of the craft 100 can be articulated to control the lift, $L_F$, generated by the hydrofoils 130, 136. The hydrofoil 130 in the figures represents the main hydrofoil 130. However, the aspects described herein apply to the rear hydrofoil 136 or other hydrofoil configurations that use a different number of hydrofoils. Further, additional/alternative aspects may be capable of further controlling the lift generated by the hydrofoils, and such aspects may be implemented additionally or alternatively to the specific aspects described in connection with FIGS. 8A-8G.

Figures 8A, 8B, 8C, 8D, 8E:
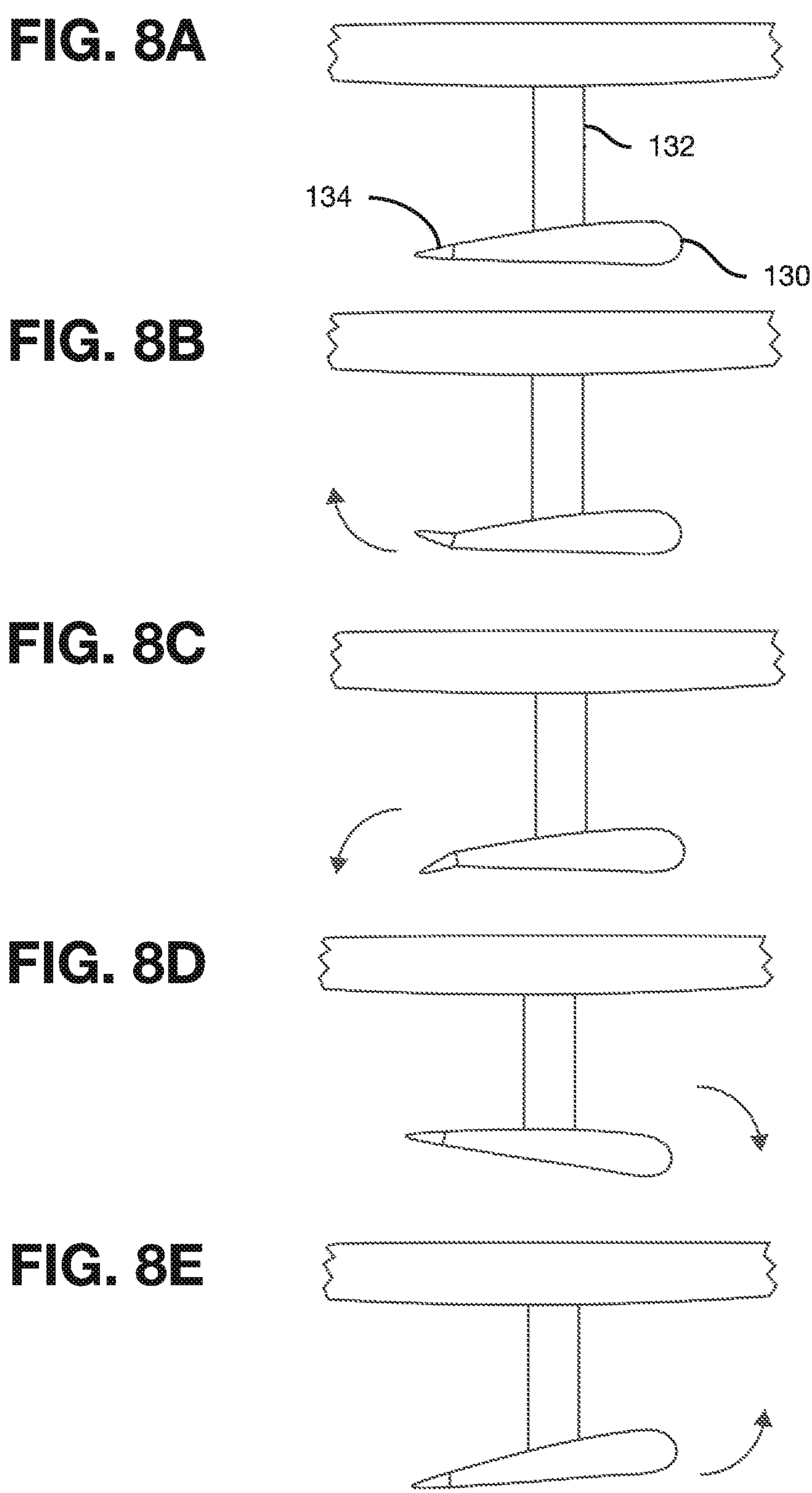
FIGS. 8A-8G illustrate example aspects of articulation of a hydrofoil of a craft, in accordance with example embodiments.

FIGS. 8A-8C illustrate the articulation of one or more control surfaces 134 of the hydrofoil 130 of the craft 100 to control the lift, $L_F$, generated by the hydrofoil 130. As noted above, some examples of the hydrofoils 130, 136 include one or more control surfaces 134, 140 that are hingedly connected to trailing edges of the hydrofoils 130, 136. These control surfaces 134, 140 operate in a similar manner as the flaps 118, ailerons 120, and/or elevators on the main wing 104 of the craft 100 and the elevators 126 on the tail 106 of the craft 100. Some examples of these control surfaces 134, 140 are operated via one or more actuators which are in turn controlled by the control system 500. As the craft 100 accelerates through the water, the control system 500 can adjust/maintain the ride height of the craft 100 (e.g., the height of the craft 100 above the water surface) by adjusting the respective position (e.g., deflection angles) of the control surfaces 134, 140. For example, as shown in FIGS. 8A-8C, a control surface 134 of the main hydrofoils 130 can be rotated from the initial position shown in FIG. 8A to the upward direction shown in FIG. 8B to generate negative lift, $L_F$ (or reduce positive lift, $L_F$). The control surface 134 of the main hydrofoil 130 can be rotated in the downward direction shown in FIG. 8C to generate positive lift, $L_F$ (or reduce negative lift, $L_F$).

FIGS. 8D-8E illustrate the articulation of the angle of incidence of the hydrofoil 130 of the craft 100 to control the lift, $L_F$, generated by the hydrofoil 130. As previously noted, some examples of the craft 100 include one or more actuators for controlling the angle of incidence of the main hydrofoil 130 and/or the rear hydrofoil 136 (i.e., rotating the main hydrofoil 130 and/or the rear hydrofoil 136 around the pitch axis). As shown in FIG. 8D, the angle of incidence of the main hydrofoil 130 can be reduced by rotating the main hydrofoil 130 clockwise from the initial position shown in FIG. 8A (i.e., rotated downward in the direction of travel) to generate negative lift, $L_F$ (or reduce positive lift, $L_F$). As shown in FIG. 8E, the angle of incidence of the main hydrofoil 130 can be increased by rotating the main hydrofoil 130 counterclockwise from the initial position (i.e., rotated upward in the direction of travel) to generate positive lift, $L_F$ (or reduce negative lift, $L_F$).

Figure 8F:
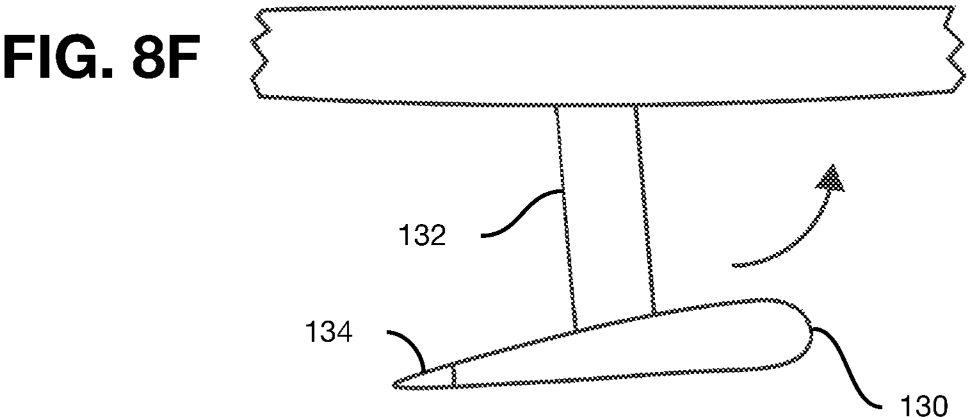
Figure 8G:
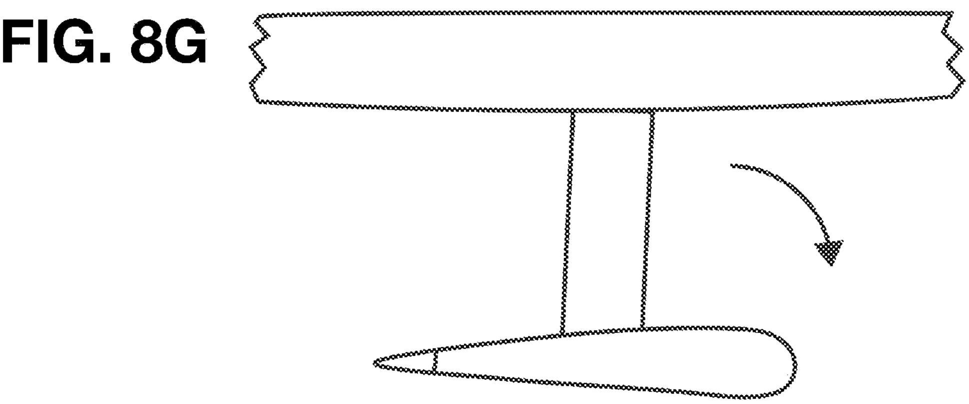

FIGS. 8F-8G illustrate the articulation of the angle of the strut 132 of the hydrofoil 130 of the craft 100 to control the lift, $L_F$, generated by the hydrofoil 130. As previously noted above, some examples of the craft 100 include one or more actuators for controlling the angle of main hydrofoil struts 132 and the rear hydrofoil struts 138 that couple the corresponding main hydrofoil 130 and/or the rear hydrofoil 136 to the hull 102, respectively. As shown in FIGS. 8F and 8G, the angle of incidence of the main hydrofoil 130 can be increased or decreased by rotating the main hydrofoil 130 counterclockwise as shown in FIG. 8F (i.e., rotated upwards in the direction of travel) or clockwise as shown in FIG. 8G (i.e., rotated downwards in the direction of travel) from the initial position shown in FIG. 8A using these actuators to generate positive lift, $L_F$ (or reduce negative lift, $L_F$) or to generate negative lift, $L_F$ (or reduce positive lift, $L_F$), respectively. While the various ways in which the main hydrofoil 130 can be articulated are shown separately in FIGS. 8A-8G, it should be understood that any combination of these articulation procedures can be used to control the lift, $L_F$, generated by the main hydrofoil 130 and/or the rear hydrofoil 136.

Figure 9A:
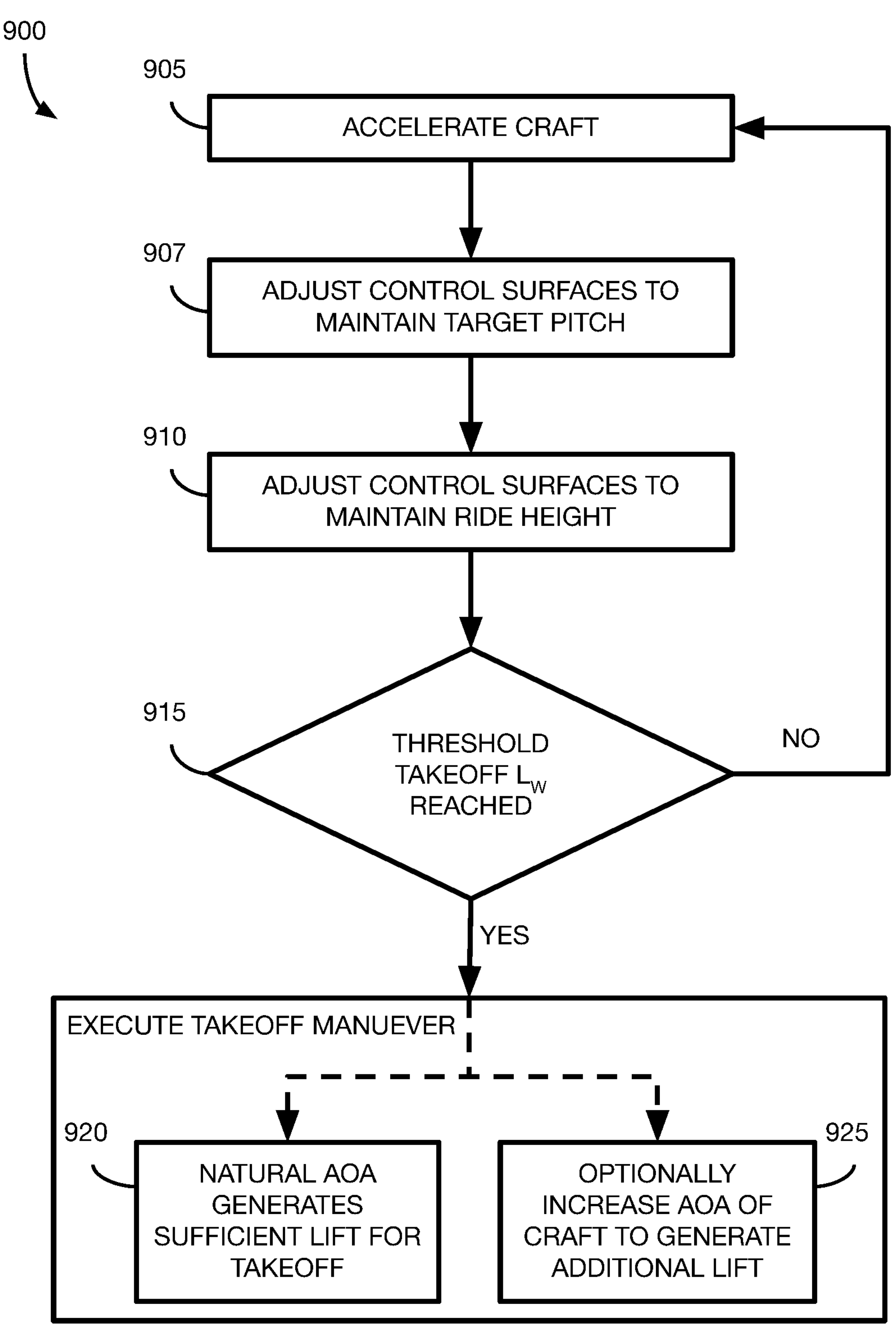
FIG. 9A illustrates example operations that facilitate transitioning a craft to a wing-borne mode of operation, in accordance with example embodiments.
Figure 9B:
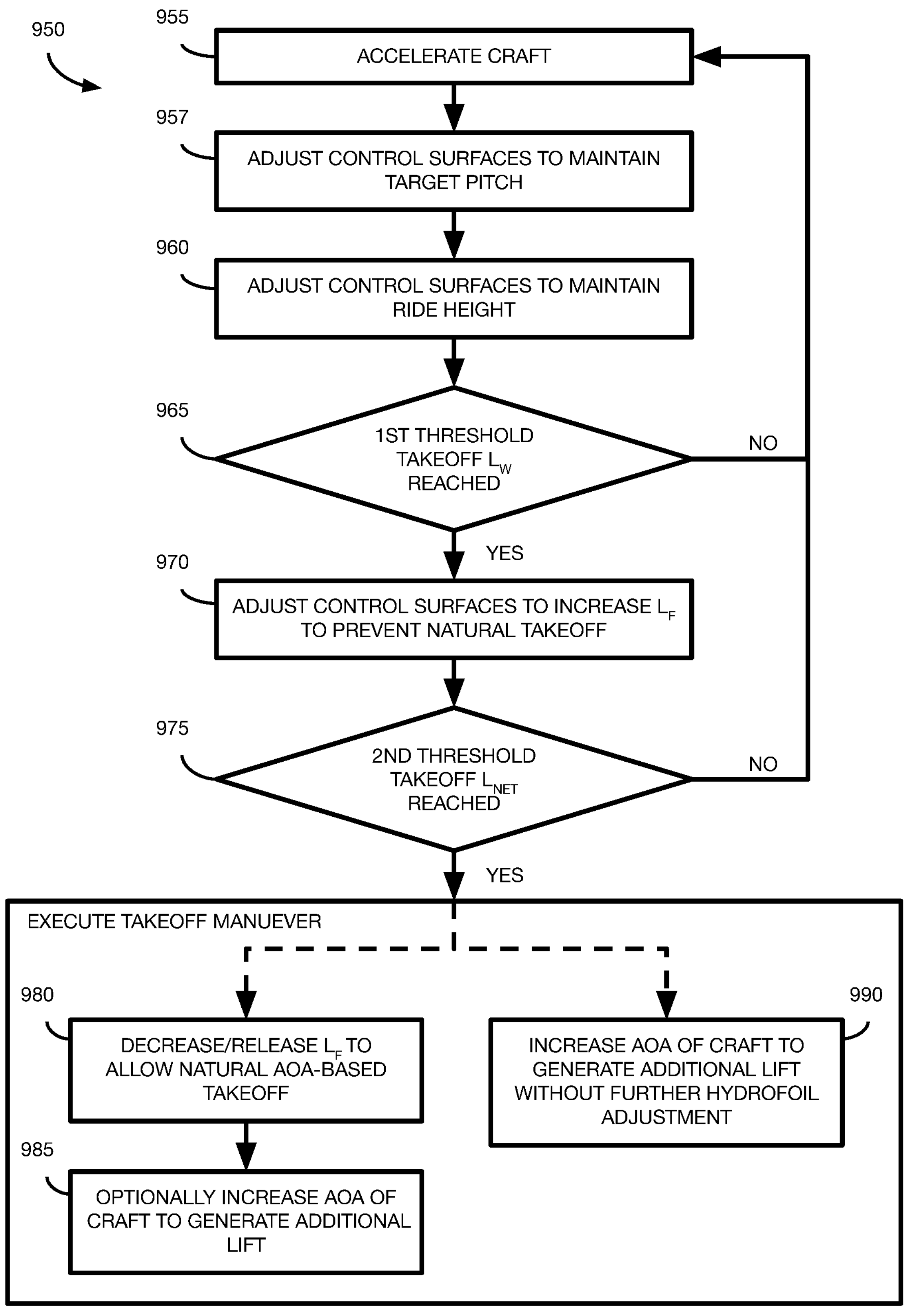
FIG. 9B illustrates additional example operations that facilitate transitioning a craft to a wing-borne mode, in accordance with example embodiments.

FIGS. 9A and 9B illustrate examples of operations 900, 950 performed by the craft 100 when operating in the hydrofoil-borne takeoff mode. In some examples, the control system 500 of the craft 100 is configured to control various components of the craft 100 to facilitate performance, by the craft 100, of these operations.

The operations 900 in FIG. 9A facilitate transitioning the craft 100 to a wing-borne mode of operation without "holding" the craft 100 in the water. That is, the overall lift, $L_F$, generated by the hydrofoils 130, 136 tends to remain in the upward/positive direction so that the craft is not "held" in the water past the point at which the craft 100 can take off based on the natural amount of lift generated by the wings of the craft 100, which will lift the craft 100 out of the water due to the net upwards force.

Referring to FIG. 9A, the operations at block 905 involve accelerating the craft 100. For instance, the propulsion system 508 of the craft 100 is controlled to begin to accelerate the craft 100 to a sufficient speed to transition to wing-borne operation.

The operations at block 907 involve adjusting one or more control surfaces of the craft 100 to achieve and maintain a target pitch or angle of attack of the craft 100 for takeoff. In an example, the target pitch is between about 0-5 degrees. In some examples, the pitch of the craft 100 is actively monitored and controlled to maintain the pitch at the target pitch while craft 100 accelerates. In some examples, one or more control surfaces of one or more of the main hydrofoil 130, the rear hydrofoil 136, and the main wing 104 are adjusted relative to one another to maintain the pitch of the craft 100 at the target pitch as the craft 100 accelerates. The pitch target for the craft 100 while riding on the main hydrofoil 130 and the rear hydrofoil 136 can be actively adjusted to increase or decrease the angle of attack of the aero wing, and thus, control the aero lift, $L_W$. In some examples, this is accomplished by adjusting the control surfaces on the main hydrofoil 130 and/or the rear hydrofoil 136 to create the same lift $L_F$ at a different operational angle of attack The operations at block 910 involve adjusting one or more control surfaces of the craft 100 to maintain the ride height of the craft 100 while in the hydrofoil-borne mode of operation. For instance, as the craft 100 accelerates through the water, the control system 500 is configured to adjust/maintain the ride height of the craft 100 (e.g., the height of the craft 100 above the water surface) by adjusting the respective position (e.g., deflection angles) of the control surfaces 134, 140 of the main hydrofoil 130 and/or rear hydrofoil 136 and/or the overall angle of attack of the main hydrofoil 130 and/or rear hydrofoil 136, as shown and described above with reference to FIGS. 8A-8G. For example, a control surface 134 of the main hydrofoil 130 can be rotated in the upward direction relative to the direction of travel to decrease the lift, $L_F$, generated by the main hydrofoil 130 and can be rotated in the downward direction relative to the direction of travel to increase the lift, $L_F$, generated by the main hydrofoil 130. Similar operations can be performed by the rear hydrofoil 136.

If at block 915, the aero lift, $L_W$, acting on the craft 100 has not reached a threshold level that is sufficient to allow the craft 100 to become wing-borne and sustain wing-borne flight, the operations repeat from block 905. In some examples, the threshold level corresponds to the weight of the craft 100, $W_{CRAFT}$, or a margin above the weight of the craft 100, $W_{CRAFT}$ (e.g., $W_{CRAFT}$+10% to allow the craft to accelerate upwards away from the water's surface). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil 108 (and/or the rear hydrofoil 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If the aero lift, $L_W$, acting on the craft 100 has reached the threshold level to become wing-borne and sustain wing-borne flight, then the operations at block 920 are performed. The operations at block 920 involve allowing the craft 100 to naturally take off based on the pitch that was targeted at block 907. That is, the craft 100 can take off without changing the angle of attack/pitch of the craft 100. In some examples, the articulations of the main hydrofoil 130 and/or rear hydrofoil 136 as configured at block 910 to maintain ride height are maintained as the craft 100 takes off. That is, the respective angles of incidence of the main hydrofoil 130 and/or rear hydrofoil 136, deflection angles of the control surfaces 134, 140 of the main hydrofoil 130 and/or rear hydrofoil 136, etc., are not actively or passively adjusted to different positions as the craft 100 takes off from the water.

Alternatively, at block 925, the angle of attack/pitch of the craft 100 can be actively adjusted to generate additional lift. (See block 985 and description thereof.)

The operations 950 in FIG. 9B facilitate transitioning the craft 100 to the wing-borne mode of operation by actively controlling one or more of the main hydrofoil 130 and rear hydrofoil 136 to generate a negative lift, $L_F$, that "holds" the craft 100 within the water until the aero lift, $L_W$, generated by the wings(s) is sufficient for the craft 100 to become wing-borne and sustain wing-borne flight. The operations 950 can be more clearly understood with reference to the graph 700 in FIG. 7B.

Referring to FIG. 9B, the operations performed at blocks 955-960 are generally the same as those operations performed at blocks 905-910 of FIG. 9A. For example, the operations at block 955 involve accelerating the craft 100 towards a takeoff speed (e.g., 45 mph). The operations at block 957 involve adjusting one or more control surfaces of the craft 100 to maintain a target pitch or angle of attack of the craft 100. In an example, the target pitch is between about 0-5 degrees. The operations at block 960 involve maintaining the ride height of the craft 100 during hydrofoil-borne operation while the craft is accelerating during the process of transitioning from hydrofoil-borne operation to wing-borne operation.

The operations at block 965 involve determining whether the aero lift, $L_W$, generated by the main wing 104 (and/or tail wing, hull, etc.) has reached a threshold level that is sufficient to allow the craft 100 to become wing-borne and sustain the wing-borne mode of operation. In some examples, the threshold level corresponds to the weight of the craft 100, $W_{CRAFT}$, or a margin above the weight of the craft 100, $W_{CRAFT}$, (e.g., $W_{CRAFT}$+10% to accommodate passengers and cargo). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil wing 108 (and/or the rear hydrofoil 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If at block 965, the aero lift, $L_W$, has not reached the threshold level, the operations continue from block 955. The left side of the graph 700 of FIG. 7B (i.e., left of $C_0$) characterizes the state of the various lift forces acting on the craft 100 during the operations performed above. For example, as the craft 100 accelerates, the hydrofoil lift, $L_F$, generated by one or more of the hydrofoils 130, 136 is positive but is controlled to decrease the hydrofoil lift, $L_F$, to counteract increases in the aero lift, $L_W$, generated by the main wing 104. This results in a net lift, $L_{NET}$, that is sufficient to maintain the desired ride height of the craft 100 during hydrofoil-borne operation.

If at block 965, the aero lift, $L_W$, reaches the first threshold level, the operations at block 970 are performed. The operations at block 970 involve generating or increasing the negative lift, $L_F$, generated by one or more of the main hydrofoil 130 and the rear hydrofoil 136 to prevent the craft 100 from becoming wing-borne due to the main wing 104 and other aerodynamic surfaces. For instance, as noted in block 960, as the craft 100 accelerates through the water while hydrofoil-borne, the control system 500 is configured to adjust/maintain the ride height of the craft 100 (e.g., the height of the craft 100 above the water surface) by adjusting control surface deflections of the control surfaces 134, 140 of the main hydrofoil 130 and/or rear hydrofoil 136 and/or the overall angle of attack of the main hydrofoil 130 and/or rear hydrofoil 136, as shown in FIGS. 8A-8G. As the speed of the craft 100 increases and the aero lift, $L_W$, generated by the wing(s) increases beyond the point required to initially achieve wing-borne flight (e.g., the weight of the craft 100, $W_{CRAFT}$), the control system 500 causes one or more of the main hydrofoil 130 and the rear hydrofoil 136 to generate a force in the downward direction to maintain the proper force balance to maintain the desired ride height. At this stage, the deflection of one or more of the control surfaces 134, 140 of the main hydrofoil 130 and/or the rear hydrofoil 136 and/or the overall angle of attack of the main hydrofoil 130 and/or rear hydrofoil 136 are configured to generate an overall negative lift, $L_F$ that "holds" the hydrofoils 130, 136 in the water, thereby forcing the craft 100 to remain hydrofoil-borne despite the wing(s) generating a lift force greater than the weight of the craft, $W_{CRAFT}$, and thus sufficient lift to achieve wing-borne flight.

The portion of the graph 700 of FIG. 7B between $C_0$ and $C_1$ characterizes the state of the various lift forces acting on the craft 100 during the operations performed in block 970. For example, when the speed of the craft 100 reaches the speed greater than condition $C_0$, the aero lift, $L_W$, generated by the main wing 104 equals the weight of the craft, $W_{CRAFT}$. Therefore, the craft 100 should be able to achieve flight. However, the hydrofoil lift, $L_F$, is controlled to generate a negative lift, $L_F$, such that the net lift, $L_{NET}$, acting on the craft 100 keeps the craft 100 in hydrofoil-borne operation. Thus, the craft 100 is "held" in the water by the negative lift, $L_F$ at the desired ride height.

At block 975, if the aero lift, $L_W$, has not reached the second threshold level, the operations continue from block 955. For example, referring to FIG. 7B, if the aero lift, $L_W$, has not reached the lift associated with condition $C_1$, the operations continue from 955. An example of the second threshold level corresponds to the weight of the craft plus some margin (e.g., $W_{CRAFT}$+10% or some other margin). The aero lift, $L_W$, acting on the craft 100 can be determined or inferred as described above with reference to block 965 and the first threshold level.

In some examples, the determination as to whether the threshold above has been passed is based on whether the speed of the craft is a particular margin higher (e.g., 10% higher or some relative amount higher) than the speed of the craft 100 associated with the first threshold level (e.g., from FIG. 7B, condition $C_1$). In some examples, the determination as to whether the threshold above has been passed is based on the amount of time that has elapsed since the first threshold was passed (e.g., 10 seconds later after the first threshold passed). In some examples, the determination that the second threshold level has been reached is based on an indication from an operator (e.g., the pilot) of the craft 100. That is, the operator can override any other determinations and indicate to the control system 500 whether the second threshold level has or has not been reached.

If at block 975, the aero lift, $L_W$, has reached the second threshold level, final takeoff operations are performed. Some examples of the final takeoff operations include the operations at block 980 and block 985. The operations at block 980 involve decreasing the negative lift, $L_F$, generated by one or more hydrofoils of the craft 100. That is, the "hold" is gradually, passively, or abruptly released. In some examples, this involves actively controlling the deflection angles of one or more of the control surfaces 134, 140 of the main hydrofoil 130 and/or the rear hydrofoil 136 and/or the overall angle of attack of the main hydrofoil 130 and/or rear hydrofoil 136 to gradually decrease the overall negative lift, $L_F$. In some examples, this involves removing all control of the deflection angles of one or more of the control surfaces 134, 140 of the main hydrofoil 130 and/or the rear hydrofoil 136 and/or the overall angle of attack of the main hydrofoil 130 and/or rear hydrofoil 136 to allow these components to passively move to their respective natural states to decrease the overall negative lift, $L_F$. In some embodiments, allowing these hydrofoil components to passively move to their natural states to decrease the overall negative lift includes gradually reducing the power applied to the electric actuators that control the positions of the hydrofoil components.

The portion of the graph 700 of FIG. 7B where to the right of condition $C_1$ characterizes the state of the various lift forces acting on the craft 100 during the operations performed in block 980. For example, when the speed of the craft 100 reaches the speed associated with condition $C_1$, the aero lift, $L_W$, generated by the main wing 104 is more than sufficient to achieve sustained wing-borne flight. As such, the negative lift, $L_F$, generated by one or more of the hydrofoils is gradually (in a controlled manner), naturally/passively, or abruptly (in a controlled manner) reduced to zero such that the net lift, $L_{NET}$, acting on the craft 100 becomes equal to the aero lift, $L_W$, and the craft 100 becomes wing-borne.

Additionally, at block 985, the angle of attack/pitch of the craft 100 can be actively adjusted to generate additional lift. In this regard, in some examples, in addition to (or as an alternative to) gradually, passively, or abruptly releasing the "hold" generated by the one or more hydrofoils of the craft 100, the angle of attack/pitch of the craft 100 can be actively adjusted to generate sufficient lift to overcome the "hold" created by the negative lift, $L_F$, of the hydrofoil to bring the craft 100 airborne. In this regard, in some examples, once the control system 500 determines that the craft 100 has reached the desired takeoff speed or desired main wing lift has been achieved, the control system 500 deploys the flaps 118 (and the ailerons 120 if configured as flaperons), causing the main wing 104 to generate additional lift. In some examples, the control system 500 additionally actuates the rear hydrofoil control surfaces 140 and/or the elevators 126 to pitch the craft 100 upward and increase the angle of attack of the main wing 104 and the hydrofoil assemblies 108, 110. In this configuration, the main wing 104 and hydrofoil assemblies 108, 110 create enough lift to accelerate the craft 100 upwards until the hydrofoil assemblies 108, 110 breach the surface of the water and the entire weight of the craft 100 is supported by the lift of the main wing 104.

In some examples, when performing this transition from hydrofoil-borne operation to wing-borne operation, the control system 500 quickly deploys the flaps 118 (and the ailerons 120 if configured as flaperons) over a very short period of time (e.g., in less than 1 second, less than 0.5 seconds, or less than 0.1 seconds). Quickly deploying the flaps 118 (and ailerons 120) in this manner creates even further additional lift on the main wing 104 that helps "pop" the craft 100 out of the water and into wing-borne operation.

Additionally, in some examples, during the transition from hydrofoil-borne operation to wing-borne operation, the control system 500 actuates various control surfaces of the craft 100 to balance moments along the pitch axis. For instance, the propeller assemblies 116, the flaps 118, and the drag from the hydrofoil assemblies 108, 110 all generate nose-down moments around the center of gravity about the pitch axis during the transition. To counteract these forces, in some examples, the control system 500 deploys the elevator 126, and the rear hydrofoil control surfaces 140 to generate a nose-up moment and stabilize the craft 100.

Alternative examples of the final takeoff operations that do not involve releasing the "hold" described in block 980 are described in block 990.

The operations at block 990 involve maintaining the negative lift, $L_F$, generated by one or more hydrofoils 130, 136 of the craft 100. That is, rather than releasing the "hold" (as described in block 980), the respective articulations of the main hydrofoil 130 and/or the rear hydrofoil 136 (e.g., the deflection angles of the control surfaces 134, 140, the angles of incidence of the main hydrofoil 130 and/or the rear hydrofoil 136, etc.) are maintained. As the craft 100 accelerates, the lift, $L_F$, generated by the hydrofoils 130, 136 reaches a constant/steady downward force that is maintained for the remainder of the takeoff procedure (e.g., the summation of the aero lift, $L_W$, the weight of the craft, $W_{CRAFT}$, and the hydrofoil lift, $L_F$, equal zero). In an example, the "steady" downward hydrofoil lift, $L_F$, is effectively a "maximum" amount of downward hydrofoil lift, $L_F$, that is possible to be applied as a result of the control capabilities of the hydrofoils 130, 136. This conceptually means that the ride height of the craft 100 is maintained up to the point of takeoff. As ride height is maintained and the craft 100 is "held" in the water as speed is increased and aero lift, $L_W$, on the wings is increased, until the ability to apply further maintenance/downward hydrofoil lift, $L_F$, is "saturated."

At this stage, continued acceleration of the craft 100 causes a natural increase (e.g., without further articulation of the main wing control surfaces) in the aero lift, $L_W$, and, therefore, the angle of attack of the craft 100. The gradual increasing of the angle of attack of the craft 100 further contributes to the "saturation" of the downward lift, $L_F$. That is, the downward lift, $L_F$, is reduced as the angle of attack of the craft 100 increases.

In some examples, the angle of attack of the craft 100 is actively adjusted to generate additional lift as described above in block 985. The increase in the angle of attack of the craft 100 causes the craft to rise without further increasing the downwards lift, $L_F$, generated by the hydrofoils 130, 136.

FIG. 10 is a table 1000 that summarizes some examples of the procedures described above and in FIGS. 9A and 9B that facilitate foil-borne takeoff operations and the ways in which different components of the craft 100 can be used in these procedures to facilitate foil-borne takeoff operations. All the procedures generally involve maintaining the ride height of the craft 100 using the control surfaces 134, 140 of one or more of the hydrofoils 130, 136 as the craft 100 accelerates (e.g., FIG. 9A, block 907).

In procedure (A), downwards lift, $L_F$, is not introduced using the control surfaces 134, 140 of the hydrofoils 130, 136 or by adjusting the angle of attack of the hydrofoils 130, 136. In this procedure, the speed of the craft 100 is increased using the aero lift, $L_W$, generated by one or more wings of the craft 100 until the aero lift, $L_W$, is greater than the weight, $W_{CRAFT}$, of the craft 100 (e.g., FIG. 9A, block 905-915). At that point, the craft 100 can "naturally" take off without otherwise increasing the angle of attack and/or pitch of the craft 100 because the aero lift, $L_W$, alone is greater than the weight of the craft (e.g., FIG. 9A, block 920).

In procedure (B), downwards lift, $L_F$, is introduced using one or more control surfaces 134, 140 of one or more hydrofoils 130, 136 of the craft, but the angle of attack of the hydrofoils 130, 136 is fixed (e.g., FIG. 9B, block 960). In this procedure, as the craft 100 accelerates, aero lift, $L_W$, is generated by one or more of the wings. When the aero lift, $L_W$, exceeds the weight, $W_{CRAFT}$, of the craft 100, the control surfaces 134, 140 of the hydrofoils 130, 136 are adjusted to introduce a downwards lift, $L_F$, or "extended hold" that holds the hydrofoils 130, 136 in the water (e.g., FIG. 9B, blocks 970-975). In some examples, when the perceived aero lift, $L_W$, generated by the wings reaches a desired threshold (e.g., above "natural" takeoff lift by some margin), the hold on the hydrofoils 130, 136 is "released" by adjusting the control surfaces 134, 140 of the hydrofoils 130, 136 to reduce the downward lift, $L_F$, and takeoff is permitted to proceed (e.g., FIG. 9B, block 980). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (C) is similar to procedure (B), except that the pitch of the craft 100 is increased during takeoff to generate additional upwards lift (e.g., FIG. 9B, block 985).

In procedure (D), downwards lift, $L_F$, is introduced using one or more of the control surfaces 134, 140 of one or more of the hydrofoils 130, 136 and by adjusting the angle of attack of one or more of the hydrofoils 130, 136 (e.g., FIG. 9B, block 960). In this procedure, as the craft accelerates, aero lift, $L_W$, is generated by the wings. When the aero lift, $L_W$, exceeds the weight, $W_{CRAFT}$, of the craft 100, one or more of the control surfaces 134, 140 and the angles of attack of one or more of the hydrofoils 130, 136 are adjusted to introduce a downwards lift, $L_F$, that holds the hydrofoils 134, 140 in the water (e.g., FIG. 9B, blocks 970-975). In some examples, the perceived aero lift, $L_W$, generated by the wings reaches a desired threshold (e.g., above "natural" takeoff lift by some margin), the hold on the hydrofoils 130, 136 is passively "released" by allowing the control surfaces 134, 140 of the hydrofoils 130, 136 and the angles of attack of the hydrofoils 130, 136 to passively return to their respective natural positions (e.g., FIG. 9B, block 980). This, in turn, reduces the downward lift, $L_F$, and takeoff is permitted to proceed. The procedure may further involve increasing the pitch of the craft 100 afterward to generate additional upwards lift (e.g., FIG. 9B, block 985). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (E) is similar to procedure (D) except that when the perceived aero lift, $L_W$, generated by the wings reaches a desired threshold (e.g., above "natural" takeoff lift by some margin), the hold on the hydrofoils 130, 136 is actively "released" in a controlled manner by controlling the control surfaces 134, 140 of the hydrofoils 130, 136 and the angles of attack of the hydrofoils 130, 136 to gradually or abruptly return to their respective natural positions (e.g., FIG. 9B, block 980, such as zero deflection).

In some of the procedures above, the downwards lift, $L_F$, that "holds" the craft 100 in the water is released when the aero lift, $L_W$, reaches a particular takeoff threshold. In some other examples, the articulation of the hydrofoils 130, 136

(e.g., the control surfaces 134, 140, respective angles of incidence, etc.) may not be released. In these examples, the amount of downward hydrofoil lift, $L_F$, that can be generated by the hydrofoils 130, 136 eventually saturates (e.g., reaches a maximum amount).

In some examples, continued acceleration of the craft 100 causes a natural increase (e.g., without further articulation of the main wing control surfaces) in aero lift, $L_W$, and, therefore, the angle of attack of the craft 100. The gradual increasing of the angle of attack of the craft 100 contributes to further "saturation" of the downward hydrofoil lift, $L_F$, as the craft takes off from the water. In some examples, the angle of attack of the craft 100 is actively adjusted to generate additional aero lift, $L_W$.

In some examples, when $L_W$ is greater than the weight, $W_{CRAFT}$, of the craft 100, the downward hydrofoil lift, $L_F$, is released by initiating ventilation of one or more of the hydrofoils 130, 136 which creates a loss of downward lift, $L_F$, allowing the craft 100 to take off.

D. Wing-Borne Operation

Figure 11:
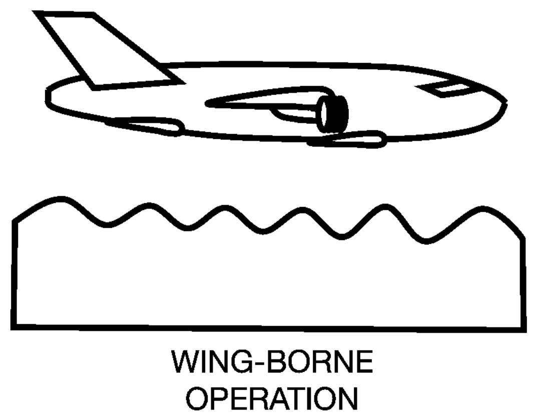
FIG. 11 illustrates a craft in a wing-borne mode of operation, in accordance with example embodiments.

FIG. 11 illustrates an example of the craft 100 after becoming wing borne. In some examples, once the transition from hydrofoil-borne operation to wing-borne operation is complete, the control system 500 causes the main hydrofoil deployment system 200 and the rear hydrofoil deployment system 300 to respectively retract the main hydrofoil assembly 108 and the rear hydrofoil assembly 110. In some examples, the control system 500 initiates this retraction as soon as the hydrofoil assemblies 108, 110 are clear of the water to reduce the chance of the hydrofoil assemblies 108, 110 reentering the water. The control system 500 may determine that the hydrofoil assemblies 108, 110 are clear of the water in various ways. For instance, in an example, the control system 500 makes such a determination based on a measured altitude of the craft 100 (e.g., based on data provided by the radar system 516, the lidar system 518, and/or the other sensors 522 described above for measuring an altitude of the craft 100). In another example, the sensors 522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water-based on data from these sensors.

Once the craft 100 is clear of the water, the control system 500 continues to accelerate the craft 100 to the desired cruise speed by controlling the speed of the propeller systems 116. In some examples, the control system 500 retracts the flap systems when the craft 100 has achieved sufficient airspeed to generate enough lift to sustain altitude without them and actuates various control surfaces of the craft 100 and/or applies differential thrust to the propeller systems 116 to perform any desired maneuvers, such as turning, climbing, or descending, and to provide efficient lift distribution. While in wing-borne mode, the craft 100 can fly both low over the water's surface in ground-effect or above ground-effect depending on operational conditions and considerations.

E. Return to Hull-Borne Operation

In some examples, to facilitate transitioning from wing-borne to hull-borne mode of operation (See FIG. 6A), the control system 500 determines that the hydrofoil assemblies 108, 110 are fully or partially retracted so that the craft 100 may safely land on its hull 102. In some examples, the control system 500 additionally determines and suggests the desired landing direction and/or location-based on observed, estimated, or expected water surface conditions (e.g., based on data from the radar system 516, the lidar system 518, the imaging system 520, or other sensors 522).

The control system 500 initiates deceleration of the craft 100, for instance, by reducing the speeds of the propeller systems 116 until the craft 100 reaches a desired landing airspeed. During the deceleration, the control system 500 may deploy the flaps 118 to increase lift at low airspeeds and/or to reduce the stall speed. Once the craft 100 reaches the desired landing airspeed (e.g., approximately 50 knots), the control system 500 reduces the descent rate (e.g., to be less than approximately 200 ft/min). As the craft 100 approaches the surface of the water (e.g., once the control system 500 determines that the craft 100 is within 5 feet of the water surface), the control system 500 further slows the descent rate to cushion the landing (e.g., to be less than approximately 50 ft/min). As the hull 102 of the craft 100 impacts the surface of the water, the control system 500 reduces thrust, and the craft 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the craft 100 is stationary.

In some examples, after the craft 100 is settled in the water, the craft 100 is transitioned back to hydrofoil-borne maneuvering mode (See FIG. 6B) by extending the hydrofoil assemblies 108, 110 to transition from hull-borne operation to hydrofoil-borne operation in the same manner as described above. In some examples, the control system 500 then sustains the hydrofoil-borne mode at the fifth stage and maneuvers the craft 100 into port while keeping the hull 102 insulated from surface waves. The control system 500 then reduces the thrust generated by the propeller assemblies 116 to lower the speed of the craft 100 until the hull 102 settles into the water, thereby transitioning that craft back to hull-borne operation at the sixth stage. The control system 500 then retracts the hydrofoil assemblies 108, 110 and performs the hull-borne operations described above to maneuver the craft 100 into a dock for disembarking passengers or goods and recharging the battery system 400.

Figure 16:
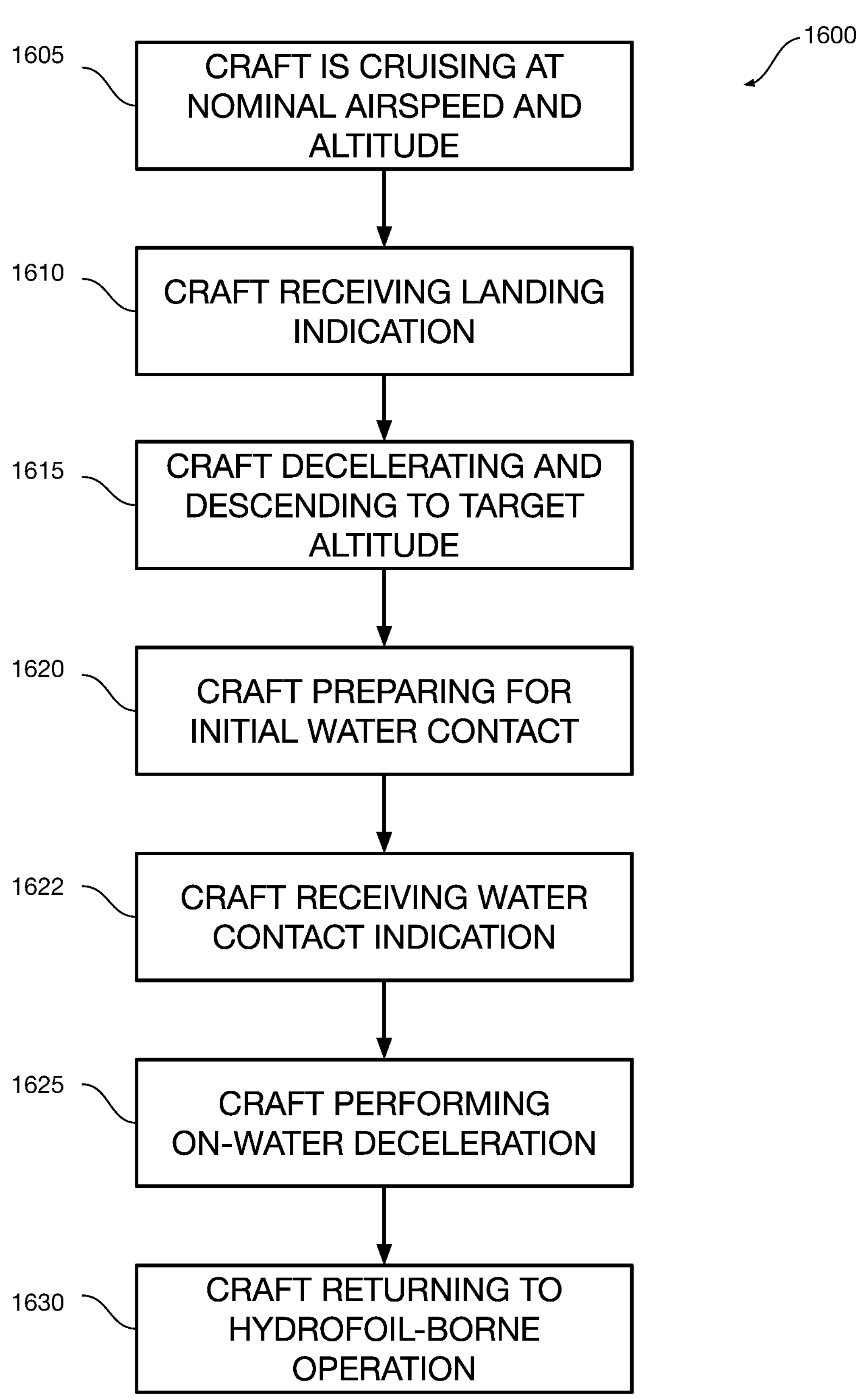
FIG. 16 illustrates operations performed by the craft that reduce forces and stresses acting on the craft when landing, in accordance with example embodiments.
Figure 17:
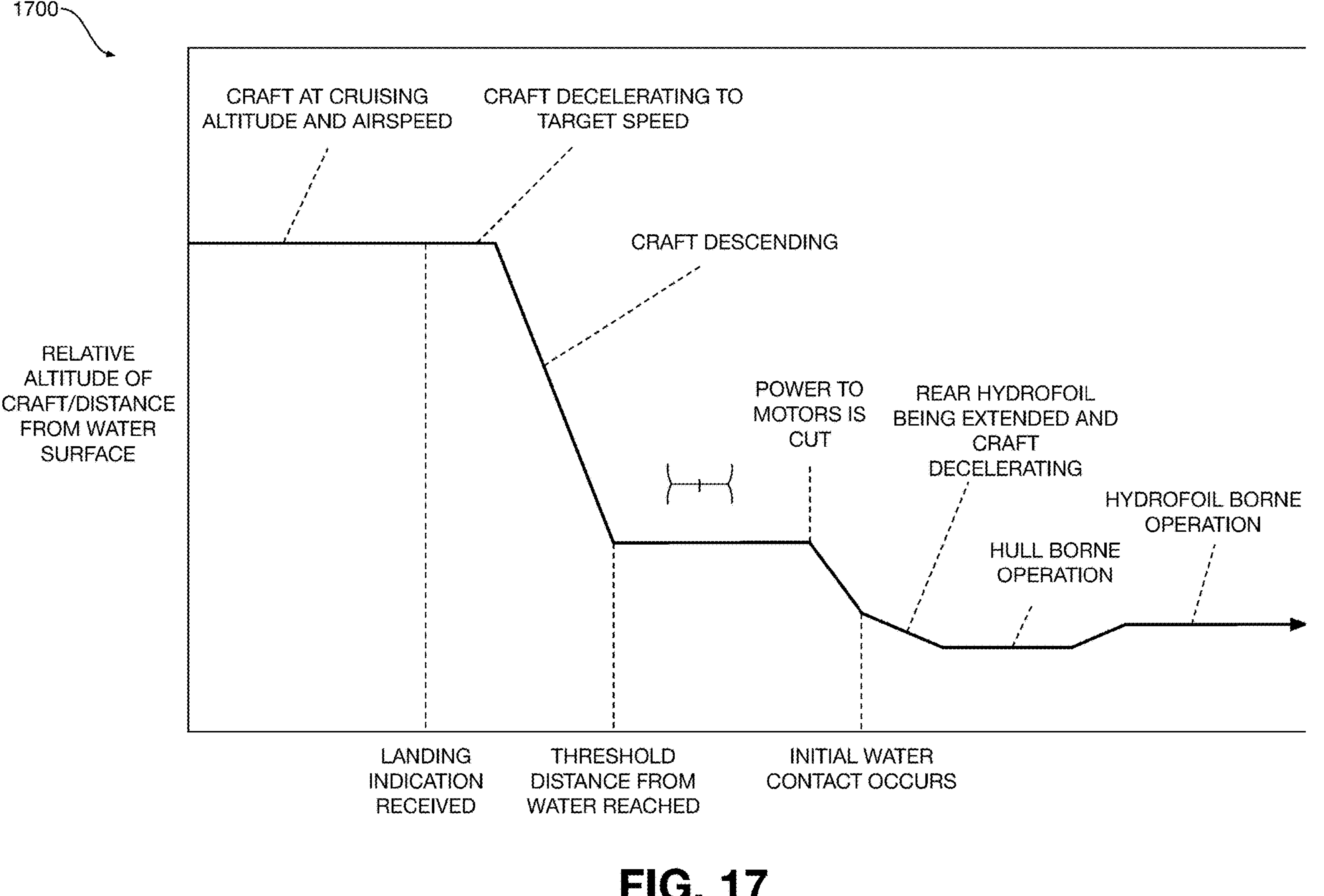
FIG. 17 illustrates a profile that represents the craft's altitude/distance above the water surface during the different modes of operations, in accordance with example embodiments.
Figure 18:
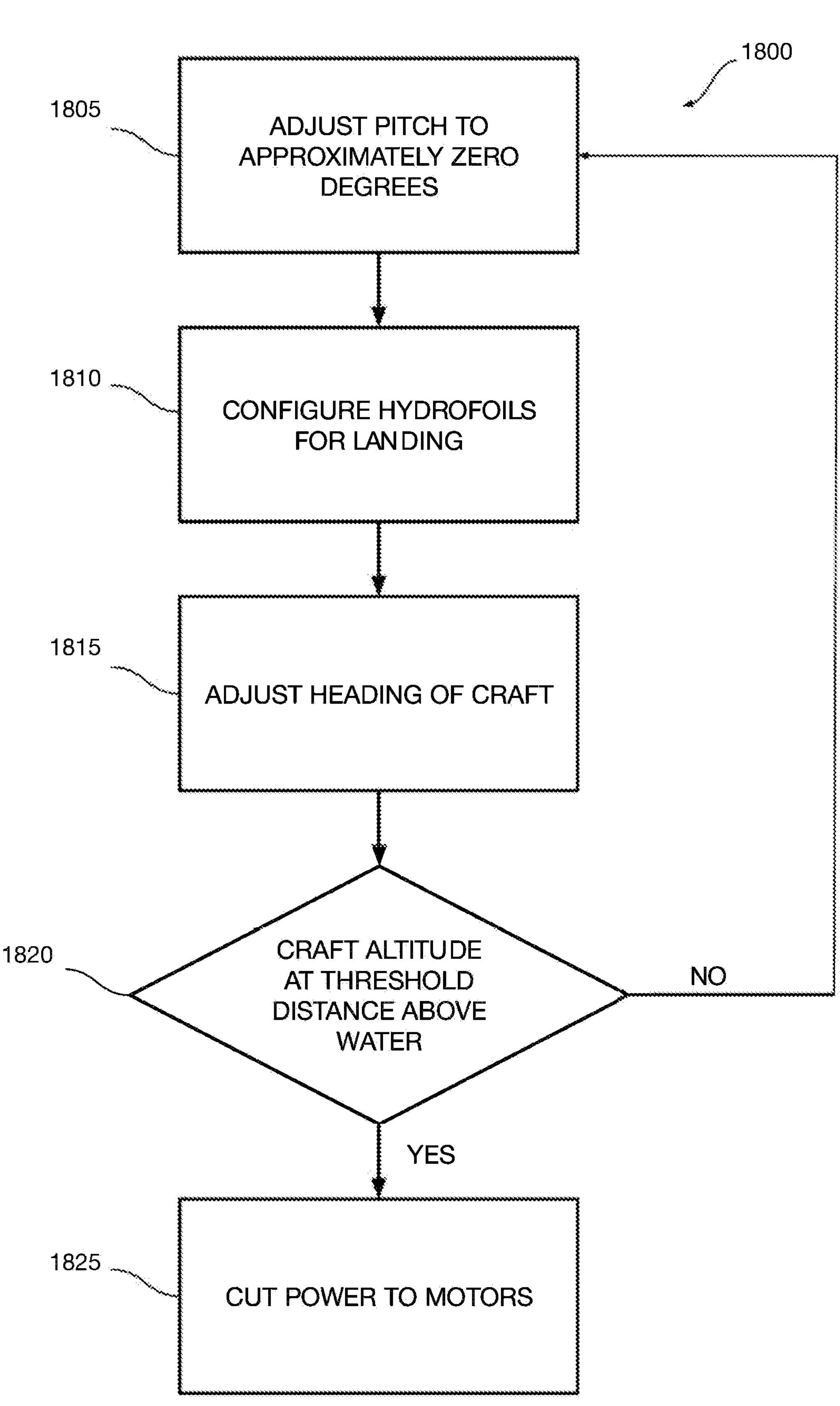
FIG. 18 illustrates operations performed by the craft when preparing for initial contact with water, in accordance with example embodiments.

Additional examples of operations that facilitate transitioning the craft from wing-borne to hull-borne mode of operation are described under the section Airborne to Hydrofoil-borne Transitioning of WIG Craft, and with respect to FIGS. 16-18.

IV. Examples of Hydrofoil-borne to Wing-borne Transitioning Operations

Figure 12:
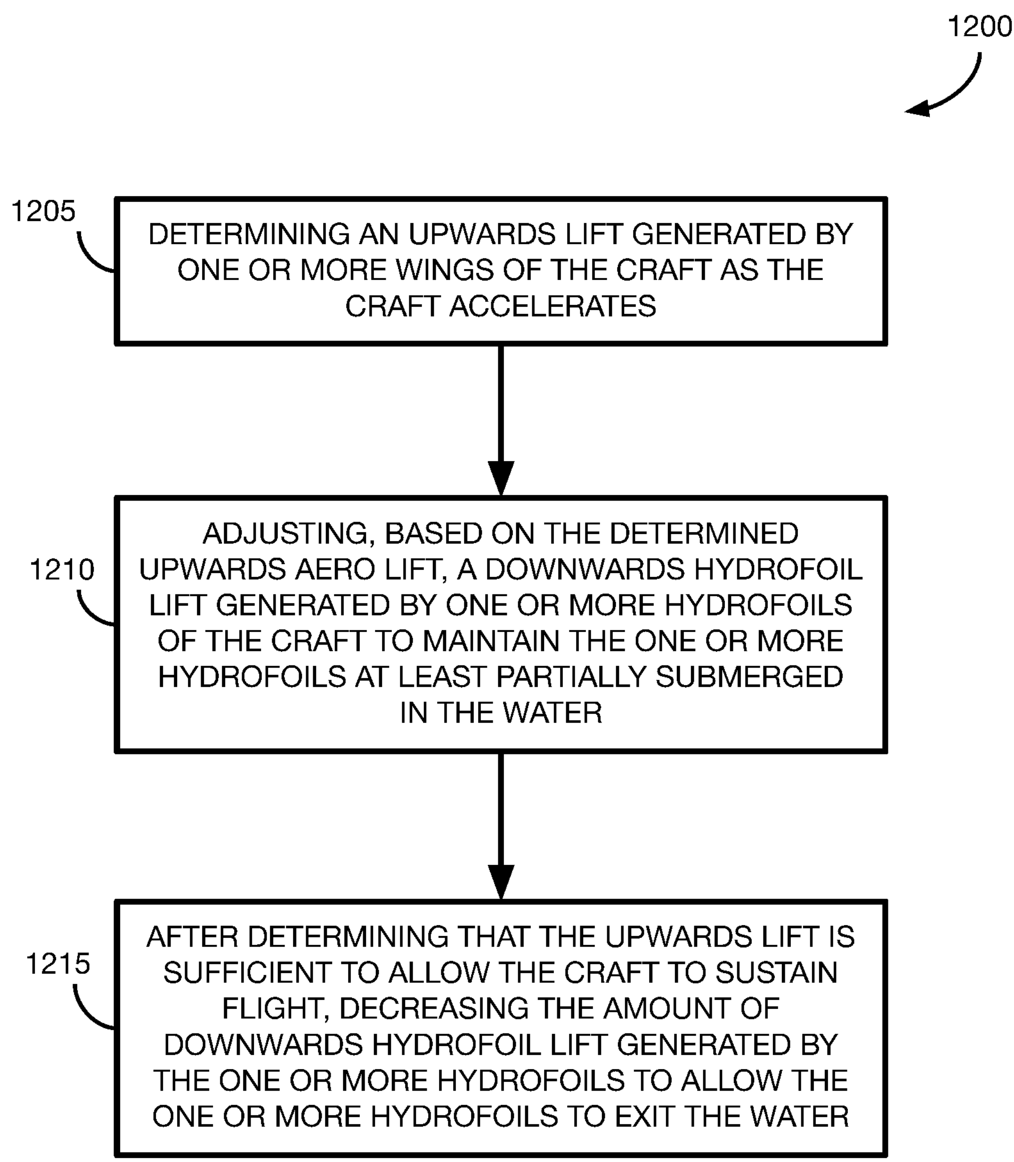
FIG. 12 illustrates example operations performed by a craft, in accordance with example embodiments.

FIG. 12 illustrates examples of operations 1200 that facilitate operating a craft 100 according to some embodiments, including operating the craft 100 to facilitate transitioning from hydrofoil-borne to wing-borne modes. In some embodiments, a control system of the craft (e.g., control system 500) performs one or more of the functions shown in FIG. 12.

The operations at block 1205 involve determining upwards aero lift (FIG. 7A, $L_W$), generated by one or more wings 104 of the craft 100 as the craft 100 accelerates over the water while the craft 100 is in hydrofoil-borne operation. (See also FIG. 9B, block 965 and description thereof).

The operations at block 1210 involve adjusting, based on the determined upwards aero lift, $L_W$, downwards hydrofoil lift (FIG. 7A, $L_F$) generated by one or more hydrofoils 130, 136 of the craft 100 to maintain the one or more hydrofoils 130, 136 at least partially submerged in the water, thereby causing the craft 100 to remain in a hydrofoil-borne maneuvering mode of operation (FIG. 6B) despite upwards aero lift, $L_W$, generated by the wing(s) 104 that would otherwise cause the hydrofoil(s) 130, 136 to breach the surface of the water and the craft 100 to become wing-borne. (See also FIG. 9B, block 970; FIG. 10, procedures B-E; and description thereof).

The operations at block 1115 involve, after determining that the upwards aero lift, $L_W$, generated by the wing(s) 104 is sufficient to allow the craft 100 to sustain flight, decreasing the amount of downwards hydrofoil lift, $L_F$, generated by the hydrofoil(s) 130, 136 to allow the hydrofoil(s) 130, 136 to exit the water. (See also FIG. 9B, block 975; FIG. 10, procedures B-E; and description thereof).

In some examples, adjusting the downwards hydrofoil lift, $L_F$, generated by the hydrofoil(s) 130, 136 involves adjusting the downwards hydrofoil lift, $L_F$, generated by the hydrofoil(s) 130, 136 to both (i) allow the hull of the craft 100 to lift above the water as the craft 100 accelerates and (ii) maintain the hydrofoil(s) 130, 136 at least partially submerged in the water, thereby causing the craft 100 to remain in the hydrofoil-borne maneuvering mode of operation. (See also FIG. 9B, block 960; FIG. 10, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 in proportion to an increase in the upwards aero lift, $L_W$, generated by the wing(s) 104. (See also FIG. 9B, block 970; FIG. 10, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 to maintain a ride height of the craft 100.

In some examples, determining the upwards aero lift, $L_W$, generated by the wing(s) 104 involves determining a speed of the craft 100 and determining the upwards aero lift, $L_W$, generated by the wing(s) 104 based at least in part on the determined speed of the craft 100. (See also FIG. 9B, blocks 965 and 975; FIG. 10, procedures B-E; and description thereof).

In some examples, determining the upwards aero lift, $L_W$, generated by the wing(s) 104 involves determining an angle of attack of the wing(s) 104 and determining the upwards aero lift, $L_W$, generated by the wing(s) based at least in part on an angle of attack of the wing(s) 104. (See also FIG. 9B, blocks 965 and 975 and description thereof).

In some examples, determining the upwards aero lift, $L_W$, generated by the wing(s) 104 involves determining the angle of attack of one or more hydrofoils 130, 136, respective defections of one or more control surfaces 134, 140 of the one or more hydrofoils 130, 136, a water speed of the craft 100, and a density of water in which the craft 100 is moving.

In some examples, determining the upwards aero lift, $L_W$, generated by the wing(s) 104 involves determining a sensed load force on the hydrofoil(s) 130, 136 and determining the upwards aero lift, $L_W$, generated by the wing(s) 104 based at least in part on a sensed load force on the hydrofoil(s) 130, 136. (See also FIG. 9B, blocks 965 and 975 and description thereof).

In some examples, one or more of the hydrofoils 130, 136 comprise one or more flaperons and/or ailerons and/or elevators. In some of these examples, adjusting the downwards hydrofoil lift, $L_F$, generated by the hydrofoil(s) 130, 136 involves adjusting the respective deflections of the one or more flaperons and/or ailerons and/or elevators to thereby control the downwards hydrofoil lift, $L_F$, generated by the hydrofoil(s) 130, 136. (See also FIG. 9B, block 970; FIG. 10, procedures B-E; and description thereof).

In some examples, one or more of the hydrofoils 130, 136 are moveable. Some of these examples involve extending the hydrofoil(s) 130, 136 below the hull of the craft 100 for submersion in the water and at least partially retracting the hydrofoil(s) 130, 136 into the hull of the craft 100 after the craft is wing-borne. (See FIG. 10 and description thereof).

In some examples, respective angles of incidences of the one or more of the hydrofoils 130, 136 are adjustable. (See FIGS. 8D-8G and description thereof).

In some examples, adjusting the downwards hydrofoil lift, $L_F$, generated by the hydrofoil(s) 130, 136 involves adjusting an angle at which the hydrofoil(s) 130, 136 extends below the hull to thereby control the downwards hydrofoil lift, $L_F$, generated by the hydrofoil(s) 130, 136. (See also FIG. 9B, block 970; FIG. 10, procedures D-E; and description thereof).

V. Additional Examples of Hydrofoil-borne to Airborne Transitioning of Craft

As explained above, when the rear hydrofoil remains in the water after the front hydrofoil leaves the water during some of the takeoff procedures described herein, drag on the rear hydrofoil caused by the movement of the rear hydrofoil through the water along with upward hydrofoil lift (if any) generated by the rear hydrofoil tends to generate a pivot effect that exerts a downward force on the front of the craft. As a result, pitching the front of the craft upward and increasing the angle of attack (AOA) to increase the aero lift generated by the wings tends to additionally (and undesirably) increase the downward force on the front of the craft caused by the rear hydrofoil drag and any upward hydrofoil lift generated by the rear hydrofoil. This effect tends to increase the lift force required to transition from hydrofoil-borne operation to wing-borne operation. And if this additional force on the craft is large enough to offset the lift generated by the wing ($L_W$), the front of the craft falls back down into the water, thereby disrupting and/or frustrating (and in many cases preventing) the craft from successfully transitioning from hydrofoil-borne operation to wing-borne operation.

To overcome (or at least ameliorate) aspects of the above-described problem of rear hydrofoil drag (individually or perhaps in combination with upward hydrofoil lift generated by the rear hydrofoil) tending to generate a pivot effect that pulls the front of the craft back down into the water in situations where the rear hydrofoil remains in the water after the front hydrofoil leaves the water while attempting to transition from hydrofoil-borne operation to wing-borne operation, some embodiments additionally include coordinated control of both the front and rear hydrofoils to effectuate transitioning the craft from hydrofoil-borne operation to wing-borne operation. Additionally, this coordinated control of both the front and rear hydrofoils in some embodiments may additionally help overcome problems arising from scenarios where the rear hydrofoil leaves the water before the front hydrofoil, which can in some instances cause the craft to pivot downward into the water, thereby frustrating takeoff.

In particular, in addition to controlling one or both of the front and/or rear hydrofoils to generate downward hydrofoil lift ($-L_F$) as described above, some embodiments also include further controlling the rear hydrofoil in coordination with the front hydrofoil such that the downward hydrofoil lift generated by the rear hydrofoil is "released" together with a "release" of the downward hydrofoil lift generated by the front hydrofoil during takeoff. In some embodiments, this coordinated "release" of the downward hydrofoil lift generated by the front and rear hydrofoils may include or otherwise result in one or both of the front hydrofoil or the rear hydrofoil operating individually or in concert to "push" the rear of the craft up and out of the water to effectuate the transition from hydrofoil-borne operation to wing-born operation.

Figure 13:
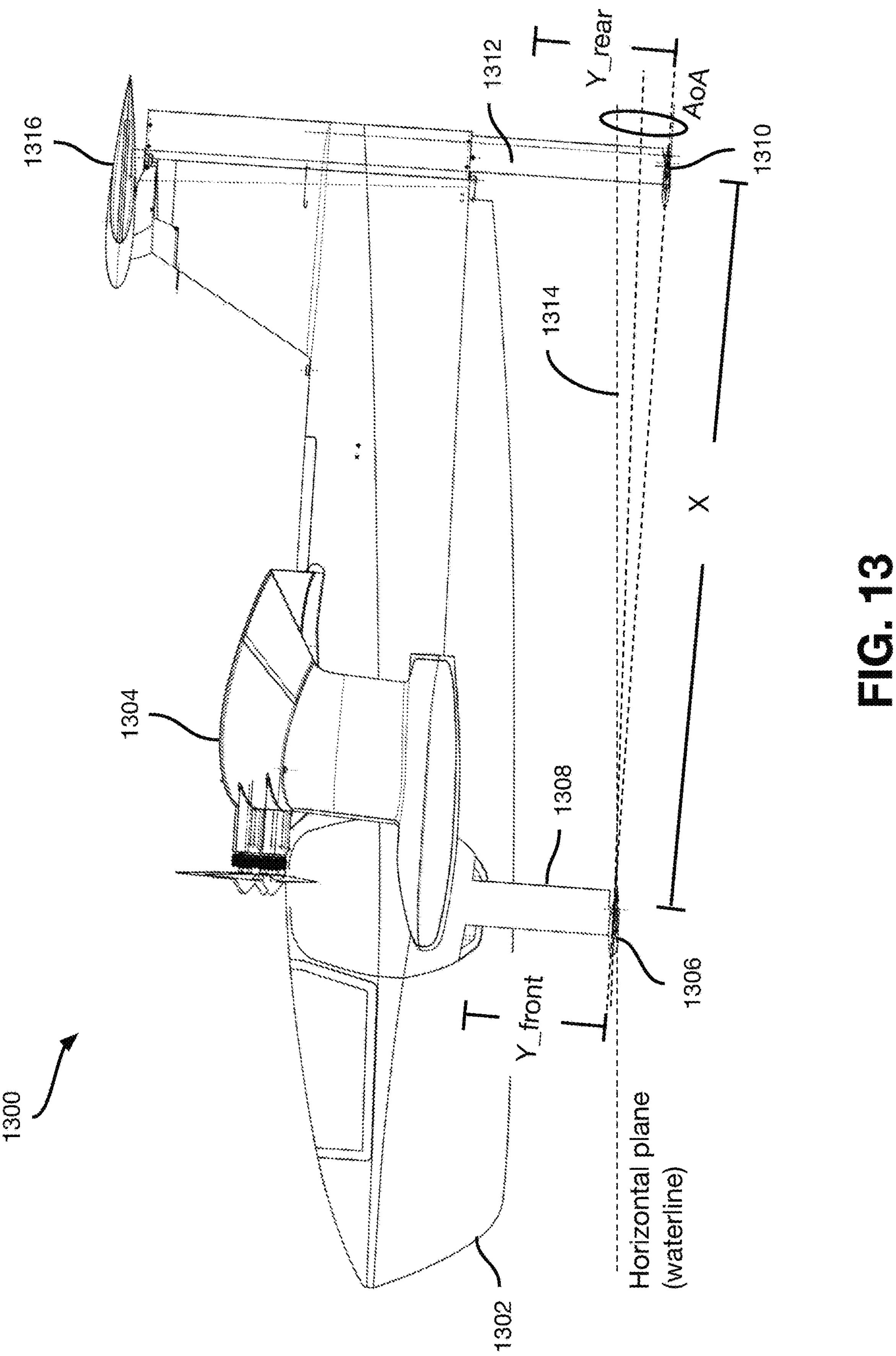
FIG. 13 illustrates aspects of transitioning an example craft from hydrofoil-borne operation to wing-borne operation according to some embodiments.

FIG. 13 illustrates aspects of transitioning an example WIG craft 1300 from hydrofoil-borne operation to wing-borne operation according to some embodiments. Although FIG. 13 shows a WIG craft 1300, aspects of the disclosed embodiments are equally applicable to other craft that are designed to take off while hydro foiling.

Craft 1300 is the same as or similar to the other crafts disclosed and described herein. Craft 1300 includes a hull 1302 and a wing 1304 configured to generate upward aero lift as air flows past the wing 1304 to facilitate wing-borne flight of the craft 1300.

Craft 1300 also includes a front hydrofoil 1306 and a rear hydrofoil 1310. The front hydrofoil 1306 is connected to the hull 1302 via one or more front hydrofoil strut(s) 1308 and configured to generate upward hydrofoil lift as water flows past the front hydrofoil 1306 to facilitate hydrofoil-borne movement of the craft 1300 through the water 1314. And the rear hydrofoil 1310 is connected to the hull 1302 via one or more rear hydrofoil strut(s) 1312 and configured to generate upward hydrofoil lift as water flows past the rear hydrofoil 1310 to facilitate hydrofoil-borne movement of the craft 1300 through the water 1314. The front hydrofoil 1306 and rear hydrofoil 1310 are the same as or similar to other hydrofoils disclosed and described herein. For example, each of the front hydrofoil 1306 and rear hydrofoil 1310 include one or more hydrofoil surfaces, such as flaps or other foil surfaces that are articulatable to generate upward hydrofoil lift and/or downward hydrofoil lift, depending on how the control surfaces are positioned relative to the flow of water past the hydrofoil.

Craft 1300 also includes a control system (not shown) configured to facilitate transition of the craft from hydrofoil-borne operation to wing-borne operation. The control system is the same as or similar to the craft control systems disclosed herein, including but not limited to the control systems described with reference to FIG. 5.

While the craft 1300 is hydrofoil-borne and the upward aero lift generated by the wing 1304 is below a threshold lift, the control system controls one or both of the front hydrofoil 1306 and the rear hydrofoil 1310 to generate a downward hydrofoil lift that causes the front hydrofoil 1306 and the rear hydrofoil 1310 to remain at least partially submerged below the water 1314 as described earlier. In operation, the threshold lift corresponds to a lift that is at least sufficient to enable the craft 1300 to transition from hydrofoil-borne movement through the water to sustained wing-borne flight, but the threshold lift could be greater than the minimum lift sufficient to enable the craft 1300 to transition from hydrofoil-borne movement through the water to sustained wing-borne flight.

After the upward aero lift generated by the wing 1304 has increased above the threshold lift, the control system facilitates transitioning the craft 1300 from hydrofoil-borne operation to wing-borne operation at least in part by controlling the front hydrofoil 1306 and the rear hydrofoil 1310 to "release" their respective downward hydrofoil lifts in a coordinated fashion. Releasing the downward hydrofoil lift forces that the front and rear hydrofoils 1306, 1310 generate to hold the craft 1300 in the water 1314 while the upward aero lift force generated by the wing 1304 increases to above the threshold lift enables the upward aero lift force generated by the wing 1304 to facilitate transitioning the craft 1300 from hydrofoil-borne operation to wing-borne flight.

For example, in some embodiments, the control system causes the front hydrofoil 1306 to "release" the corresponding downward hydrofoil lift at about the same time that the rear hydrofoil 1310 "releases" its corresponding downward hydrofoil lift (or vice versa). In some embodiments, coordinated release of the corresponding downward hydrofoil lift forces generated by the front and rear hydrofoils 1306, 1310 includes one of (i) a gradual release of the downward hydrofoil lift forces being generated by the front and rear hydrofoils 1306, 1310 or (ii) a quick release of the downward hydrofoil lift forces being generated by the front and rear hydrofoils 1306, 1310.

In some embodiments, a coordinated gradual release of the downward hydrofoil lift forces generated by the front and rear hydrofoils 1306, 1310 enables the upward aero lift force generated by the wing 1304 to gradually lift the craft 1300 up and out of the water 1314 to transition from hydrofoil-borne operation to wing-borne operation.

In some embodiments, a coordinated quick release of the downward hydrofoil lift forces generated by the front and rear hydrofoils 1306, 1310 enables the upward aero lift force generated by the wing 1304 to cause the craft 1300 to quickly pop up and out of the water to transition from hydrofoil-borne operation to wing-borne operation.

Some embodiments may additionally or alternatively include the control system causing both of the front hydrofoil 1306 and the rear hydrofoil 1310 to switch from (a) generating downward hydrofoil lift to (b) generating upward hydrofoil lift. In some instances, a quick (but coordinated) release of the downward hydrofoil lift forces by both the front and rear hydrofoils 1306, 1310 followed by a quick (but coordinated) generation of upward hydrofoil lift forces by one or both of the front and rear hydrofoils 1306, 1310 operates to push the craft 1300 up and out of the water 1314. The upward "push" caused by the upward hydrofoil lift generated by one or both of the front hydrofoil 1306 and/or rear hydrofoil 1310 in combination with the upward aero lift generated by the wing 1304 operates in concert to facilitate transition of the craft 1300 from hydrofoil-borne operation to wing-borne operation.

Some embodiments include a quick (but coordinated) release of the downward hydrofoil lift forces by both the front and rear hydrofoils 1306, 1310 followed by a coordinated generation of upward hydrofoil lift forces first by the front hydrofoil 1306 followed by generation of upward hydrofoil lift forces by the rear hydrofoil 1310. In some instances, causing the front hydrofoil 1306 to generate an upward hydrofoil lift force before causing the rear hydrofoil 1310 to generate an upward hydrofoil lift force causes the front of the craft 1300 to rise before the rear of the craft 1300. This coordinated activation of upward hydrofoil lift forces by the front hydrofoil 1306 followed by the rear hydrofoil 1310 when used in combination with using the front hydrofoil strut(s) 1308 and/or rear hydrofoil strut(s) 1312 to keep the rear hydrofoil 1310 substantially coplanar with the front hydrofoil 1306 as the craft 1300 rises up and out of the water helps facilitate takeoff of the craft 1300 while hydro foiling.

In some example embodiments, about the time when the craft 1300 starts to takeoff and become wing-borne, the control system adjusts one or more control surfaces (e.g., flaps, foils, or other surfaces) of the front hydrofoil 1306 and the rear hydrofoil 1310 to cause both to "release" the downward hydrofoil lift they both had been generating to keep the craft 1300 hydrofoil-borne until the upward aero lift generated by the wing 1304 exceeds the threshold lift. After both the front hydrofoil 1306 and rear hydrofoil 1310 have "released" their corresponding downward hydrofoil lift forces, the control system further adjusts the one or more control surfaces of one or both of the front hydrofoil 1306 and/or the rear hydrofoil 1310 to cause one or both of the front hydrofoil 1306 and/or the rear hydrofoil 1310 to generate upward hydrofoil lift rather than downward hydrofoil lift (sometimes referred to herein as "downward hold"). As a result of controlling one or both of the front hydrofoil 1306 and the rear hydrofoil 1310 to switch from generating downward hydrofoil lift to generating upward hydrofoil lift, the craft 1300 is urged upward and out of the water to achieve wing-borne operation.

To avoid the above-described problem of rear hydrofoil 1310 drag (individually or in combination with any hydrofoil lift being generated by the rear hydrofoil 1310) tending to generate a pivot effect that pulls the front of the craft 1300 back down to the water 1314 in situations where the rear hydrofoil 1310 remains in the water 1314 after the front hydrofoil 1306 leaves the water 1314 while attempting to transition from hydrofoil-borne operation to wing-borne operation, some embodiments additionally include the control system causing the rear hydrofoil 1310 and the front hydrofoil 1306 to exit from the water 1314 at about the same time while the craft 1300 transitions from hydrofoil-borne operation to wing-borne operation.

In some embodiments, the control system causes the rear hydrofoil 1310 to exit the water 1314 within less than about 5-7 seconds after the front hydrofoil 1306 has exited the water 1314. In other embodiments, the control system causes the rear hydrofoil 1310 to exit the water 1314 within less than about 5-7 seconds before the front hydrofoil 1306 exits the water 1314. In still further embodiments, the rear hydrofoil 1310 and the front hydrofoil 1306 may exit the water 1314 more closely together in time (e.g., within about 2-5 seconds of each other) or further apart in time (e.g., more than about 7-10 seconds of each other).

In some embodiments, causing the rear hydrofoil 1310 and the front hydrofoil 1306 to exit the water 1314 at about the same time comprises one or both of (i) adjusting the front hydrofoil strut(s) 1310 to remove the front hydrofoil 1306 from the water 1314 and/or (ii) adjusting the rear hydrofoil strut(s) 1312 to remove the rear hydrofoil 1310 from the water 1314.

For example, in embodiments where a hydrofoil strut can be retracted up into the hull 1302, adjusting the hydrofoil strut to remove the hydrofoil from the water includes retracting the hydrofoil strut at least enough to pull the hydrofoil out of the water. Similarly, in embodiments where a hydrofoil strut can pivot to be swung up toward the hull 1302 or perhaps away from the hull 1302, adjusting the hydrofoil strut to remove the hydrofoil from the water includes swinging the hydrofoil strut up or out at least enough to pull the hydrofoil out of the water 1314.

In some embodiments, as the front of the craft 1300 is pitching upward and increasing the angle of attack (AOA) for takeoff from hydrofoil-borne operation, the front hydrofoil 1306 starts to be pulled up toward the surface of the water 1314 and the rear hydrofoil 1310 starts to become less coplanar with the front hydrofoil 1306 relative to the surface of the water 1314. In other words, as the craft 1300 increases its AOA in preparation for takeoff, the front hydrofoil 1306 starts to rise towards the surface of the water 1314 while the rear hydrofoil 1310 starts to drop down further into the water 1314.

Therefore, as the pitch angle of the craft 1300 increases and the rear hydrofoil 1310 becomes less coplanar with the front hydrofoil 1306 relative to the surface of the water 1314, some embodiments include the control system retracting or otherwise adjusting the rear hydrofoil strut(s) 1310 in a manner to keep the rear hydrofoil 1310 substantially coplanar with the front hydrofoil 1306 so that both the rear hydrofoil 1310 and the front hydrofoil 1306 approach the surface of the water 1314 together at about the same rate while the craft 1300 is transitioning from hydrofoil-borne operation to wing-borne operation. Similarly, some embodiments also include adjusting the front hydrofoil strut(s) 1308 in a manner to keep the front hydrofoil 1306 substantially coplanar with the rear hydrofoil 1310 so that both the front hydrofoil 1306 and the front hydrofoil 1310 approach the surface of the water 1314 together at about the same rate while the craft 1300 is transitioning from hydrofoil-borne operation to wing-borne operation. Controlling the length of the rear hydrofoil struts 1306 and 1312 in this manner causes or otherwise enables the rear hydrofoil 1310 and the front hydrofoil 1306 to exit from the water 1314 at about the same time.

Because the front hydrofoil strut(s) 1308 and the rear hydrofoil strut(s) 1312 may position one or both of the front hydrofoil 1306 and the rear hydrofoil 1310, respectively, closer to the hull 1302 or further from the hull 1302 during hydrofoil-borne operation, some embodiments include adjusting one or both of the front hydrofoil strut(s) 1308 and the rear hydrofoil strut(s) 1312 to position the front hydrofoil 1306 and/or rear hydrofoil 1310 into a desired position relative to the hull 1302 in preparation for transitioning from hydrofoil-borne operation to wing-borne operation.

Some embodiments additionally include the control system adjusting the front hydrofoil strut(s) 1308 so that the front hydrofoil 1306 is further from the hull 1302 than the rear hydrofoil 1310.

For example, in some scenarios where the front hydrofoil 1306 has additional room to extend further from the hull 1302, the front hydrofoil strut(s) 1308 can extend the front hydrofoil 1306 further from the hull 1302 than the rear hydrofoil 1310 while the craft 1300 is hydrofoil-borne, which in turn pitches the front of the craft 1300 higher to help the craft 1300 achieve a desired AOA for takeoff.

Similarly, some embodiments additionally or alternatively include the control system adjusting the rear hydrofoil strut(s) 1312 so that the rear hydrofoil 1310 is closer to the hull 1302 than the front hydrofoil 1306.

For example, in some scenarios where the rear hydrofoil 1310 can be retracted or otherwise moved closer to the hull 1302, the rear hydrofoil strut(s) 1312 can retract or otherwise move the rear hydrofoil 1310 closer to the hull 1302 than the front hydrofoil 1306 while the craft 1300 is hydrofoil-borne, which similarly pitches the front of the craft 1300 higher to help the craft 1300 achieve a desired AOA for takeoff.

In this manner, the front hydrofoil strut(s) 1308 and the rear hydrofoil strut(s) 1312 can control the positioning of the front hydrofoil 1306 and the rear hydrofoil 1310, respectively, to affect the degree to which the front of the craft 1300 is pitched during hydrofoil-borne operation as the craft 1300 starts to transition from hydrofoil-borne operation to wing-borne operation.

In operation, and further to the description above, the control system in some embodiments uses the front hydrofoil strut(s) 1308 and the rear hydrofoil strut(s) 1312 to control the positioning of the front hydrofoil 1306 and the rear hydrofoil 1310, respectively, relative to the hull 1302 and/or relative to each other during different modes of operation.

For example, in some embodiments, during hull-borne operation, the front hydrofoil strut(s) 1308 and the rear hydrofoil strut(s) 1312 are configured to hold the front hydrofoil 1306 and the rear hydrofoil 1310 at corresponding first positions close to the hull 1302.

Transitioning from hull-borne operation to hydrofoil-borne operation in some embodiments includes (i) extending the front hydrofoil strut(s) 1308 to put the front hydrofoil 1306 into a second front foil position for hydrofoil-borne operation and (ii) extending the rear hydrofoil strut(s) 1312 to put the rear hydrofoil 1310 into a second rear foil position for hydrofoil-borne operation. After putting the front hydrofoil 1306 and the rear hydrofoil 1310 into their desired second foil positions (relative to the hull 1302 and/or relative to each other), the control system uses the front hydrofoil strut(s) 1308 and the rear hydrofoil strut(s) 1312 to hold the front hydrofoil 1306 and the rear hydrofoil 1310 in their desired second positions for hydrofoil-borne operation. In practice, the second positions for hydrofoil operation are configured to cause the craft 1300 to travel at a particular ride height above the water 1314 and/or at a particular pitch (e.g., a substantially flat pitch relative to the surface of the water 1314) to facilitate a comfortable ride and/or predictable handling while the craft 1300 is in hydrofoil-borne operation.

In some embodiments, in connection with preparing for takeoff from hydrofoil-borne operation, the control system (i) adjusts the front hydrofoil strut(s) 1308 to put the front hydrofoil 1306 into a third front foil position for takeoff and (ii) adjusts the rear hydrofoil strut(s) 1312 to put the rear hydrofoil 1310 into a third rear foil position for takeoff. After putting the front hydrofoil 1306 and the rear hydrofoil 1310 into their desired third foil positions (relative to the hull 1302 and/or relative to each other), the control system uses the front hydrofoil strut(s) 1308 and the rear hydrofoil strut(s) 1312 to hold the front hydrofoil 1306 and the rear hydrofoil 1310 in their desired third positions for takeoff. In practice, the third positions for takeoff are configured to cause the craft 1300 to travel at a particular ride height above the water 1314 and/or at a particular pitch (e.g., a desired pitch relative to the surface of the water 1314) to facilitate transition from hydrofoil-borne operation to wing-borne operation. For example, in some embodiments, the third positions for takeoff are configured to cause the WIG craft 1306 to pitch upward to help the craft achieve a desired angle of attack (AOA) for takeoff to facilitate transition from hydrofoil-borne operation to wing-borne operation.

In some embodiments, the control system may further control the relative positions of the front hydrofoil 1306 and the rear hydrofoil 1310 during the takeoff procedure in response to takeoff conditions. For example, in some instances, the control system further controls the heights and front hydrofoil 1306 and/or rear hydrofoil 1310 to maintain a desired pitch during takeoff. And some embodiments may additionally include adjusting the front hydrofoil strut(s) 1308 and/or the rear hydrofoil strut(s) 1312 to cause the front hydrofoil 1306 and the rear hydrofoil 1310 to exit the water 1314 at about the same as described earlier.

A. Pre-Takeoff Configuration

In some embodiments, before the craft 1300 transitions from hydrofoil-borne operation to wing-borne operation, and while the craft 1300 is hydrofoil-borne prior to takeoff and the front hydrofoil 1306 is generating downward hydrofoil lift, the control system is configured to position one or more elements of the rear hydrofoil 1310 into a pre-takeoff configuration such that the rear hydrofoil one or both (i) generates downward hydrofoil lift while the craft 1300 is hydrofoil-borne and/or (ii) controls the pitch of the craft 1300 while the craft 1300 is hydrofoil-borne. In addition to positioning the one or more elements of the rear hydrofoil 1310 into the pre-takeoff configuration, the control system is also configured to position one or more elements of one or both of the front hydrofoil 1306 and the rear hydrofoil 1310 to execute a coordinated "release" of the downward hydrofoil lift forces generated by the front hydrofoil 1306 and the rear hydrofoil 1310, as described above. Further, in addition to coordinating the "release" of the downward hydrofoil lift forces generated by the front hydrofoil 1306 and the rear hydrofoil 1310, some embodiments additionally include implementing a push-up procedure for pushing the craft 1300 upwards and out of the water 1314 to help the craft 1300 achieve wing-borne operation, as described above.

For example, while the craft 1300 is foiling and gaining speed to transition from hydrofoil-borne to wing-borne operation, the control system uses the rear hydrofoil 1310 to control the pitch of the craft 1300 by controlling one or more surfaces on the rear hydrofoil 1310 to increase and/or decrease the amount of upward and/or downward lift generated by the rear hydrofoil 1310. In operation, increasing downward lift generated by the rear hydrofoil 1310 can help the rear hydrofoil 1310 "hold" the craft 1300 in the water (and continue hydrofoil-borne operation while the craft 1300 is gaining speed and building aero lift). Similarly, in some embodiments, increasing downward lift generated by the rear hydrofoil 1310 can help the rear hydrofoil 1310 adjust the AOA of the craft 1300, including helping the craft 1300 to achieve a desired AOA for takeoff.

In some instances, positioning the one or more elements of the rear hydrofoil 1310 into the pre-takeoff configuration comprises positioning one or more elements of the rear hydrofoil 1310 to cause the front of the craft 1300 to achieve and/or maintain pitch within a preconfigured range of values between (i) about flat relative to a center of gravity of the craft 1300 and (ii) an upward pitch relative to the center of gravity of the craft 1300. In some instances, the pre-takeoff configuration of the rear hydrofoil can vary depending on operational circumstances such as whether and the extent to which the craft 1300 is in high wave and/or high wind conditions, as well as whether and the extent to which the craft 1300 is carrying heavy and/or unevenly loaded weight. In some embodiments, the rear hydrofoil 1310 settings to accommodate these operational circumstances may be implemented as different operational condition states, such as, for example, a wave state, a wind state, and/or a craft weight state. Other states for other operational conditions are possible as well.

For the wave state, the control system in some embodiments configures the one or more elements of the rear hydrofoil 1310 to control the pitch of the craft 1300 while preparing to transition from hydrofoil-borne to wing-born operation in weather conditions comprising waves having any one or more of (i) a wave height greater than a wave height threshold, (ii) a wave amplitude greater than a wave amplitude threshold, (iii) a wave period greater than a wave period threshold, (iv) a wavelength greater than a wavelength threshold, (v) a wave frequency greater than a wave frequency threshold, and/or (vi) a wave speed that is greater than a wave speed threshold.

For the wind state, the control system in some embodiments configures the one or more elements of the rear hydrofoil 1310 to control the pitch of the craft 1300 while preparing to transition from hydrofoil-borne to wing-born operation in weather conditions comprising wind having any one or more of (i) a wind speed greater than a wind speed threshold, (ii) wind gusts greater than a wind gust threshold, and/or (iii) a wind direction that differs from a desired wind direction by more than a threshold amount.

For the craft weight state, the control system in some embodiments configures the one or more elements of the rear hydrofoil 1310 to control the pitch of the craft 1300 while preparing to transition from hydrofoil-borne to wing-borne operation in craft weight conditions comprising any one or more of (i) a craft weight greater than a threshold craft weight, or (ii) a craft center of gravity that deviates more than a threshold amount from a desired center of gravity.

In some embodiments, to implement the pre-takeoff configuration of the rear hydrofoil 1310, whether using any of the wave, wind, or craft weight states, or other pre-takeoff configuration embodiment, the control system one or more of (i) sets a depth of the rear hydrofoil 1310 to an initial depth to help cause a desired upward pitch of the front of the craft 1300, (ii) after setting the depth of the rear hydrofoil 1310 to the initial depth, adjusts the rear hydrofoil strut(s) 1312 to maintain the desired pitch of the front of the craft 1300, (iii) sets one or more flaps, foils, or other control surfaces of the rear hydrofoil 1310 to one or more initial positions configured to cause the desired pitch of the front of the craft 1300, and (iv) after setting the one or more flaps, foils, or other control surfaces of the rear hydrofoil 1310 to one or more initial positions, the control system adjusts the one or more flaps, foils, or other control surfaces of the rear hydrofoil 1310 to maintain the desired pitch of the front of the craft 1300.

B. Takeoff Procedure

Once the craft 1300 has gained sufficient speed and aero lift in combination with an appropriate AOA to transition from hydrofoil-borne to wing-borne operation, the control system uses the rear hydrofoil 1310 (individually or in combination with the front hydrofoil 1306) to execute aspects of the takeoff procedure to help reduce and/or release the downward force exerted on the craft 1300 and ultimately urge the craft 1300 up and out of the water 1314 to achieve wing-borne operation.

In some embodiments, implementing the takeoff procedure includes positioning one or more elements of one or both of the front hydrofoil 1306 and the rear hydrofoil 1310 based on one or both of (i) a desired upward velocity of the craft 1300 and (ii) a desired pitch angle of the craft 1300. In some embodiments, positioning one or more elements of one or both of the front hydrofoil 1306 and the rear hydrofoil 1310 comprises one or more of (i) adjusting the front hydrofoil strut(s) 1308 to control a depth of the front hydrofoil 1306, (ii) controlling one or more flaps, foils, and/or other control surfaces of the front hydrofoil 1306 to generate upward hydrofoil lift, (iv) adjusting the rear hydrofoil strut(s) 1312 to control a depth of the rear hydrofoil 1310, and (v) controlling one or more flaps, foils, and/or other control surfaces of the rear hydrofoil 1310 to generate upward hydrofoil lift.

In some embodiments, the takeoff procedure includes setting a trailing edge of one more flaps, foils, or other control surfaces of the rear hydrofoil 1310 at a first angle down relative to the surface of the water 1314 to generate an upward hydrofoil lift, and setting a trailing edge of one more flaps, foils, or other control surfaces of the front hydrofoil 1306 at a second angle down relative to the surface of the water 1314 to generate an upward hydrofoil lift. In some embodiments, the first angle down and the second angle down are configured to cause one or more of (i) a total amount of hydrofoil lift or (ii) a desired upward pitch of the craft 1300. For example, in one potential scenario, the first angle down relative to the surface of the water 1314 for the trailing edge of the one more flaps, foils, or other control surfaces of the rear hydrofoil 1310 is between about 2-5 degrees, and the second angle down relative to the surface of the water 1314 for the trailing edge of the one more flaps, foils, or other control surfaces of the front hydrofoil 1306 is between about 3-7 degrees. However, any other arrangement of the flaps, foils, or other control surfaces of the rear hydrofoil 1310 and/or the front hydrofoil 1306 sufficient to (individually or in concert with aero lift generated by the wing 1304) enable the craft 1300 to lift up and out of the water 1314 and achieve successful wing-borne flight could be used, too.

In some embodiments, the takeoff procedure additionally includes a "push up" procedure. In operation, implementing the push-up procedure includes the control system controlling the one or more elements of one or both of the front hydrofoil 1306 and the rear hydrofoil 1310 to pitch the front of the craft 1300 upwards by one or more of (i) adjusting the front hydrofoil strut 1308 to cause the front of the craft 1300 to pitch upwards, and/or (ii) causing the front hydrofoil 1306 to generate more upward hydrofoil lift than the rear hydrofoil 1310 while taking off. The "push up" procedure in some embodiments may additionally or alternatively include causing the front hydrofoil 1306 to switch from generating downward hydrofoil lift to generating upward hydrofoil lift before causing the rear hydrofoil 1310 to switch from generating downward hydrofoil lift to generating upward hydrofoil lift.

For example, after a quick (but coordinated) release of the downward hydrofoil lift forces by both the front and rear hydrofoils 1306, 1310, some "push up" embodiments include a coordinated generation of upward hydrofoil lift forces first by the front hydrofoil 1306 followed by generation of upward hydrofoil lift forces by the rear hydrofoil 1310. In operation, causing the front hydrofoil 1306 to generate a upward hydrofoil lift force before causing the rear hydrofoil 1310 to generate an upward hydrofoil lift force causes the front of the craft 1300 to pitch upward. The upward hydrofoil force generated by the front hydrofoil 1306 tends to push the front of the craft 1300 up and out of the water 1314, followed closely by the upward hydrofoil force generated by the rear hydrofoil 1310 that tends to push the rear of the craft 1300 up and out of the water.

This coordinated activation of an upward hydrofoil lift force by the front hydrofoil 1306 followed by activation of an upward hydrofoil lift force by the rear hydrofoil 1310 when used in combination with using the front hydrofoil strut(s) 1308 and/or rear hydrofoil strut(s) 1312 to keep the rear hydrofoil 1310 substantially coplanar with the front hydrofoil 1306 as the craft 1300 rises up and out of the water helps facilitate transitioning the craft 1300 from hydrofoil-borne operation to wing-borne operation.

C. Switching from Downward to Upward Hydrofoil Lift

As described earlier, another aspect of the disclosed systems and methods includes controlling one or both of the front hydrofoil 1306 and the rear hydrofoil 1310 to switch from (a) generating the downward hydrofoil lift to (b) generating an upward hydrofoil lift that pushes the craft 1300 up and out of the water 1304.

In some embodiments, controlling the front hydrofoil 1306 and/or rear hydrofoil 1310 to switch from generating downward hydrofoil lift to generate upward hydrofoil lift includes causing one or both of the front hydrofoil 1306 and the rear hydrofoil 1310 to switch from generating downward hydrofoil lift to generating upward hydrofoil lift at about the same time. In some instances, causing one or both of the front hydrofoil 1306 and the rear hydrofoil 1310 to switch from generating downward hydrofoil lift to generating upward hydrofoil lift at about the same time includes one of (i) switching the front hydrofoil 1306 from generating downward hydrofoil lift to generating upward hydrofoil lift within less than about 1-3 seconds before switching the rear hydrofoil 1310 from generating downward hydrofoil lift to generating upward hydrofoil lift, or (ii) switching the front hydrofoil 1306 from generating downward hydrofoil lift to generating upward hydrofoil lift within less than about 1-3 seconds after switching the rear hydrofoil 1310 from generating downward hydrofoil lift to generating upward hydrofoil lift.

In some embodiments, causing one or both of the front hydrofoil 1306 and the rear hydrofoil 1310 to switch from generating downward hydrofoil lift to generating upward hydrofoil lift at about the same time includes, for the front hydrofoil 1306, initiating the switch from generating downward hydrofoil lift to generating upward hydrofoil lift based least in part on how quickly one or more elements (e.g., flaps, foils, or other control surfaces) of the front hydrofoil 1306 can be repositioned from generating downward hydrofoil lift to generating upward hydrofoil lift considering one or more of the front hydrofoil 1306 actuation speed, actuation distance, or magnitudes of the downward hydrofoil lift and desired upward hydrofoil lift. And for the rear hydrofoil 1310, initiating the switch from generating downward hydrofoil lift to generating upward hydrofoil lift is based least in part on how quickly one or more elements of the rear hydrofoil 1310 can be repositioned from generating downward hydrofoil lift to generating upward hydrofoil lift considering one or more of the rear hydrofoil 1310 actuation speed, actuation distance, or magnitudes of the downward hydrofoil lift and desired upward hydrofoil lift.

Still further embodiments include switching the front hydrofoil 1306 from generating downward hydrofoil lift to generating upward hydrofoil lift before switching the rear hydrofoil 1310 from generating downward hydrofoil lift to generating upward hydrofoil lift. This causes the front of the craft 1300 to pitch upward during the time between (i) switching the front hydrofoil 1306 from generating downward hydrofoil lift to generating upward hydrofoil lift and (ii) switching the rear hydrofoil 1310 from generating downward hydrofoil lift to generating upward hydrofoil lift. Causing the front of the craft 1300 to pitch up followed by causing the rear hydrofoil 1310 to generate upward hydrofoil lift can in some instances facilitate the transition from hydrofoil-borne to wing-borne operation.

D. Other Embodiments and Features

Additional embodiments include retracting (or otherwise removing) the rear hydrofoil 1310 from the water 1314 while hydrofoil-borne before taking off. In such embodiments, the craft 1300 is configured to use flaps, elevators, and/or other control surfaces on the wing 1304 (individually or perhaps in combination with flaps, elevators, and/or other control surfaces on rear wing 1316) to control the pitch of the craft 1300 while the craft 1300 is hydro foiling on just the front hydrofoil 1306.

First, while the craft 1300 is hydrofoil-borne on both the front hydrofoil 1306 and the rear hydrofoil 1310, the control system causes the front hydrofoil 1306 and the rear hydrofoil 1310 to generate downward hydrofoil lift to hold the craft 1300 in the water 1314 while the craft 1300 increases speed and the upward aero lift generated by the wing 1304 increases in the same or substantially the same manner as described above.

Next, the control system uses the rear hydrofoil strut(s) 1312 to retract the rear hydrofoil 1310 towards the hull 1302, thereby removing the rear hydrofoil 1310 from the water 1314. At this point, the craft 1300 is hydro foiling on just the front hydrofoil 1306.

While the craft 1300 is hydro foiling on just the front hydrofoil 1306, the control system uses one or more control elements of wing 1304 and/or tail wing 1316 to control the pitch of the craft 1300.

Next, after the upward aero lift generated by the wing 1304 has increased above the threshold lift, the control system causes the front hydrofoil 1306 to "release" the downward hydrofoil lift that is keeping the craft 1300 in the water. In some embodiments, after causing the front hydrofoil 1306 to "release" the downward hydrofoil lift, the control system additionally causes the front hydrofoil 1306 to start generating upward hydrofoil lift, thereby pushing the craft 1300 up and out of the water 1314.

Some embodiments additionally include the control system transitioning the craft 1300 for wing-borne to hydrofoil-borne operation, i.e., landing the craft 1300 on water.

Landing the craft 1300 on the water includes using the front hydrofoil strut(s) 1308 to extend the first hydrofoil 1306 and the rear hydrofoil strut(s) 1312 to extend the rear hydrofoil 1310 into a landing configuration based in part on a desired pitch for landing based on the rear hydrofoil 1310 hitting the water 1314 first followed by the front hydrofoil 1306 hitting the water.

In operation, the flap angles of the front hydrofoil 1306 and rear hydrofoil 1310 are set to minimize or otherwise reduce the force of the impact on the surface of the hydrofoils when hitting the water 1314 but also to avoid "suck down," i.e., developing a large force that tends to pull the hydrofoils down from the hull 1302 when entering the water 1314.

Additionally, in some embodiments, the front and rear hydrofoil struts 1308, 1312 are configured to adjust the positions of the front hydrofoil 1306 and the rear hydrofoil 1310 relative to each other to control the time difference between the time at which the rear hydrofoil 1310 hits the water 1314 and the time at which the front hydrofoil 1306 hits the water 1314.

Some embodiments additionally include further controlling the positions of one or both of the front hydrofoil 1306 and rear hydrofoil 1310 to avoid (or at least reduce) water spray caused by the hydrofoils impacting the water from hitting the surfaces of the wing 1304 and or tail wing 1316.

In operation, after both the front hydrofoil 1306 and rear hydrofoil 1310 re-enter the water, the hydrofoils 1306, 1310 can then be used to control roll of the craft 1300 throughout the rest of the landing process.

VI. Further Examples of Hydrofoil-borne to Airborne Transitioning of Craft

As previously noted, in some instances, some loss of control authority over the craft 100 may occur if the rear hydrofoil 136 and/or the front hydrofoil 130 do not remain submerged as the craft 100 attempts to transition from being hydrofoil-borne to being airborne. For example, the wave height of the water may be such that the rear hydrofoil and/or the front hydrofoil exits the water from time-to-time when the respective hydrofoil hits a wave trough. The loss of control authority that may occur when the rear hydrofoil exits the water may make it particularly difficult to control the craft 100 and frustrate the transitioning of the craft from being hydrofoil-borne to being airborne. For example, the craft 100 may pitch down towards the water to an extent if the rear hydrofoil 136 exits the water before the front hydrofoil 130 exits the water.

Various example operations for preventing or at least ameliorating the aspects noted above are described in more detail below. In general, these operations involve dynamically adjusting the respective hydrofoil depths of the rear hydrofoil 136 and the front hydrofoil 130 to ensure that the rear hydrofoil 136 and the front hydrofoil 130 remain submerged below the water as the craft 100 accelerates in the water towards the point at which the craft 100 attempts to transition from being hydrofoil-borne to being airborne. In some examples, this involves ensuring that the rear hydrofoil 136 and the front hydrofoil 130 remain submerged to a desired hydrofoil depth (which may correspond to a predetermined hydrofoil depth or at least within a margin thereof) as the craft 100 attempts to transition from being hydrofoil-borne to being airborne.

Figure 14:
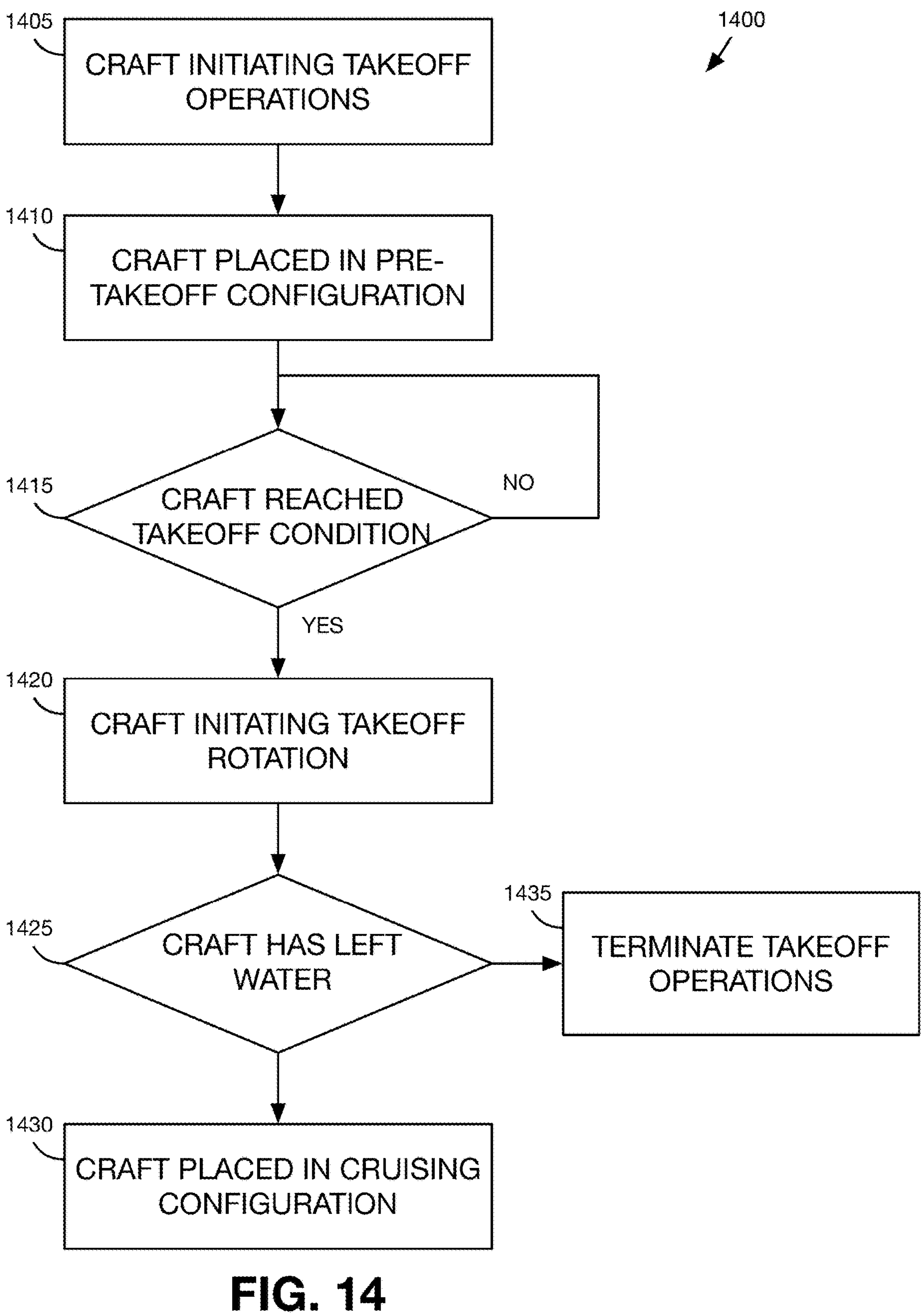
FIG. 14 illustrates additional example operations that facilitate transitioning a craft to a wing-borne mode, in accordance with example embodiments.

FIG. 14 illustrates examples of operations 1400 performed by the craft 100 that encourage the rear hydrofoil 136 and the front hydrofoil 130 to remain submerged within the water as the craft 100 accelerates in the water towards the point at which the craft 100 attempts to transition from being hydrofoil-borne to being airborne. In this regard, some examples of the control system 500 coordinate various aspects of the craft 100 to facilitate the performance of these operations.

The operations at block 1405 involve the craft 100 initiating takeoff operations. For instance, the craft 100 may be hydrofoil-borne and maneuvering (e.g., towards a takeoff location) and then receive an indication from the pilot to cause the craft 100 to initiate takeoff operations. In this regard, prior to receiving the indication, the propeller assemblies 116 of the craft 100 may be generating an amount of thrust that is sufficient to cause the craft 100 to become hydrofoil-borne but insufficient to cause the craft 100 to leave or pop out of the water. The rear hydrofoil 136 and the front hydrofoil 130 may be in a fully extended configuration, and maneuvering of the craft 100 may be performed by way of one or more hydro control surfaces. In some examples, the aero control surfaces (e.g., ailerons, flaps, etc.) may be in a neutral configuration such that the amount of control authority imparted on the craft 100 by these surfaces is negligible.

After receiving the takeoff indication, the craft 100 may automatically begin performing subsequent takeoff operations. In this regard, in some examples, before performing subsequent takeoff operations, the craft 100 may perform various checks to ensure that the craft 100 can safely takeoff. For example, the craft 100 may confirm that the path in front of the craft 100 is unobstructed and that the environmental conditions surrounding the craft 100 are conducive to taking off. For example, the craft 100 may sense/gauge the wind speed, wave height, etc. If one or more of these conditions exceeds some predetermined threshold (e.g., a particular wave height, wind speed, wind direction, etc.), the craft 100 may hold off on automatically executing further takeoff operations indefinitely or until the conditions become conducive to taking off.

The operations at block 1410 involve placing the craft 100 in a pre-takeoff configuration. In some examples, this involves accelerating the craft 100 to a desired target speed (e.g., 50 kts), after which the craft 100 may be rotated to cause the craft 100 to take off. In this regard, the craft 100 may control the propeller assemblies 116 to increase thrust beyond that which is used to simply maneuver the craft 100 on the rear hydrofoil 136 and the front hydrofoil 130. In some examples, this involves causing the propeller assemblies 116 to rotate at a (e.g., predetermined) target RPM and/or to adjust the blades of the propeller assemblies 116 to a (e.g., predetermined) target pitch that causes the propeller assemblies 116 to generate the (e.g., predetermined) target amount of thrust. In some examples, the thrust is dynamically adjusted to cause the craft 100 to reach the target speed. For example, the thrust may be maximized to cause the craft 100 to reach the desired target speed relatively quickly. In some examples, after reaching the target speed or as the speed of the craft 100 approaches the target speed, the thrust may be reduced to an extent to maintain the craft 100 at the desired takeoff speed until further operations for causing the craft 100 to leave the water can be performed.

In some examples, placing the craft 100 in a pre-takeoff configuration further involves adjusting the aero surfaces of the craft 100 such that the aero surfaces begin to impart a degree of control authority (e.g., lift) on the craft 100 and are ready to impart a significant degree of control authority over the craft 100 after the rear hydrofoil 136 and the front hydrofoil 130 push the craft 100 out of the water. In some examples, the adjusting of the aero surfaces to impart control authority on the craft 100 occurs closer to the point at which the craft 100 is about to be pushed out of the water via the rear hydrofoil 136 and the front hydrofoil 130. In other words, such adjustment of the aero surfaces may occur at any suitable time prior to takeoff by the craft in association with block 1420, discussed further later.

In some examples, during this stage various pre-takeoff checks may be performed to confirm that the conditions surrounding the craft 100 remain conducive to liftoff of the craft 100. For example, the control system 500 of the craft 100 may continually monitor the pitch, airspeed, windspeed, wave height, etc., to confirm that these aspects remain within limits that will allow the craft 100 to takeoff.

In some examples, when the craft 100 begins accelerating, the control surfaces of the rear hydrofoil 136 and the front hydrofoil 130 can be adjusted (e.g., under pilot authority) to facilitate maneuvering (e.g., turning) the craft 100 to an extent, and as the speed of the craft 100 increases towards the target speed, the amount of control authority available for maneuvering the craft 100 via the hydrofoil control surfaces is gradually reduced to encourage moving the craft 100 in a generally straight direction.

As described in previous examples with respect to FIGS. 7A-12, as the craft 100 accelerates, the control surfaces of the rear hydrofoil 136 and the front hydrofoil 130 are dynamically adjusted to generate a negative lift on the craft 100 that holds the craft 100 in the water. In some examples, the deployment length of the rear hydrofoil 136 and the front hydrofoil 130 may be reduced to an extent so that the rear hydrofoil 136 and the front hydrofoil 130 are no longer fully extended. (In some examples of craft 100, only one of the hydrofoils is deployable (e.g., the rear hydrofoil) and the deployment length of this hydrofoil may be reduced to an extent so that it is no longer fully extended.) The deployment length of the rear hydrofoil 136 and the front hydrofoil 130 may be set to different amounts, for example, to adjust the amount of drag generated by the rear hydrofoil 136 and the front hydrofoil 130. For example, setting the deployment length of the rear hydrofoil 136 to be greater than the front hydrofoil 130 may cause the rear hydrofoil 136 to generate relatively more drag which may mitigate the pivoting issues noted above. In some examples, the relative deployment lengths of the rear hydrofoil 136 and the front hydrofoil 130 and/or the control surfaces of the rear hydrofoil 136 and the front hydrofoil 130 are dynamically adjusted to ensure that as the craft 100 accelerates towards takeoff that a) both the rear hydrofoil 136 and the front hydrofoil 130 remain submerged in the water, which in some examples involves submerging the rear hydrofoil 136 and the front hydrofoil 130 to a (e.g., predetermined) target hydrofoil depth, b) the craft 100 pitches at a nominal angle or pre-takeoff pitch angle and maintains this pitch angle as the craft 100 accelerates, and c) the craft 100 is held in the water (e.g., prevented from being lifted from the water via aero lift generated by the wings). In this regard, some examples of the control system 500 of the craft 100 implement a hydro-based pitch control system that is a closed-loop system. Some examples of the hydro-based pitch control system receive as input one or more of a) a desired pitch, b) sensor position data and/or inferred position data (e.g., based on the geometric position determination techniques disclosed herein) that indicates the sensed/inferred pitch of the craft 100, the hydrofoil configurations (e.g., control surface angles, deployment amount, etc.), and c) a hold command, and output various hydrofoil control signals that control, for example, the deployment amounts and/or the control surface angles of the rear hydrofoil 136 and/or the front hydrofoil 130. In operation, during this stage, a pre-takeoff pitch angle, which in some examples may be anywhere between 1-2 degrees, may be input to the hydro-based pitch control system, and the hold command may be asserted. As such, as the craft 100 accelerates and transitions from being hydrofoil-borne to being airborne and to prevent or at least mitigate frustration of the takeoff procedures, the hydro-based pitch control system may continuously adjust the deployment lengths and/or the control surfaces of the rear hydrofoil 136 and/or the front hydrofoil 130 to a) ensure that the rear hydrofoil 136 and the front hydrofoil 130 remain submerged, and in some examples submerged to a (e.g., predetermined hydrofoil depth threshold, b) hold the craft 100 in the water, and c) set and/or maintain the pitch angle of the craft 100 at the pre-takeoff pitch angle.

Figure 15:
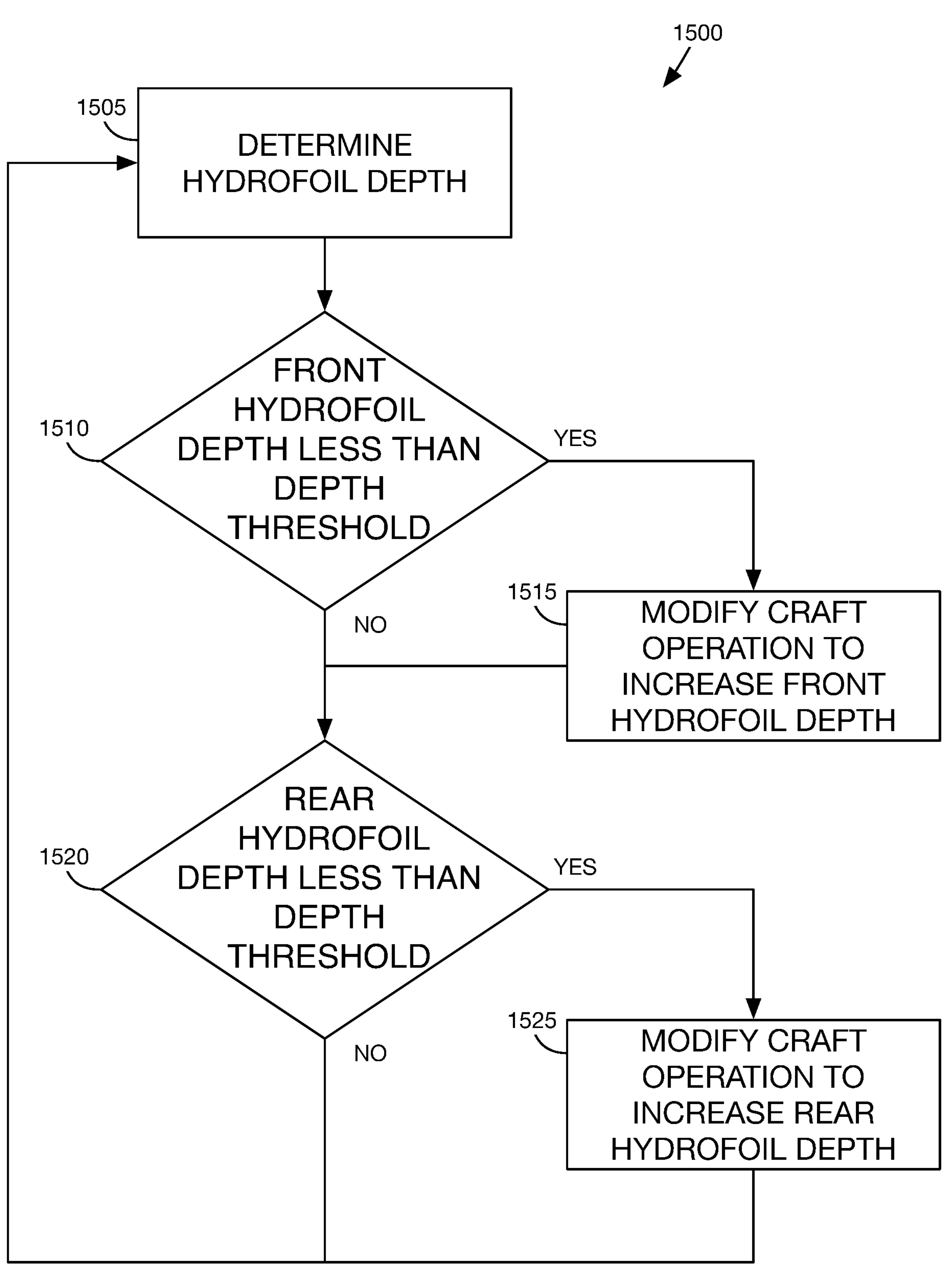
FIG. 15 illustrates operations for controlling the depth of hydrofoils below the water surface, in accordance with example embodiments.

FIG. 15 illustrates examples of operations 1500 performed by the craft 100 when adjusting the deployment length of the rear hydrofoil 136 and the front hydrofoil 130. The operations at block 1505 involve determining the hydrofoil depth. In some examples, only the front hydrofoil depth is determined. In some other examples, both the front hydrofoil depth and the rear hydrofoil depth are determined. In some examples, the hydrofoil depth corresponds to the length of the section of the hydrofoil that is below the surface of the water as opposed to the distance of the hydrofoil from the underside of the hull.

In this regard, in some examples, one or more sensors are utilized to determine the hydrofoil depth. For instance, one or more optical sensors, conductivity sensors, pressure sensors, etc., may be arranged on each hydrofoil to facilitate determining the hydrofoil depth. In some examples, multiple sensors are arranged longitudinally along the rear strut 138 and the front strut 132 and have a predetermined spacing therebetween, such as 1 inch, to facilitate determining the hydrofoil depth to the nearest inch. In some examples, one or more sensors that facilitate measuring the strain on the struts (138 and 132, respectively) of the rear hydrofoil 136 and the front hydrofoil 130 can be used (together with other known condition information such as craft speed) to an extent to estimate the hydrofoil depth. For example, the amount of strain on the hydrofoils may increase from some baseline strain as more of the strut is below the water surface. In some examples, the hydrofoil depth can be inferred based on the geometry of the craft 100. Such inferring of sections of the craft 100 based on the geometry of the craft 100 is described in later sections with respect to FIGS. 19-21D.

In some examples, the determined hydrofoil depth is based on an instantaneous value of the deployment depth. In another example, the determined hydrofoil depth is an average value of the deployment depth over some predetermined period (e.g., five seconds). In general, the hydrofoil depth can vary to an extent independent of the amount by which the hydrofoils are deployed at any given instance due to surface variations of the water. For example, for a particular deployment amount, the local maximum hydrofoil depth may coincide with the hydrofoil passing through the crest of a wave and the local minimum hydrofoil depth may coincide with the hydrofoil passing through the trough of a wave.

In some examples, the determined hydrofoil depth corresponds to a predicted hydrofoil depth. For instance, the hydrofoil depth may be determined as a function of certain relatively static aspects of the craft 100 (e.g., weight/loading), the configuration of the aero surfaces (e.g., deflection angles of the flaps, ailerons, etc.), the configuration of the hydrofoils (e.g., respective deflection angles of the control surfaces, deployment depths), and the water speed/airspeed of the craft 100. As such, if the future configuration and water speed/airspeed of the craft 100 are known (e.g., the configuration and speed ten seconds into takeoff), the hydrofoil depth at that time may be predicted.

If at block 1510, the front hydrofoil depth has been determined (or inferred or predicted) to be less than a depth threshold (i.e., the front hydrofoil is not deep enough in the water), then the operations at 1515 are performed. In some examples, the depth threshold can be a predetermined or constant value. For instance, sufficient and uninterrupted control authority over the craft may be achieved by deploying the hydrofoils such that about 25% of the overall strut is below the water surface. For example, the depth threshold for an eighteen-inch hydrofoil strut may be about four inches. The depth threshold for a six-foot hydrofoil strut may be about 1.5 feet. In some other examples, the depth threshold is dynamically determined such that it may be different from takeoff to takeoff. When the depth threshold is dynamically determined, it may be determined based on factors such as current environmental conditions, and/or the speed or weight of the craft 100, among other examples.

The operations at block 1515 involve modifying the operation of the craft 100 to cause the front hydrofoil 130 to have the appropriate hydrofoil depth or to have the appropriate hydrofoil depth at some point in the future (e.g., ten seconds into takeoff). In some examples, the adjustments made to the operation of the craft 100 may also cause corresponding changes to be made to the rear hydrofoil 136.

In some examples, if the hydrofoil depth of the front hydrofoil 130 is less than or is predicted to be less than the depth threshold, but the hydrofoil depth of the rear hydrofoil 136 is or will be at or within a margin of the depth threshold, then no particular operation may be performed to bring the front hydrofoil back to the appropriate hydrofoil depth. This is because, in general, adequate control of the craft 100 may be maintained so long as the hydrofoil depth of rear hydrofoil 136 is at the appropriate depth. On the other hand, if the hydrofoil depth of the rear hydrofoil 136 is less than the depth threshold, then operations to bring the front hydrofoil 130 and the rear hydrofoil 136 back to the depth threshold may be performed.

In some examples, bringing the front hydrofoil depth back to the appropriate depth threshold involves decreasing the speed of the craft 100 so that the hydrofoil depth of the front hydrofoil 130 moves back to the appropriate depth threshold. In some examples, this may also involve increasing the amount by which the front hydrofoil 130 is extended from the hull.

In some examples, if these operations do not bring or are not predicted to bring the front hydrofoil depth back to the appropriate depth threshold or within a margin thereof (e.g., within +=10%), then the takeoff operations of the craft 100 may be automatically aborted. In some examples, aborting the takeoff operations does not occur until the craft 100 reaches or is within a margin of the takeoff speed. This may provide more time for the control systems 500 of the craft 100 to bring the front hydrofoil depth back to the appropriate depth threshold. In some examples, an indication that the front hydrofoil depth is not at the appropriate depth threshold may be presented to the pilot, and the pilot may subsequently indicate whether further takeoff operations should be aborted or allowed to proceed.

If at block 1510, the front hydrofoil depth has been determined (or inferred or predicted) to be at the depth threshold or within a margin thereof (e.g., +−10%), and if at block 1520, the rear hydrofoil depth has been determined (or inferred or predicted) to be less than the depth threshold (i.e., the hydrofoil is not deep enough in the water), then the operations at 1525 are performed. The operations at block 1525 involve modifying the operation of the craft 100 to cause the rear hydrofoil 136 to have the appropriate hydrofoil depth or to have the appropriate hydrofoil depth at some point in the future (e.g., ten seconds into takeoff). In some examples, bringing the rear hydrofoil back to the appropriate depth threshold involves decreasing the speed of the craft 100 so that the hydrofoil depth of the rear hydrofoil 136 moves back to the appropriate depth threshold. In some examples, this may also involve increasing the amount by which the rear hydrofoil 136 is extended from the hull. In some examples, if these operations do not bring the rear hydrofoil depth back to the appropriate depth threshold or within a margin thereof (e.g., within +=10%), then both the rear hydrofoil 136 and the front hydrofoil 130 may be immediately retracted from the water to prevent the craft 100 from "nose diving" into the water, which may otherwise occur if the front hydrofoil 130 were to remain the only hydrofoil attached/submerged within the water.

Returning to FIG. 14, the operations at block 1415 involve determining whether the conditions of the craft 100 are conducive to taking off. In some examples, this involves determining/confirming that the actual RPM of the propeller assemblies 116 is above a threshold RPM. For example, the craft 100 determines whether the propeller assemblies 116 are spinning at 3000 RPM or within a margin thereof (e.g., 95%). The craft 100 may confirm/determine (e.g., via water speed measurements, airspeed measurement, etc.) whether the speed of the craft 100 has reached the target speed noted above (e.g., 50 kts).

In some examples, the craft 100 determines that aero control surfaces (e.g., the ailerons, flaps, elevators, etc.) are in a desired configuration. For example, the craft 100 may determine/confirm that the respective angles of these control surfaces are set such that these control surfaces can apply the greatest amount of control authority (e.g., lift, roll, etc.) over the craft 100. For example, the craft 100 may confirm that the elevators are deflected upwards at about 10 degrees or within a margin thereof.

The operations at block 1420 involve, after determining the craft 100 is in the appropriate takeoff configuration, initiating takeoff rotation of the craft 100. That is, the pitch angle of the craft 100 may be changed from the pre-takeoff pitch angle (e.g., 1-2 degrees) to a takeoff pitch angle (e.g., 3 degrees). In some examples, takeoff rotation occurs automatically/in response to the determination that the craft 100 is in the takeoff configuration. For instance, the craft 100 may enter this state immediately after the determination is made. In some examples, the craft 100 enters this state at a predetermined period (e.g., 10 seconds) after the determination is made. For instance, the craft 100 may determine that the craft is in the takeoff configuration and indicate this to the pilot. Providing a delay before performing the takeoff rotation may provide the pilot with an opportunity to abort the takeoff rotation before it happens should the pilot deem it necessary to do so.

Some examples of takeoff rotation involve adjusting the aero control surfaces (e.g., ailerons, flaps, etc.) to cause or maintain the craft 100 at the takeoff pitch angle. As previously indicated, prior to this stage, the aero control surfaces may have been in a neutral configuration such that the amount of control authority imparted on the craft 100 by these surfaces was negligible. In this regard, some examples of the control system 500 of the craft 100 implement an aero-based pitch control system that is a closed-loop system. The aero-based pitch control system may receive as input one or more of a desired pitch and sensor data that indicates the sensed pitch of the craft 100 and outputs various aero control signals that control, for example, the respective deflection angles of the ailerons, flaps, elevator, etc., of the craft 100.

In some examples, during this stage, the pitch angle that is input to the hydro-based pitch control system is changed from the pre-takeoff pitch angle to the takeoff pitch angle so that both the aero control surfaces and the rear hydrofoil 136 and the front hydrofoil 130 are actively controlled to cause the craft 100 to pitch at the same pitch angle (i.e., the takeoff pitch angle).

In some examples, after the aero control surfaces and the rear hydrofoil 136 and the front hydrofoil 130 are actively controlling the craft 100 to pitch at the takeoff pitch angle, the hold command that was previously asserted to the hydro-based pitch control system is de-asserted.

This, in turn, causes the hydro-based pitch control system to configure the hydrofoils to release the hold on the craft 100 and to "pop" the craft 100 out of the water. In some examples, the hold command is de-asserted after the sensed pitch of the craft 100 reaches the takeoff pitch angle. In some examples, the hold command is de-asserted a predetermined period (e.g., five seconds) after the pitch angle is reached.

In some examples, the hydro-based pitch control system causes the hydrofoils to release the hold on the craft 100 and push the craft 100 from the water by commanding a change in the control surfaces of the hydrofoils that induces a large upward force on the craft 100 which urges the craft 100 up and out of the water. In some examples, this involves the control system 500 causing one or more deflection angles of one or more control surfaces of the front hydrofoil 130 to change by a particular amount (e.g., a delta/step amount) or to a particular deflection angle. For instance, the control system 500 may cause a step change to the current deflection angle of the flaps of the front hydrofoil 130 (e.g., new deflection angle=previous steady state deflection angle+delta). In some examples, the size of the step change or delta is a fixed amount (e.g., 5 degrees). In some examples, the control system 500 may cause the deflection angle of the flaps of the front hydrofoil 130 to change to a particular absolute deflection angle (e.g., 8 degrees).

In some examples, the delta is dynamic and is determined based on the operating conditions of the craft 100 and/or the environmental conditions surrounding the craft 100. For instance, in some examples the delta is determined as a function of the groundspeed and/or airspeed of the craft 100 and the weight/loading of the craft 100 and is calculated based in part on these factors to produce a particular/desired vertical acceleration. In other words, when the current deflection angle of the flaps of the front hydrofoil 130 is X and when the craft 100 is cruising at a particular water speed/airspeed and has a particular weight/loading, a delta of Y applied to the current deflection angle of the flaps will be required to generate vertical force Z. In some examples, the function for calculating delta also takes into consideration the amount of lift the wings are producing (e.g., based on the pitch of the craft 100, the deflection angles of the aero surfaces, the airspeed, etc.). For example, the delta required to the deflection angle of the flaps of the front hydrofoil 130 to "pop" the craft 100 out of the water may decrease with an increase in the amount of lift generated by the wings.

In some instances, commanding the change in the control surfaces of the front hydrofoil 130 that induces the large upward force on the craft 100 that urges the craft up and out of the water may urge or induce the craft 100 to pitch at an angle greater than the takeoff pitch angle. Accordingly, in some examples, similar control surface adjustments can be performed on the rear hydrofoil 136 to further "push" the craft 100 out of the water. Pushing from the rear of the craft 100 may mitigate this induced increase in the pitch of the craft 100 to an extent. In some examples, the absolute deflection angle of the flaps of the rear hydrofoil 136 may be set to be the same as the absolute deflection angle of the flaps of the front hydrofoil 130 as determined by the hydro-based pitch control system. In some examples, the deflection angle of the flaps of the rear hydrofoil 136 may be adjusted by the same delta that was used to adjust the deflection angle of the flaps of the front hydrofoil 130. In some other examples, the delta by which the deflection angle of the flaps for the rear hydrofoils 136 should be adjusted may be determined independently. For instance, the delta required to the deflection angle of the flaps of the rear hydrofoil 136 to produce a particular/desired vertical acceleration may be determined as a function of the groundspeed and/or airspeed of the craft 100, the weight/loading of the craft 100, and the current deflection angle of the flaps of the rear hydrofoil 136. In some examples, the function for determining the delta to make to the deflection angle of the flaps of the rear hydrofoil 136 is further based on the determined delta of the deflection angle of the flaps of the front hydrofoil 130.

In some instances, the delta determined above corresponds to an initial delta by which the respective deflection angles should be changed and the delta may be increased over a period (e.g., every second). For example, the initial deflection angle of the flaps of the front hydrofoil 130 may be two degrees and the initial delta may be determined to be one degree. As such, after the first interval, the deflection angle of the flaps may be set to three degrees. During the second interval, delta may be increased to two degrees and the deflection angle of the flaps may be accordingly set to five degrees. In some examples, this process continues until the deflection angle of the flaps reaches a predetermined limit (e.g., 10 degrees) and/or until the craft 100 exits the water.

The operations at block 1425 involve determining/inferring that the craft 100 has left the water. In some examples, this involves using the geometry of the craft 100 to infer that the rear hydrofoil 136 and the front hydrofoil 130 have left the water. Such inferring based on the geometry of the craft 100 is discussed in later sections with respect to FIGS. 19-21D.

In some examples, this involves using sensors arranged, for example, on the rear hydrofoil assembly 110 and the front hydrofoil assembly 130, to sense whether the rear hydrofoil 136 and the front hydrofoil 130 have left the water. In some examples, the takeoff configuration of the craft 100 (e.g., the pitch, respective deflection angles of aero surfaces, speed, etc.) is maintained until after the craft 100 had been determined/inferred to have left the water. For example, the takeoff configuration may be maintained for a period (e.g., 10 seconds) after the craft has been inferred to have left the water.

If at block 1425, the craft 100 is determined/inferred to have left the water, then the operations at block 1430 are performed. The operations at block 1430 involve placing the craft 100 in a cruising configuration. This may involve the craft 100 gaining altitude and retracting the rear hydrofoil 136 and the front hydrofoil 130.

If at block 1425, the craft 100 cannot be determined/inferred to have left the water, then the operations at block 1435 are performed. The operations at block 1435 may involve terminating the takeoff rotation operations and allowing the craft 100 to return to a nominal pitch (e.g., 3 degrees). At this stage, the craft 100 essentially returns or remains hydrofoil borne.

I. Airborne to Hydrofoil-borne Transitioning of WIG Craft

As previously noted, some examples of craft 100 described above are wing-in-ground effect (WIG) craft 100 that, when airborne and cruising between destinations, fly relatively close to the water. Some of these craft 100 include hydrofoils that facilitate hydrofoil-borne movement of the craft 100 through water (e.g., while taxiing, preparing for takeoff, etc.). The hydrofoils may be controlled to extend and retract depending on the operating mode of the craft 100. For example, when airborne, the hydrofoils may be retracted towards the hull 102 of the craft 100, and when hydrofoil-borne, the hydrofoils may be extended.

When the craft 100 is landing, the hydrofoils may contact the water before the hull 102. If the craft 100 is not managed correctly, the hydrofoils may skip off the surface of the water and cause the craft 100 to bounce off the water and then perhaps splash back into the water. In some instances, the hydrofoils may additionally or alternatively "attach" or "grab" the water, creating a pitching moment on the craft about which the hull of the craft may tend to rotate toward and into the water. Further, a trail of bubbles may develop behind the hydrofoils that can, in some instances, cause the craft 100 to dive deep into the water until the vertical descent into the water is arrested by the craft's buoyancy force. These movements can be unpleasant for passengers.

FIG. 16 illustrates examples of operations 1600 performed by example craft 100 to facilitate a desirable landing process. Some example aspects of the operations are performed to reduce forces and stresses acting on the craft 100 that cause the phenomena noted above. The operations 1600 are more clearly understood with reference to the profile 1700 shown in FIG. 17, which includes representations of the craft's altitude/distance above the water surface during different modes of operations. In some examples, the operations 1600 are implemented via instruction code that is executed by one or more processors of the control system 500 that causes the control system 500 to control, alone or in cooperation with other subsystems of the craft 100, components of the craft 100 to perform these operations 1600. Additionally, or alternatively, one or more of the operations can be implemented or controlled by dedicated hardware, such as via one or more application-specific integrated circuits (ASICs). Some aspects of the operations 900 may be executed as a result of or in combination with inputs received from an operator of the craft 100 or other subsystems of the craft 100. Other aspects of the operations 900 may alternatively and/or additionally be executed automatically.

The operations at block 1605 involve the craft 100 traveling at a nominal cruising airspeed and altitude between destinations. For example, the craft may be cruising at an altitude of about 10 meters and at an airspeed of about 100 knots. Other suitable cruising airspeeds and altitudes exist.

The operations at block 1610 involve the craft 100 receiving a landing indication. In some examples, the landing indication may be received by the control system 500 of the craft and in response to operator input, e.g., from the pilot. For instance, the pilot may, via a cockpit control indicate an intention to land the craft 100.

In another example, the landing indication may be received according to an automatic determination in addition to or alternative to an operator input. For instance, such an automatic determination may be one or more of a determination that the craft has reached a predetermined location, the craft is at a predetermined distance from a landing destination, and/or an adverse condition exists that suggests landing would be appropriate. Accordingly, the landing indication may be received from an autopilot system of the craft 100 when the craft 100 reaches a predetermined location or a predetermined distance from a landing destination. Or the landing indication may be automatically triggered when an adverse condition occurs that suggests landing the craft 100 would be necessary and/or appropriate. In some examples, the landing indication may be communicated from a remote source, such as from a remotely located operator or from a remotely located computer system that is configured to remotely control one or more aspects of the craft 100. Such an indication communicated from a remote source may be communicated to the craft 100 via one or more communication networks.

A. Deceleration and Descent Mode

The operations at block 1615 involve the craft 100 decelerating to a target/reduced airspeed and descending to a target altitude in anticipation of landing. For example, the control system 500 may control the craft 100 to decelerate to a (e.g., predetermined) target airspeed of 45 knots. In some examples, the control system 500 lowers the airspeed of the craft 100 by selectively lowering the rotation rate of a subset of propellers of the craft 100 in a manner that facilitates maintaining lift on the craft 100 while inducing drag on the craft 100 that slows the craft 100. Techniques for adjusting the airspeed of the craft and lift on the craft are further described in U.S. Provisional Application No. 63/490,342, filed Mar. 15, 2023, which is incorporated herein by reference in its entirety. For example, the rotational speed of a first group of propellers that produce a wake of air over the ailerons or flaperons along the wing may be maintained to provide control authority over the craft while a second group of propellers that produce a wake of air over different sections of the wing (and therefore provide a lesser degree of control authority may be reduced to increase drag on the craft 100. Controlling the rotational speed of the different groups of propellers separately from each other, particularly during a landing procedure, allows for a reduction in the overall airspeed of the craft without a corresponding reduction in control authority over the craft that would otherwise follow from a reduction in propeller rotational speed. For instance, in some examples, after receiving an indication to land the craft 100, the control system 500 causes the speed of the second group of propellers to decrease, which induces drag. The speed of the first group of propellers is maintained to provide control authority. After the craft 100 reaches a target reduced speed, the speed of the first group of propellers may be increased to their original speed. In another example, the rotation rate of the first group of propellers is gradually reduced to allow for gradual adjustments of the control surfaces to compensate for or to minimize any loss of lift, while the speed of the second group of propellers is reduced to a greater degree to facilitate a more rapid decrease in the speed of the craft 100.

In some examples, the operations performed during this mode of operation or one or more of the subsequently described modes of operation may be aborted. For example, in response to receiving an abort command from the pilot, the control system 500 may cancel the landing procedure and cause the craft 100 to transition back to the original/cruising altitude and airspeed. In another example, the craft 100 may automatically determine that the mode of operation should be aborted.

In some examples, after the craft 100 reaches the target/reduced airspeed (or "threshold" airspeed), the control system 500 causes the craft 100 to descend to a target altitude or distance just above the water to prepare for touchdown of the craft 100 in the water. In the passenger travel context, the rate at which the craft descends may be selected to promote passenger comfort. For instance, in some examples, the control system 500 causes the craft 100 to descend at a relatively constant rate (e.g., 1 meter per second). In some examples, the rate of descent may be variable. For instance, the control system 500 may cause the craft 100 to descend at a higher initial rate (e.g., 2 meters per second), and then as the craft 100 approaches the water surface (e.g., within 3 meters of the surface), reduce the descent rate to some lower rate (e.g., 0.5 meters per second). In some examples, the airspeed of the craft 100 is maintained at the target/reduced airspeed during descent.

While in some examples the craft 100 is set to descend to a target altitude, in other examples, the craft 100 is instead and/or additionally set to descend at a target descent rate (without defining a particular target altitude). In such an example, the craft will tend to descend according to the target descent rate, until the craft reaches a given state (including, possibly, reaching a target altitude) that causes the craft to proceed to the subsequent mode of operation.

In some other examples, the control system 500 may simultaneously lower the airspeed of the craft 100 to the target/reduced airspeed noted above while controlling the craft 100 to descend. Accordingly, while it is noted that the craft 100 may begin to descend after the craft 100 has reduced its airspeed, note that in another example the craft 100 may begin to descend before the craft 100 has started and/or fully reduced its airspeed. That is, the craft 100 may reduce its airspeed and descend at least partially at the same time.

In controlling the craft 100 to perform these maneuvers, the control system 500 may engage with various systems and components of the craft 100. For example, the control system 500 may either directly or indirectly receive information from the autopilot and/or the digital flight control system (DFCS) of the craft 100. Other information may be received from sensors such as speed, altitude, pitch, air pressure, etc., sensors of the craft 100. The control system 500 may control, directly or indirectly, ailerons, flaps, elevators, etc., of the craft 100 based on information received from the other systems and the sensors. For example, the control system 500 may adjust the respective angles of control elevators, ailerons, aero flaps, etc., and the rotation rate of the motors of the craft 100 to adjust the altitude, airspeed, pitch, etc., of the craft 100 in anticipation of touchdown. In some examples, this includes helping to ensure that the rear hydrofoil 136 of the craft 100 contacts the water before the main hydrofoil 130. In this regard, in some examples, the control system 500 controls the craft 100 to have/maintain a slight upward pitch (e.g., about 2 degrees) to help ensure that the rear hydrofoil 136 contacts the water before the main hydrofoil 130.

In some examples, the control system 500 actively controls the deployment/retracted state of the hydrofoils during the landing procedure to ensure that the foils impact in the desired sequence. For instance, the control system 500 may cause the craft 100 to pitch up to an extent to ensure that the rear hydrofoil 136 contacts the water before the main hydrofoil 130. The control system 500 may cause the rear hydrofoil 136 to deploy (and/or retract) somewhat (e.g., such that it is deployed 5% of its maximum extended length) to ensure that the rear hydrofoil 136 contacts the water slightly before or at the same time as the main hydrofoil 130. Additionally and/or alternatively, the control system 500 may cause the main hydrofoil to retract (and/or deploy) to obtain a suitable configuration for landing.

B. Initial Contact Mode

The operations at block 1620 involve the craft 100 preparing for and contacting water. In this regard, during this mode of operation, the control system 500 performs various operations to ensure that the craft 100 contacts the water with minimized disruption to the craft and passengers. The control system 500 also performs operations to minimize the occurrence of any excessive bouncing of the craft 100 off the water or abrupt changes in the pitch of the craft 100 (e.g., excessive flare). The control system 500 may perform operations to minimize the occurrence of other unwanted craft 100 movements that might frustrate landing on the water. As noted above, control system 500 attempts to land the craft 100 as flat as possible, with perhaps only a slight pitch so that initial contact with the water is made by the rear hydrofoil, while minimizing the movements above. This, in turn, promotes passenger comfort. Some of the operations performed during this mode may be initiated immediately after the craft 100 begins to descend, whereas others may be initiated when the craft 100 reaches a particular target altitude that is lower than the cruising altitude or when it is determined that the craft 100 is within a threshold proximity of the water.

FIG. 18 shows examples of operations performed by the craft when preparing for initial contact with the water. The operations at block 1805 involve the control system 500, ensuring or adjusting the pitch of the craft 100 to be less than about 2 degrees. For example, the control system 500 may directly or indirectly adjust the respective angles of one or more control surfaces of the craft 100 to adjust the pitch of the craft 100.

The operations at block 1810 involve the control system 500 configuring the hydrofoils for landing. In some examples, this involves configuring the hydrofoils to be in a position that helps to minimize the issues noted above regarding the bouncing of the craft 100 off the water, the sinking of the craft 100 in the water, upsetting of the yaw of the craft 100, etc. For instance, in some examples, both the main hydrofoil 130 and the rear hydrofoil 136 are controlled to be (or ensured to be) as fully retracted as possible. In some instances, this might include the main hydrofoils 130 and the rear hydrofoil 136 being fully retracted into the body of the craft (if possible). In other instances, the main hydrofoils 130 and the rear hydrofoil 136 may be retracted such that they are near the body of the craft, yet not fully inside the body of the craft. In some examples, the main hydrofoil 130 is controlled to be as fully retracted as possible and the rear hydrofoil 136 is controlled to be partially extended (e.g., 25% of its maximum extendable length). In some examples, the control system 500 adjusts the hydrofoil rudders to have respective deflection angles of about zero degrees. The full or partial retraction of the hydrofoils minimizes stresses that may otherwise be imparted on the hydrofoils if extended.

In this regard, in some examples, the hydrofoils and/or the struts through which the hydrofoils are coupled to the craft 100 may include a shock absorption mechanism configured to absorb these stresses and allow the hydrofoils to be more extended or perhaps even fully extended when contacting the water. For instance, in some examples, the hull 102 of the craft 100 includes fast-reacting hydrofoil servos with shock-sensing accelerometers positioned above or adjacent to one or both hydrofoil struts and that are configured to facilitate controlling the relative angle of the struts with respect to the hull 102 of the craft 100 to reduce or alleviate stresses imparted on the struts when coming in contact with the water.

The operations at block 1815 involve the control system 500 adjusting the respective angles of the ailerons 120 of the craft to maintain a roll angle of zero degrees and may adjust the respective angles of the rudders 128 to align the heading angle of the craft 100 with the direction of travel. When operating under crosswind conditions in this configuration, the craft 100 may be susceptible to being blown off heading to an extent. However, this may be acceptable in some circumstances when landing on water, given that there may be suitable room for landing the craft 100.

Nonetheless, in some examples, the control system 500 may implement a de-crabbing procedure to maintain craft 100 heading under crosswind conditions. An example of the de-crabbing procedure involves adjusting the angles of the rudders 128 to cause the craft 100 to approach the landing area somewhat sideways while centering the craft 100 along the desired heading. The sideways positioning allows the craft 100 to balance the crosswind with its own lateral movement in the opposite direction while making progress toward the runway. The de-crabbing procedures may be performed until just before the craft 100 contacts the water, at which point the control system 500 will, for example, cause the application of the opposite rudder along with the opposite aileron and banking the wings to align the longitudinal axis of the craft 100 with the heading direction. Other de-crabbing procedures that may be implemented and/or coordinated by the control system 500 during landing are described in U.S. Provisional Application No. 63/456,092, filed Mar. 31, 2023, and U.S. Provisional Application No. 63/490,342, filed Mar. 15, 2023, which are incorporated herein by reference in their entirety.

The operations at block 1820 involve the control system 500 determining whether the craft 100 is at a threshold distance above the water. In some examples, the threshold distance corresponds to the point at or below which power to the motors of the propellers should be cut, as discussed further below in connection with block 1825. If the craft 100 has not reached the threshold distance above the water, one or more of the operations between blocks 1805 and 1815 may repeat. In some examples, the craft 100 includes proximity sensors (e.g., ultrasonic, radar, etc.) that the control system 500 uses to determine the distance between the craft 100 and the water and whether the craft 100 has reached the threshold distance above the water. In some examples, the control system 500 infers that the craft 100 has reached the threshold distance above the water based on the geometry of the craft 100 and/or other attributes of the craft 100. In some examples, the control system 500 may infer that the craft 100 has reached the threshold distance when various control surfaces of the craft 100 have transitioned from a configuration that causes the craft 100 to descend to a configuration that causes the craft 100 to hover for an extended period (e.g., 10 seconds). Additionally, or alternatively, the control system 500 may infer that the craft 100 has reached the threshold distance when the speed of the craft is reduced (e.g., in response to operator input) to a point at which positive lift can no longer be maintained.

In general, without power to the motors, the only way to control lift is to adjust the pitch of the craft 100, which, as noted, can lead to passenger discomfort. Therefore, in some examples, the control system 500 maintains power to the motors until just before the craft 100 contacts the water (e.g., when the craft 100 is a threshold distance of about 1 meter from the water). Afterwards, the control system 500 may cut power to the motors when the craft 100. In some particular examples, power to the motors is cut when the craft 100 is about 0.7 meters, i.e., when the threshold distance is about 0.7 meters. In some examples, the control system 500 may cause the craft 100 to remain at the threshold distance above the water for a nominal amount of time (e.g., about 10 seconds) before cutting power to the motors. In other examples, power is cut more or less immediately after the threshold distance is reached.

If at block 1820, the control system 500 determines that the craft 100 has reached the threshold distance above the water, the operations at block 1825 are performed. The operations at block 1825 involve the control system 500 cutting power to the motors of the propellers to protect the motors from damage that could possibly occur due to the splashing of water on the motors during touchdown.

In general, after the power to the motors is cut, the craft 100 will drop the remaining distance. But because the distance is relatively small, the undesirable movements noted above are minimized. Nonetheless, in some examples, after cutting power to the motors, the control system 500 may adjust the angles of one or more control surfaces of the wings of the craft to an extent to limit the rate of descent of the craft 100 towards the water. For instance, if the pitch of the craft 100 is relatively flat when power to the motors is cut, the control system 500 may cause the craft 100 to pitch upwards to an extent (e.g., about 2 degrees) to limit the rate of descent.

Returning to FIG. 16, the operations at block 1622 involve the craft 100 receiving an indication and/or infering that contact has been made with the water. As described further below, after receiving this indication or an indication that the craft is within a threshold proximity of the water, or making this inference, one or more of the hydrofoils may be extended or extended further from a first position to a second position that is further from the hull.

In some examples the control system 500 may, via one or more sensors arranged on the craft 100, determine that, based on the distance from the water, the craft 100 has contacted the water.

In some examples, the control system 500 is configured to infer that the craft 100 has contacted the water based in part on the geometry/orientation of the craft 100. For instance, the control system 500 may, via one or more sensors, GNSS, etc., determine the altitude above the water of a particular section of the craft 100, such as the center of mass of the craft. However, other sections of the craft 100 such as the rear and main hydrofoils, the starboard and portside wing tips, etc., may be closer to the water. For example, the craft 100 may be pitched up to an extent making the rear section of the craft and perhaps the rear hydrofoil 136 closer to the water than other sections of the craft 100. The craft 100 may be banking to an extent making one of the wing tips closer to the water than other sections of the craft 100.

In some examples, the control system 500 infers whether one or more of these or other sections of the craft 100 is/are in contact with the water by performing a rigid body translation and displacement calculation of these sections. For instance, the control system 500 may determine the distance between a particular section of the craft (e.g., the center of mass of the craft, a point on the fuselage proximate the main wing, etc.) and the water. The control section 500 may determine that the craft 100 is pitched up by a few degrees making the tail section of the craft 100 closer to the water than other sections of the craft 100. Using a geometric model of the craft 100 and the determined distance of the particular section noted above, the control system 500 may determine/infer that the rear hydrofoil 136 is in contact with the water.

Figure 19:
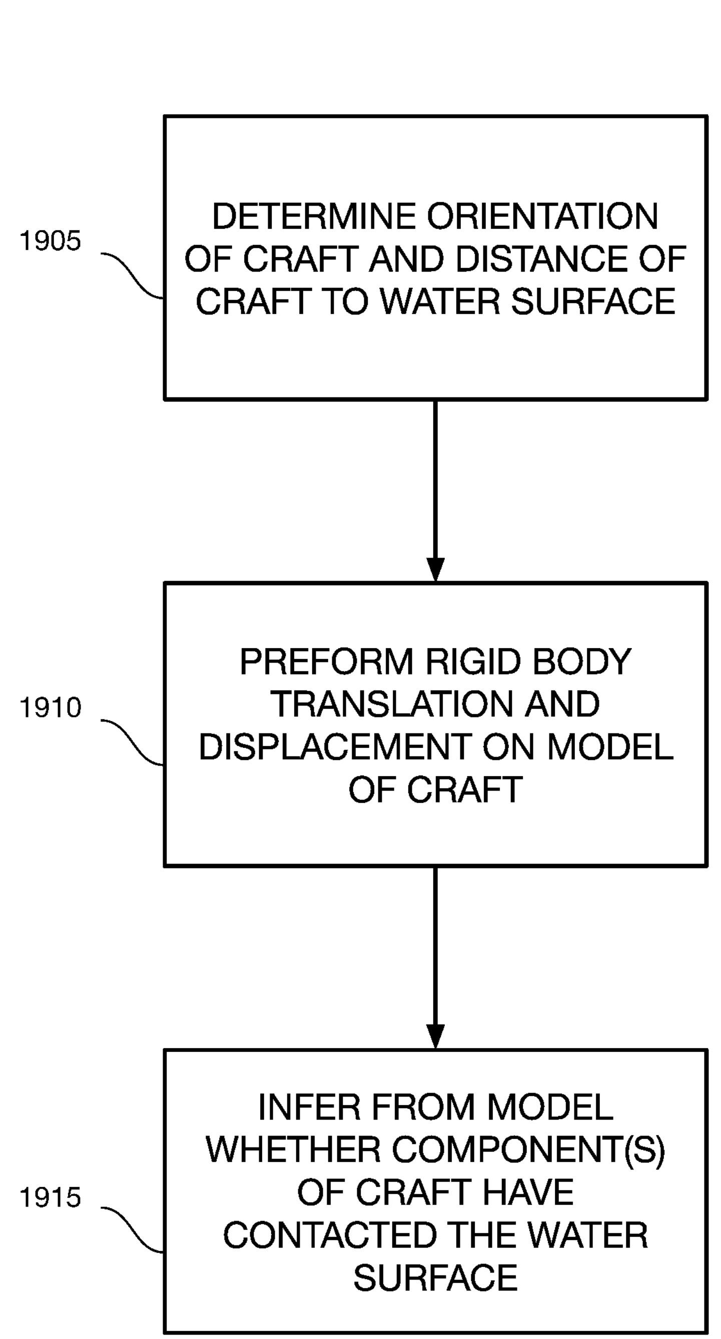
FIG. 19 illustrates operations performed by the craft to infer whether contact with water has occurred, in accordance with example embodiments.

FIG. 19 illustrates examples of operations performed by some examples of the control system 500 to infer contact with the water based on the geometry of the craft 100. The operations at block 1905 involve the control system 500 determining the orientation and the altitude of the craft 100 relative to the surface of the water. As noted above, some examples of the craft 100 include sensors that facilitate determining the altitude and orientation of the craft 100. For instance, the control system 500 may determine the altitude and the orientation of the craft 100 based on information communicated from an inertial measurement unit (IMU), an altimeter, a global navigation satellite system (GNSS), etc.

In some examples, the orientation and the altitude of the craft 100 are determined relative to a particular point on the craft 100. For instance, in some examples, this point corresponds to the center of mass of the craft 100 (see, e.g., point 1205A in FIG. 12). In some examples, the center of mass is a fixed/particular point on the craft 100, such as the middle of the fuselage proximate to the main wing. In some examples, the center of mass of the craft 100 depends on craft loading (e.g., the amount and distribution of cargo, passengers, etc.) and its position along the longitudinal axis of the craft 100 may vary. For instance, when the craft 100 is more heavily loaded towards the front, the center of mass may correspond to a position along the longitudinal axis towards the front of the craft 100. When the craft 100 is more heavily loaded towards the rear, the center of mass may correspond to a position along the longitudinal axis towards the rear of the craft 100.

The operations at block 1910 involve performing rigid body model translation and displacement on a geometric/rigid body model that represents one or more aspects of the craft 100. For instance, as described in more detail below, some examples of the control system 500 apply a rigid body translation and displacement matrix that specifies the altitude and orientation of the craft to the body model of the craft to determine positions of, for example, leading and/or trailing tips of the hydrofoil(s) with respect to the center of gravity of the craft.

Figure 20:
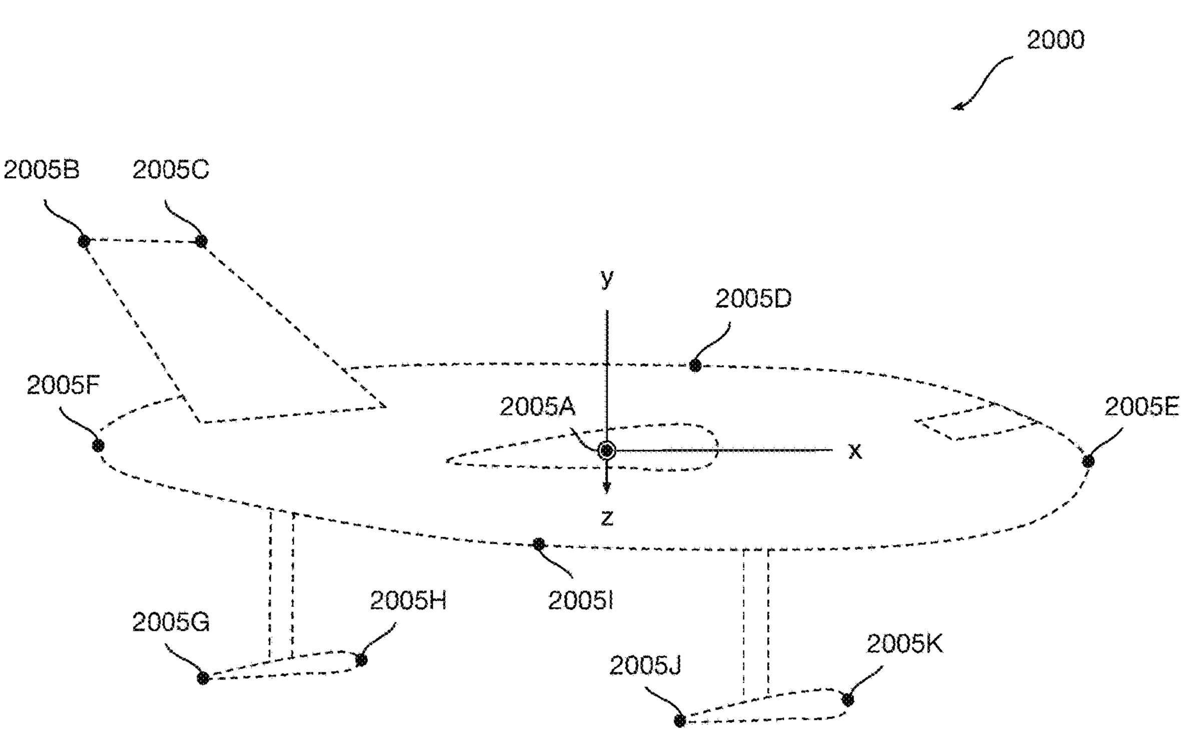
FIG. 20 illustrates a rigid body model of the craft, in accordance with example embodiments.

FIG. 20 shows an example of a rigid body model 2000 of the craft 100. Some examples of the rigid body model 2000 may include a collection of points 2005 that represent the relative positions of different sections of the craft 100 in a body frame or coordinate system associated with the craft 100. Note that the dashed lines in the figure represent the shape of the craft 100 and are only shown for illustrative purposes. The center of mass noted above may correspond to the point 2005A at the origin of the body frame. The fuselage may extend along the x-axis of the body frame. The main wing may extend along the z-axis of the body frame. Components on the topside of the craft 100 (e.g., tail rudder) may be represented by points 2005B-2005D that are above the x-z plane (i.e., may have positive y coordinates). Components on the bottom side of the craft 100 (e.g., the hydrofoils, bottom of the hull, etc.) may be represented by points 2005G-K that are below the x-z plane (i.e., may have negative y coordinates).

In some examples, a rigid body model transformation matrix that specifies the altitude and the orientation of the craft 100 may be generated and applied to the rigid body model 2000 to determine the location (i.e., x, y, z coordinates) of the points 2005 of the craft 100 noted above relative to the surface of the water. For instance, in some examples, a 4×4 homogenous matrix that specifies a rotation component and a translation component is generated. The rotation component may be generated based on the orientation of the craft 100. The translation component may be generated based on the distance of the craft 100 above the water (e.g., the altitude of the craft 100).

Application of the coordinates of the points 2005 of the rigid body model 2000 to the transformation matrix represents/transforms the rigid body model coordinates of these points 2005 to coordinates that are relative to the water surface. For example, the rigid body model 2000 may specify a point 2005G corresponding to the trailing tip of the rear hydrofoil 136 to be 2 meters below the point 2005A at the origin of the body frame, which may correspond to the center of mass of the craft 100. This point 2005A may be determined (e.g., via sensors of the craft) to be at an altitude/threshold distance above the water of 3 meters. After the transformation of the coordinates of the body model, the point 2005G corresponding to the trailing tip of the rear hydrofoil 136 may be determined to be 1 meter above the water.

The points 2005 shown in FIG. 20 are merely examples. It is understood that the quantity of points 2005 may be different. For example, instead of representing the rear hydrofoil 136 and the main hydrofoil 130 with just a leading tip and trailing tip, three or more points 2005 may be used to provide a more granular representation of the surface(s) (e.g., bottom surface) of the hydrofoils.

In some examples, the rigid body model 2000 of the craft 100 is dynamically modified based on the configuration of the craft 100. For instance, as previously noted, in some examples of the craft 100, the hydrofoils can be extended from the hull and retracted back towards the hull. In some examples, the AOA of the hydrofoils can be adjusted. Accordingly, to represent these dynamic changes, in some examples, the coordinates of the points 2005 in the body model that define such dynamic features of the craft 100 are adjusted (e.g., in real-time) to accurately reflect the configuration of the craft 100 at any particular instance. For instance, as the hydrofoils are retracted, the points representing the hydrofoils will move closer to the x-z-plane. As the hydrofoils are extended, the points representing the hydrofoils will move further from the x-z-plane. As the AOA of hydrofoils is increased, the respective points representing the front tips of the hydrofoils will move closer to the x-z-plane, and the respective points representing the rear tips of the hydrofoils will move further from the x-z-plane. As the AOA is decreased, the opposite adjustments will occur.

Figure 21A:
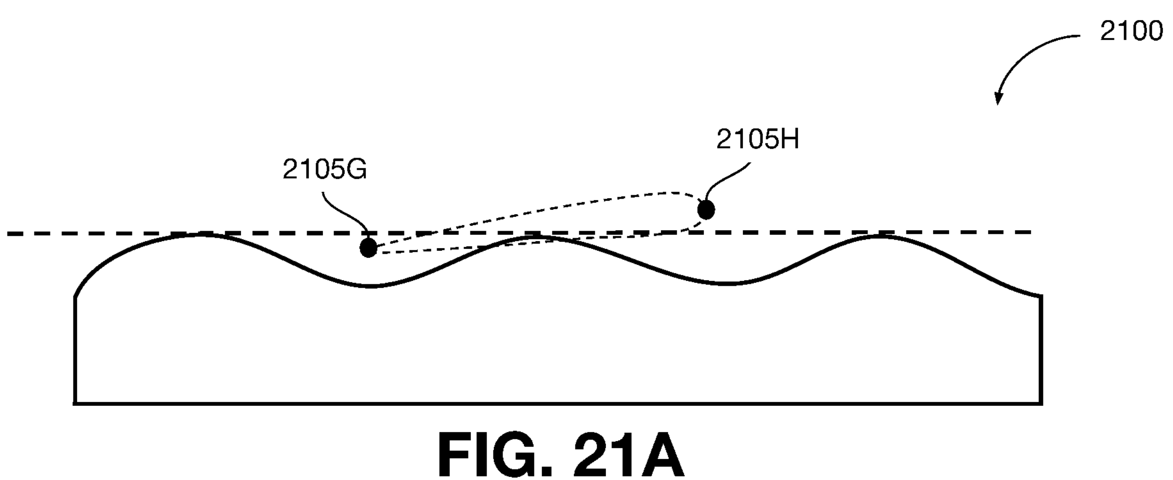
FIGS. 21A-21D illustrate different situations in which a hydrofoil is inferred to have made contact with water, in accordance with example embodiments.
Figure 21B:
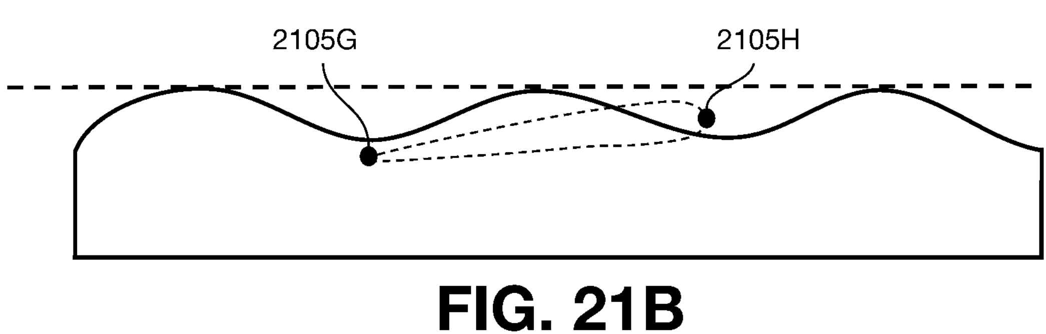

The operations at block 1915 involve the control system 500 inferring from the transformed model whether one or more components of the craft 100 have contacted the water. FIGS. 21A and 21B illustrate examples of situations in which the control system 500 may infer that contact with the water has occurred. As shown, in FIG. 21A, in some examples, contact with the water (e.g., contact between one or more hydrofoils and the water) is inferred to have occurred when any one point of the transformed rigid body model 2000 is below a plane 2100 that represents the water surface. For example, after the rear tip point 2005G associated with the rear hydrofoil 136 is determined to be below the plane 2100, the rear hydrofoil 136 is inferred to have made contact with the water. As shown in FIG. 21B, in some examples, water contact with a particular component is inferred when all the tip points associated with the particular component of the craft 100 (e.g., a particular hydrofoil) are below the plane 2100. In some examples, the craft 100 is inferred to have contacted the water when any one component (e.g., a particular hydrofoil) is inferred to have contacted the water. In some examples, the craft 100 is inferred to have contacted the water when a particular group of components (e.g., both the rear hydrofoil 136 and the main hydrofoil 130) have been inferred to have contacted the water.

Figure 21C:
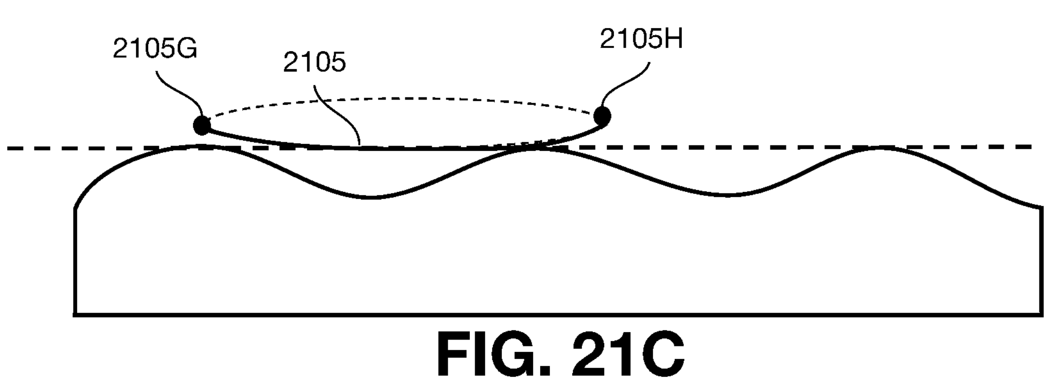

As shown in FIG. 21C, in some examples, one or more surfaces 2105 between points 2005 that represent the extents of any particular hydrofoil are mathematically modeled, and when any point along the modeled surface 2105 intersects the plane 2100, water contact with the hydrofoil is inferred. In some examples, the modeled surface 2105 corresponds to a planar surface that extends between the points 2005 that define the extents of the hydrofoil. Some examples of the surface can be curved and may be defined using various mathematical functions, such as non-uniform rational B-splines (NURBS), Chebyshev polynomials, and polynomial or piecewise continuous polynomial representations of the geometry. Some examples of the curved surface may represent one or more locations along the hydrofoil structure (e.g., strut, foil, leading/trailing edges of the foil, etc.)

As noted above, the surface of the water may be represented by a plane 2100. In some examples, the plane 2100 generally aligns with the wave crests (or a nominal wave crest) of the water. In some other examples, the plane 2100 generally aligns with the wave troughs (or a nominal wave trough) of the water or may align with a midpoint or some other point between the wave crests and the wave troughs. In some examples, the nominal wave height is determined based on information communicated from one or more sensors of the craft 100. For instance, ultrasonic sensors, lidar sensors, mm-wave (radar) sensors, etc., may be arranged on the underside of the hull, hydrofoils, etc., and may be used to measure deviations in the surface height of the water to estimate the wave heights.

Figure 21D:
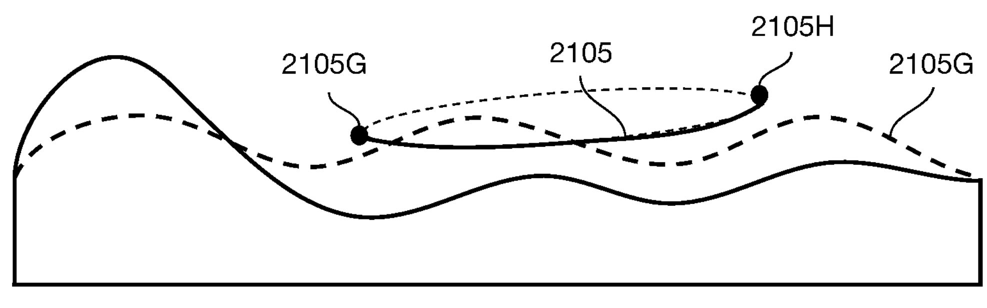

As shown in FIG. 21D, in some examples, the surface of the water may be represented according to a mathematical model, and when one or more points 2005 of components of the craft 100 are below the modeled surface, and/or one or more points along modeled surfaces of components of the craft interest the modeled surface of the water, contact is inferred. In this regard, the sensor information above may be processed according to a mathematical model that estimates the shape of the water surface. For instance, deviations in the sensed height of the water, the periodicity of changes in these deviations, etc., may be processed by the model to infer the shape of the water surface. This information may be used to represent the waves on the surface of the water as a sum of sinusoids with various frequencies, amplitudes, phases, directions, etc. The modeled waves can propagate in different ways, depending on factors such as sea state (which can be stochastic or unpredictable), and the type of waves themselves (which can be monochromatic or polychromatic). Some examples of techniques that facilitate inferring or estimating the shape of the water surface, and which are used in some examples of the craft 100 described herein, are disclosed in U.S. application Ser. No. 17/875,942, filed Jul. 28, 2022, which is hereby incorporated by reference in its entirety.

Some examples of the craft 100 additionally, or alternatively, use one or more sensors more particularly suited to detecting water contact to determine or infer that the craft 100 has contacted the water. In some examples, these sensors are used to either augment the water contact inference operations described above or to independently verify that water contact has occurred. For instance, some examples of the craft 100 are equipped with pressure sensors on the hydrofoils that facilitate determining the craft's proximity to the water. The pressure sensors may detect contact with the water by measuring a sudden increase in pressure when the hydrofoil hits or submerges in the water, transitioning from measuring atmospheric pressure to a higher value. Some examples of the craft 100 include one or more conductivity sensors on the hydrofoils. The conductivity sensors may detect contact with the water by measuring a sudden increase in conductivity. Some examples of the craft 100 include laser diodes on each hydrofoil tip and detectors that detect emissions from the laser diodes. The detectors are arranged at various locations on the craft 100 (e.g., strut, wings, main body, etc.). The amount of power received by each sensor will change when the laser light emitted by the laser diode is in the water because the direction of the light will change as the light transitions between the water and the air. Some examples of the craft 100 include acoustic detectors configured to sense changes in ambient noise that occur when the hydrofoils contact the water.

In some examples, the control system 500 implements a "Digital Twin" model of the craft 100 that receives information specifying aspects of the environment in which the craft 100 is operating and makes one or more predictions as to how the craft 100 will behave in the environment. For instance, some examples of the model receive information that specifies the craft 100's heading, altitude, and orientation, information about the wind direction and magnitude, etc. The model then generates predictions of how the craft 100 will behave under such conditions, which in some examples includes indicating how modifying various control surfaces of the craft 100 will change an outcome. In some examples, information used by the control system 500 in inferring whether water contact has occurred is input to the digital twin model. For instance, in some examples, information that characterizes the surface of the water (e.g., size, direction, periodicity, etc., of waves) is input to the digital twin model along with information that specifies the configuration of one or more components of the craft 100 (e.g., rear hydrofoil extension amount, angle of attack, etc.). The digital twin model may use this information to predict, for example, when water contact will occur.

C. On-Water Deceleration Mode

Returning to FIG. 16, the operations at block 1625 involve the craft performing on-water deceleration. The operations may commence at the time, i.e., just after, the craft 100 makes initial contact with the water. Such operations include operations to decelerate the craft 100 in such a manner as to generally maintain comfortable and/or otherwise desirable control of the craft, and include, e.g., preventing the craft 100 from diving unnecessarily deep into the water and bouncing out of and splashing into the water. Preventing these movements maximizes passenger comfort and minimizes stress on the craft 100.

Figure 22A:
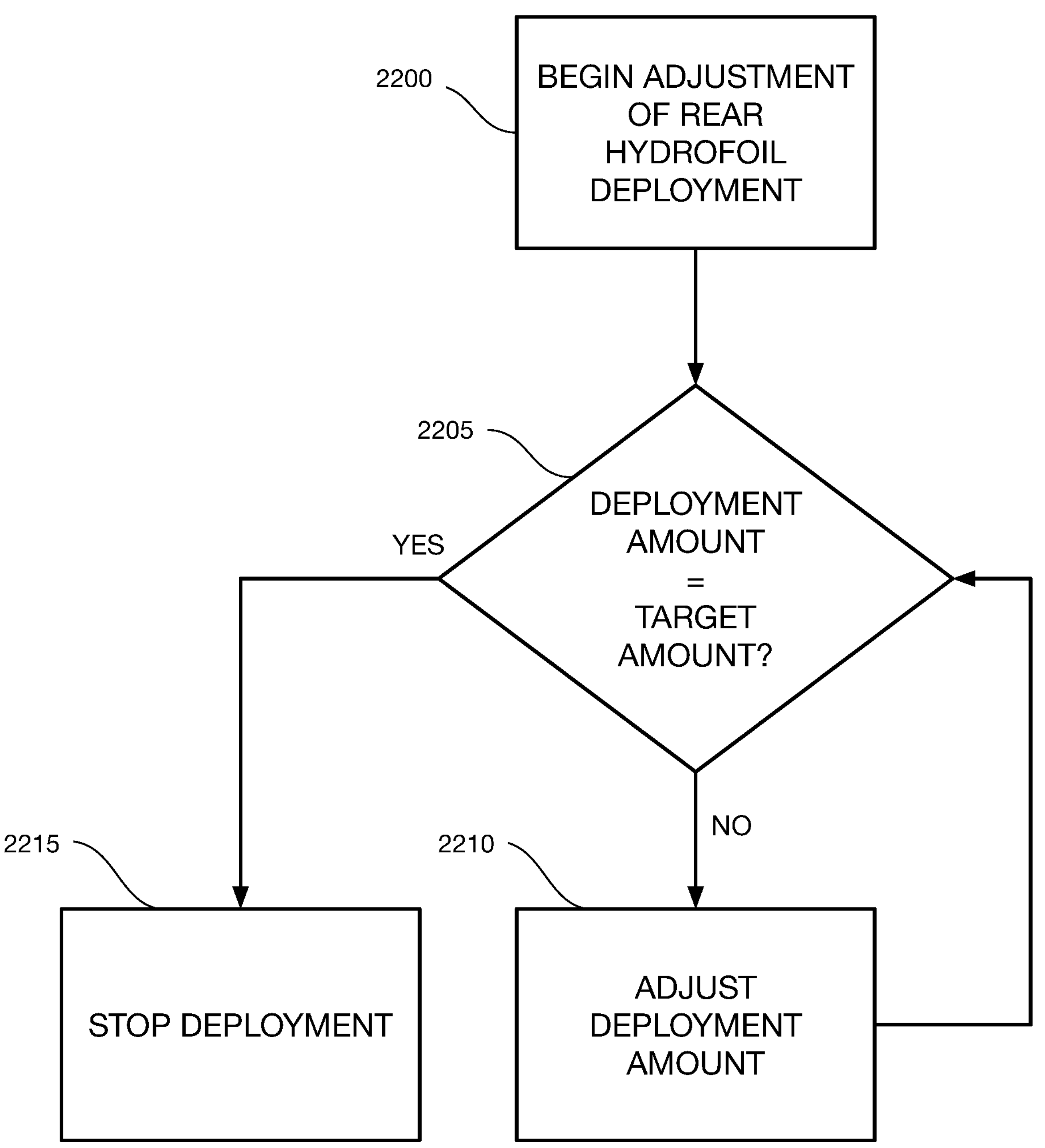
FIGS. 22A-22C illustrate operations performed by the craft while performing on-water deceleration, in accordance with example embodiments.
Figure 22B:
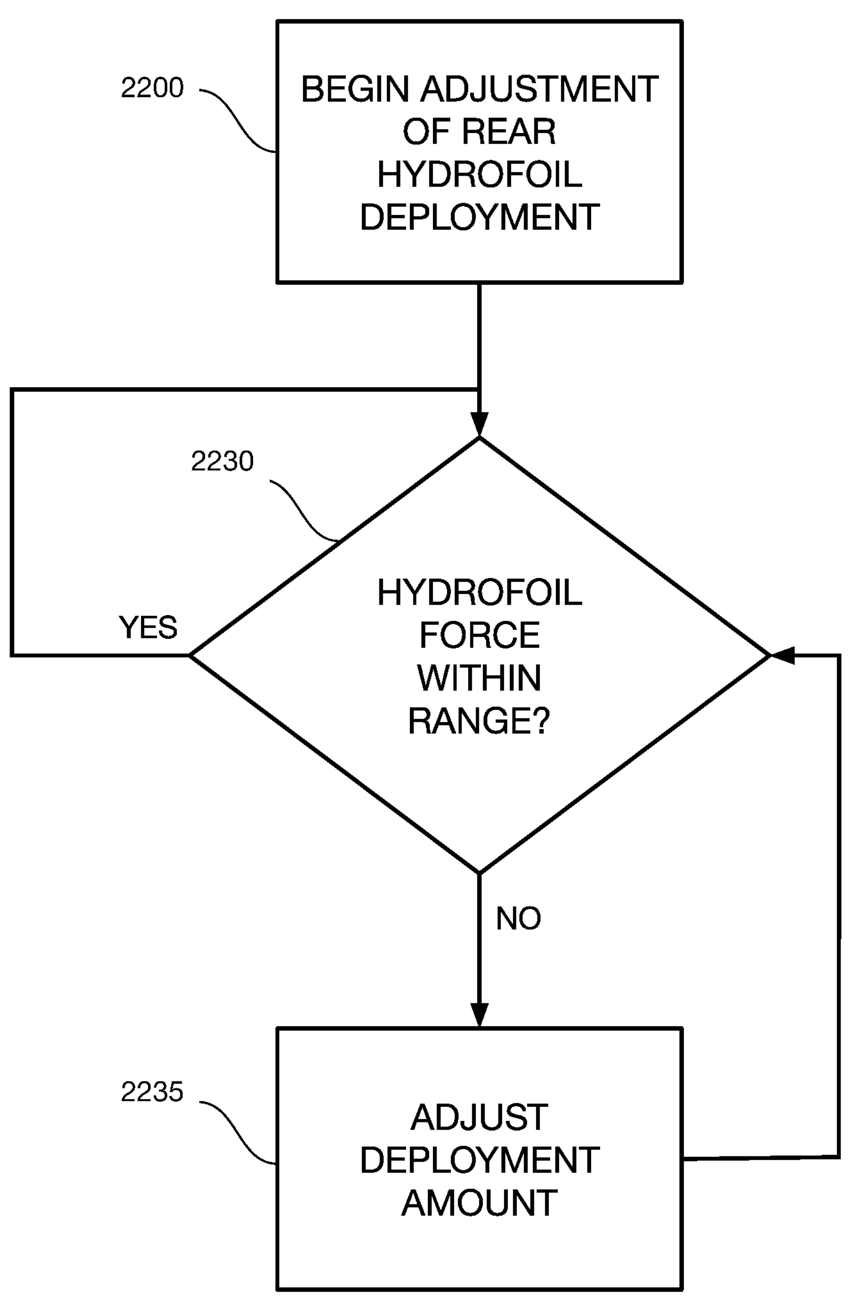
Figure 22C:
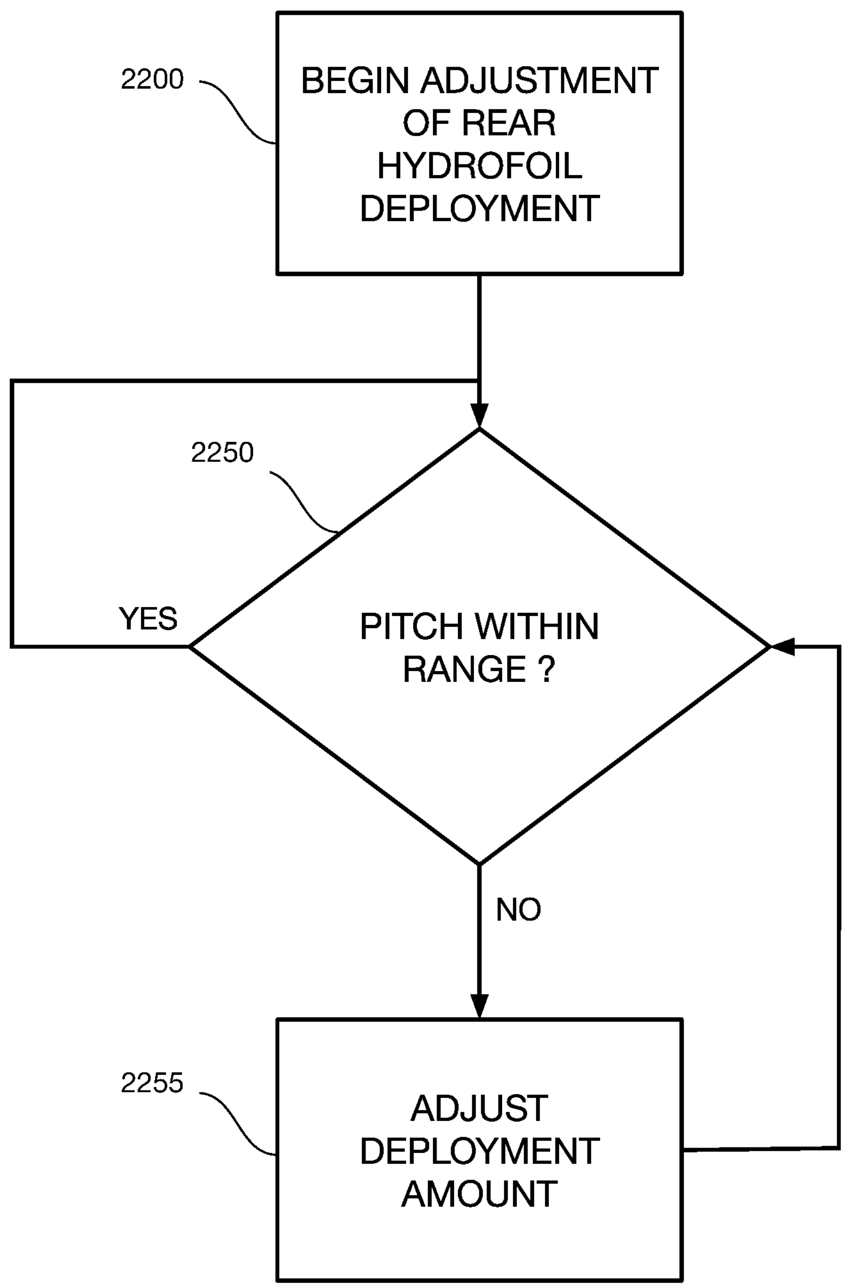

FIGS. 22A-22C show examples of example operations that might be carried out in connection with block 925 to extend the rear hydrofoil 136 from the retracted position. As previously noted, in some examples, the rear hydrofoil 136 may already be partially extended before the craft 100 contacts the water. Accordingly, in some particular implementations, the operations described in FIGS. 22A-22C are not performed when the rear hydrofoil 136 is already extended or partially extended. In some other implementations, however, some aspects of the operations described herein may be performed to an extent when the rear hydrofoil 136 is already deployed or particularly deployed.

For instance, as noted if the rear hydrofoil 136 is retracted (e.g., fully retracted) the operations may involve deploying the rear hydrofoil 136 to an extent. If the rear hydrofoil 136 is already deployed to an extent (i.e., before contact with the water has been made), the deployment amount may be adjusted.

In some examples, the operations are performed after, and in some instances immediately after, contacting the water. Such deployment/adjustment of the rear hydrofoil may be done in such a manner as to attempt to maintain the pitch of the craft 100 nearly flat or slightly pitched upward (e.g., about 2.5 degrees) and the ride height at a nominal distance from the water (e.g., about 0.5 meters). For instance, in some examples, the control system 500 is configured to control the craft to operate at a desired/target ride height above the water and with a desired/target pitch. In some examples, the craft 100 is operating at or has reached the target pitch just before the craft 100 contacts the water (i.e., during or by the end of the initial contact mode operations described above). However, after initial contact with the water, the pitch of the craft 100 may start to deviate from the target pitch, and the craft 100 may descend into the water by more than the desired amount such that the craft is below the target right height. Therefore, the control system 500 may control deployment/adjustment of the rear hydrofoil 136 and in some cases various adjust control surfaces of the craft 10 to cause the craft 100 to return to the target pitch and/or the target ride height. In some examples, such adjustment of the control surfaces occurs regardless of whether the rear hydrofoils are extended or extended further.

To facilitate the operations above including attempting to reach the desired operating pitch and ride height, the control system 500 may monitor the speed of the craft 100, forces against the rear hydrofoil 136, the pitch of the craft 100, etc., to determine whether to adjust various control surfaces and/or to determine whether to continue extending (or retracting) the rear hydrofoil 136 and by how much. Relatedly, the control system 500 may determine whether to extend (or retract) the main hydrofoil 130 and by how much.

In some examples, the main hydrofoil 130 remains in the fully retracted position during the entire duration of this mode of operation. In some other examples, the main hydrofoil 130 may be extended to an extent that is less than the extent by which the rear hydrofoil 136 is extended.

Referring to FIG. 22A, the operations at block 2205 involve the control system 500 either directly or indirectly, adjusting the amount by which the rear hydrofoil 136 is deployed. The operations at block 2205 involve determining by the control system 500 whether the rear hydrofoil 136 has been extended to a target extension amount. If the rear hydrofoil 136 has not yet reached the target extension amount, then at block 2210, the rear hydrofoil 136 is extended further, and the operations repeat from block 1905. If the rear hydrofoil 136 has reached the target extension amount, then as indicated in block 2215, the extension of the rear hydrofoil 136 may cease. In some instances, the rear hydrofoil 136 may extend beyond the target amount and the control system 500 may control the rear hydrofoil 136 to retract towards the target extension amount. In some examples the target extension amount may be updated automatically on an ongoing basis based on observed conditions of the craft 100 (e.g., observed pitch, speed, etc.) and/or based on operator input and the control system 100 may responsively adjust the deployment/retraction of the rear hydrofoil 136 to cause the rear hydrofoil 136 to reach the target extension amount.

When the craft 100 contacts the water, it may be cruising at or close to the target decelerated airspeed. In general, if the rear hydrofoil 136 were to be extended too much while the craft 100 is cruising at this airspeed, stresses may be imparted on the rear hydrofoil 136 that may cause the craft 100 to abruptly pitch downward. This movement may be uncomfortable for passengers. Too little deployment, on the other hand, may result in a lack of control authority because the rear hydrofoil 136 may not be sufficiently extended below the surface of the water. Accordingly, in some examples, the rear hydrofoil 136 may be extended to a target extension amount of about 25% of the maximum extension available. In some configurations, this amount of hydrofoil extension facilitates adequate control authority while minimizing the uncomfortable movements noted above.

In some examples, the deployment of the rear hydrofoil 136 that occurs during block 2210 happens relatively quickly. For example, the rear hydrofoil 136 may be extended to the target extension amount as rapidly as possible (e.g., in under five seconds). In other examples, the rear hydrofoil 136 may be gradually extended to the target extension amount over a longer period (e.g., a period of 20 seconds). In some examples, the hydrofoil may be extended in discrete amounts (e.g., 5% increments) until the target extension amount is reached.

The operations shown in FIG. 22B involve the control system 500 either directly or indirectly, causing the rear hydrofoil 136 to deploy in a manner that manages the amount of force imparted on the rear hydrofoil 136. For example, if at block 2230, the force on the rear hydrofoil 136 is below a threshold amount, then at block 2235, the control system 500 may cause the rear hydrofoil 136 to continue to extend. If the force reaches a threshold amount, the control system 500 may cause the extension to cease, and if the force exceeds the threshold, the control system 500 may cause the rear hydrofoil 136 to retract to an extent to bring the force back within range.

The operations shown in FIG. 22C involve the control system 500 either directly or indirectly, causing the rear hydrofoil 136 to deploy in a manner that manages the pitch of the craft 100. For example, the operations may maintain the pitch within a particular pitch range, such as between 0 and 2 degrees. In this regard, if at block 2250 the pitch of the craft 100 is above an upper threshold (e.g., above 2 degrees), then at block 2255, the control system 500 may cause the rear hydrofoil 136 to cease extending (and in some examples retract). As the craft 100 slows down, the pitch will fall within the threshold range. On the other hand, if the pitch is sufficiently low (e.g., less than 0 degrees), the rear hydrofoil 136 may be extended further to bring the pitch of the craft 100 within the range and to add control authority.

It should be understood that the operations described above for extending the rear hydrofoil 136 may be combined in various ways. For example, the rear hydrofoil 136 may be extended to the target amount (e.g., 25%) while the drag and pitch induced on the craft are monitored to ensure that the respective drag and pitch on the craft remain within their corresponding thresholds. If either of these exceeds its corresponding threshold, the extension of the rear hydrofoil 136 may be paused. Extension of the rear hydrofoil 136 may be resumed after the drag and/or pitch fall below their respective thresholds.

D. Hull-Borne Mode and Hydrofoil-Borne Mode

Returning to FIG. 16, the operations at block 1630 involve the craft 100 returning to a hull-borne mode of operation and then to a hydrofoil-borne mode of operation. In some examples, the craft 100 may remain in the hull-borne mode for a given period of time before transitioning to hydrofoil-borne mode. In other examples, the transition from hull-borne mode to hydrofoil-borne mode may happen almost immediately after the craft 100 becomes hull-borne.

The craft 100 generally enters hull-borne mode after the speed of the craft 100 falls below a ground target speed (e.g., 15 kts). During this mode, the likelihood of any bouncing or splashing of the craft 100 is minimized, and it may be expected that the operator is able to exert full control authority over the craft. As such, the motors of the propellers of the craft 100 may be enabled to facilitate moving the craft 100 through the water. Power to the motors of the propellers may be increased automatically or under pilot control to increase the speed of the craft 100. In addition, after entering the hull-borne mode, the main hydrofoil 130 may be extended further and/or fully, and the rear hydrofoil 136 may be extended from its partially extended position to a further-extended position and/or to a fully-extended position. Once the craft 100 attains sufficient speed, the craft 100 will become hydrofoil-borne, where the hull 102 is raised out of the water, and the craft 100 is supported by the hydrofoils. In some examples, the control system 100 adjusts the AOA of the hydrofoils 130, 136 and/or control surfaces of the hydrofoils 130, 136 to cause the craft 100 to become hydrofoil-borne. The control system 500 may cause the craft 100 to become hydrofoil-borne automatically (e.g., when the water speed of the craft reaches a target water speed) and/or when indicated to do so by the operator.

VII. Additional Examples of Takeoff Procdures

Figure 23:
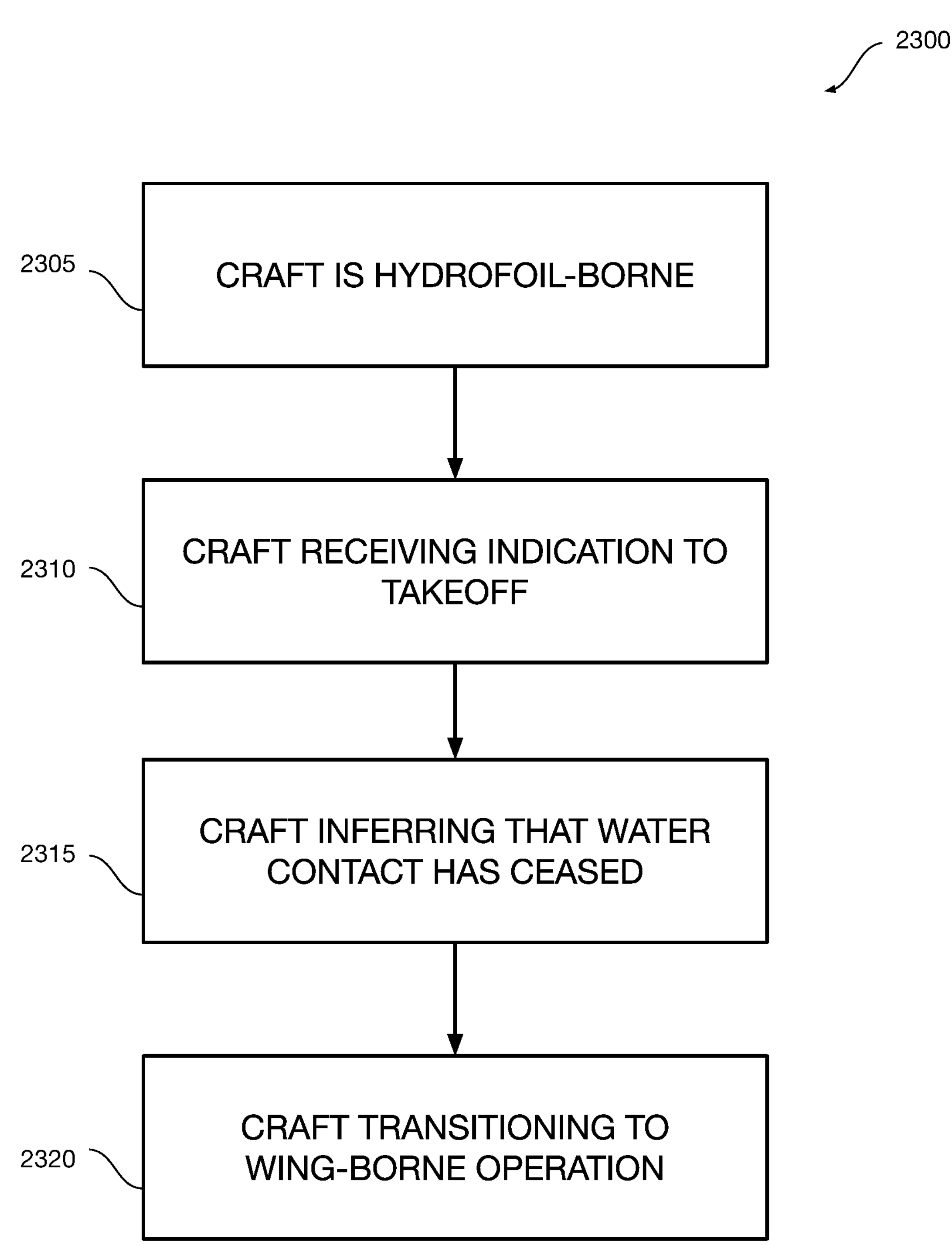
FIG. 23 illustrates takeoff operations performed by the craft, in accordance with example embodiments.

FIG. 23 illustrates examples of operations 2300 performed by some examples of the craft 100 when transitioning from a hydrofoil-borne mode of operation to a wing-borne mode of operation. The operations at block 2305 involve the craft 100 operating in a hydrofoil-borne mode of operation. For example, the craft 100 may be cruising in the water, the rear hydrofoil 136 and the main hydrofoil 130 may be fully extended, and the hull of the craft 100 may be lifted out of the water by the hydro lift acting on the rear hydrofoil 136 and the main hydrofoil 130.

The operations at block 2310 involve the craft 100 receiving an indication to take off. For instance, the operator of the craft 100 may indicate via a cockpit control that take-off should commence. After receiving the indication, the speed of the craft 100 may be increased, and the AOA of the rear hydrofoil 136 and the main hydrofoil 130 may be adjusted to cause the respective hydrofoils to move toward the surface of the water.

The operations at block 2315 involve the craft 100 inferring that the craft 100 is no longer in contact with the water. The operations for making this inference are similar to those discussed above with respect to the landing procedures. For example, the distance or altitude of the center of mass of the craft or some other reference point of the craft that represents the origin of the rigid body model 2000 of the craft 100 may be determined along with the orientation of the craft. A rigid body model transformation matrix that specifies this information may be applied to the points 2005 of the rigid body model 2000 of the craft 100. As the altitude of the craft 100 increases, the transformation matrix is updated such that the transformed points 2005 of the rigid body model 2000 will be determined to have moved in the positive y direction (i.e., towards the water's surface). In some examples, after some (or all) of the points 2005 that specify a particular hydrofoil are inferred to have left the water, that hydrofoil may be inferred to no longer be in contact with the water. In some examples, after both hydrofoils have been inferred to no longer be in contact with the water, the craft 1000 may be inferred to be no longer in contact with the water.

The operations at block 2320 involve the craft 100 transitioning to a wing-borne mode of operation. For example, the control system 500 may cause the rear hydrofoil 136 and the main hydrofoil 130 to fully retract. The control system 500 may cause the motor speed to increase and may control the angles of one or more control surfaces of the craft 100 to change so that the craft will gain altitude.

VIII. Additional Examples

Additional examples are disclosed in the clauses described below. The clauses are arranged within groups for clarity. It is understood that the examples set forth in the the clauses of each group can be combined with the examples set forth in the other clauses of the group and the examples set forth in the clauses of each other group. For example, according to the aspects of the first clause of each group, an example craft comprises:

at least one hull;

at least one wing configured to generate upwards aero lift as air flows past the at least one wing to facilitate wing-borne flight of the craft;

at least one extendible hydrofoil configured to generate upwards hydrofoil lift during a first mode of operation as water flows past the at least one hydrofoil to facilitate hydrofoil-borne movement of the craft through the water; and a control system that comprises data storage having instruction code stored thereon that when executed by one or more processors of the control system causes the control system to:

while the upwards aero lift is below a threshold lift, control the at least one hydrofoil to generate downwards hydrofoil lift that maintains the at least one hydrofoil at least partially submerged in the water;

while the upwards aero lift generated by the at least one wing is below a threshold lift, controlling one or both of the front hydrofoil and the rear hydrofoil to generate a downward hydrofoil lift that causes the front hydrofoil and the rear hydrofoil to remain at least partially submerged in the water;

after the upwards aero lift generated by the at least one wing has increased above the threshold lift, transitioning the craft from hydrofoil-borne operation to wing-borne operation at least in part by controlling one or both of the front hydrofoil and the rear hydrofoil to switch from (a) generating the downward hydrofoil lift to (b) generating an upward hydrofoil lift that pushes the craft up and out of the water;

while the craft is in wing-borne flight and the at least one extendable hydrofoil is in a first position, receive an indication to land the craft on the water;

after receiving the indication to land the craft on water, cause the craft to descend towards the water;

after determining that the craft is within a threshold proximity of the water, cause the at least one extendable hydrofoil to extend from a first position to a second position that is further from the at least one hull;

while the craft is wing-borne and descending towards the water, determine an altitude and an orientation of the craft with respect to a surface of the water;

after the craft is within a threshold distance of the surface of the water, and based on the determined altitude and an orientation of the craft, infer whether the at least one hydrofoil has made contact with the water; and after inferring that the at least one hydrofoil has made contact with the water, cause the craft to change one or more operational settings related to the positioning of the at least one hydrofoil.

Group A

Clause 1. A craft comprising:

at least one hull;

at least one wing configured to generate upwards aero lift as air flows past the at least one wing to facilitate wing-borne flight of the craft;

at least one hydrofoil configured to generate upwards hydrofoil lift during a first mode of operation as water flows past the at least one hydrofoil to facilitate hydrofoil-borne movement of the craft through the water; and a control system, wherein while the craft is hydrofoil-borne, the control system is configured to:

while the upwards aero lift is below a threshold lift, control the at least one hydrofoil to generate downwards hydrofoil lift that maintains the at least one hydrofoil at least partially submerged in the water.

Clause 2. The craft according to clause 1, wherein the threshold lift corresponds to a lift that is sufficient to allow the craft to transition from hydrofoil-borne movement through the water to sustained wing-borne flight.

Clause 3. The craft according to clause 1, wherein while the craft is hydrofoil-borne, at least one hull is lifted above the water.

Clause 4. The craft according to clause 1, wherein after the control system determines the upwards aero lift generated by the at least one wing to correspond to the threshold lift, the control system is configured to control the at least one hydrofoil to increase or decrease the downwards hydrofoil lift generated by the at least one hydrofoil.

Clause 5. The craft according to clause 1, wherein the control system is configured to control the at least one hydrofoil to increase the downwards hydrofoil lift generated by the at least one hydrofoil in proportion to an increase in the upwards aero lift generated by the at least one wing.

Clause 6. The craft according to clause 1, wherein when determining the upwards aero lift generated by the at least one wing, the control system is configured to:

determine a speed of the craft; and determine the upwards aero lift generated by the at least one wing based at least in part on the determined speed of the craft.

Clause 7. The craft according to clause 1, wherein when determining the upwards aero lift generated by the at least one wing, the control system is configured to:

determine the upwards aero lift generated by the at least one wing based at least in part on an angle of attack of the at least one wing, a speed of the craft, and respective deflection angles of one or more control surfaces of the at least one wing.

Clause 8. The craft according to clause 1, wherein the craft comprises a sensor configured to sense a load force on the at least one hydrofoil, wherein when determining the upwards aero lift generated by the at least one wing, the control system is configured to:

determine a sensed load force on the at least one hydrofoil; and determine the upwards aero lift generated by the at least one wing based at least in part on a sensed load force.

Clause 9. The craft according to clause 1, wherein when determining the upwards aero lift generated by the at least one wing, the control system is configured to:

determine lift generated by the at least one hydrofoil based at least in part on an angle of attack of the at least hydrofoil, a speed of the craft, and respective deflection angles of one or more control surfaces of the at least hydrofoil.

Clause 10. The craft according to clause 1, wherein the at least one hydrofoil comprises one or more flaperons, ailerons, or elevators, wherein the control system is configured to adjust respective deflection angles of the one or more flaperons, ailerons, or elevators to thereby control the downwards hydrofoil lift generated by the at least one hydrofoil.

Clause 11. The craft according to clause 1, wherein an angle of incidence of the at least one hydrofoil is adjustable, wherein the control system is further configured to adjust the angle of incidence of the at least one hydrofoil to thereby control the downwards hydrofoil lift generated by the at least one hydrofoil.

Clause 12. A craft comprising:

a hull;

a wing configured to generate upwards aero lift as air flows past the wing to facilitate wing-borne flight of the craft;

a hydrofoil configured to generate upwards hydrofoil lift during a first mode of operation as water flows past the hydrofoil to facilitate hydrofoil-borne movement of the craft through the water;

at least one processor; and tangible, non-transitory computer-readable media that comprises program instructions executable by the at least one processor to configure the craft to:

as the craft accelerates, adjust downwards hydrofoil lift generated by the hydrofoil to maintain the hydrofoil at least partially submerged in the water; and after determining that the upwards aero lift is sufficient to allow the craft to sustain flight, decrease the downwards hydrofoil lift generated by the hydrofoil to allow the hydrofoil to exit the water and the craft to become wing-borne.

Clause 13. The craft according to clause 12, wherein the tangible, non-transitory computer-readable media that comprises program instructions executable by the at least one processor to configure the craft to adjust the downwards hydrofoil lift generated by the hydrofoil comprises program instructions executable by the at least one processor to configure the craft to:

while the craft is hydrofoil-borne and the wing is generating the upwards aero lift, adjust the hydrofoil lift generated by the hydrofoil to transition from a positive lift that raises the craft to a negative lift that opposes the upwards aero lift to thereby maintain the hydrofoil at least partially submerged in the water while craft accelerates.

Clause 14. The craft according to clause 12, wherein the tangible, non-transitory computer-readable media that comprises program instructions executable by the at least one processor to configure the craft to adjust the downwards hydrofoil lift generated by the hydrofoil comprises program instructions executable by the at least one processor to configure the craft to:

increase the downwards hydrofoil lift generated by the hydrofoil in proportion to an increase in the upwards aero lift generated by the wing.

Clause 15. The craft according to clause 12, wherein the tangible, non-transitory computer-readable media that comprises program instructions executable by the at least one processor to configure the craft to determine the upwards aero lift generated by the wing comprises program instructions executable by the at least one processor to configure the craft to:

determine a speed of the craft; and determine the upwards aero lift generated by the wing based at least in part on the determined speed of the craft.

Clause 16. The craft according to clause 12, wherein the tangible, non-transitory computer-readable media that comprises program instructions executable by the at least one processor to configure the craft to determine the upwards aero lift generated by the wing comprises program instructions executable by the at least one processor to configure the craft to:

determine an angle of attack of the wing; and determine the upwards aero lift generated by the wing based at least in part on an angle of attack of the wing.

Clause 17. The craft according to clause 12, wherein the craft comprises a sensor configured to sense a load force on the hydrofoil, wherein the tangible, non-transitory computer-readable media that comprises program instructions executable by the at least one processor to configure the craft to determine the upwards aero lift generated by the wing comprises program instructions executable by the at least one processor to configure the craft to:

determine a sensed load force on the hydrofoil; and determine the upwards aero lift generated by the wing based at least in part on a sensed load force.

Clause 18. The craft according to clause 12, wherein the hydrofoil comprises one or more flaperons, ailerons, or elevators, and wherein the tangible, non-transitory computer-readable media that comprises program instructions executable by the at least one processor to configure the craft to adjust the hydrofoil lift generated by the hydrofoil comprises program instructions executable by the at least one processor to configure the craft to:

adjust respective angles of deflection of the one or more flaperons or ailerons of the hydrofoil to thereby control the upwards hydrofoil lift and the downwards hydrofoil lift generated by the hydrofoil.

Clause 19. The craft according to clause 12, wherein the hydrofoil is moveable, and wherein the tangible, non-transitory computer-readable media comprise further program instructions executable by the at least one processor to configure the craft to:

extend the hydrofoil below the hull of the craft for submersion in the water and to at least partially retract into the hull of the craft after the craft is wing-borne.

Clause 20. The craft according to clause 19, wherein the tangible, non-transitory computer-readable media that comprises program instructions executable by the at least one processor to configure the craft to adjust the downwards hydrofoil lift generated by the hydrofoil comprises program instructions executable by the at least one processor to configure the craft to:

adjust one or both of an angle or a distance at which the hydrofoil extends below the hull to thereby control the downwards hydrofoil lift generated by the hydrofoil.

Group B

Clause 1. A craft comprising:

at least one hull;

at least one wing configured to generate upwards aero lift as air flows past the at least one wing to facilitate wing-borne flight of the craft;

a front hydrofoil connected to the at least one hull via a front hydrofoil strut and configured to generate upward hydrofoil lift as water flows past the front hydrofoil to facilitate hydrofoil-borne movement of the craft through the water;

a rear hydrofoil connected to the at least one hull via a rear hydrofoil strut and configured to generate upward hydrofoil lift as water flows past the rear hydrofoil to facilitate hydrofoil-borne movement of the craft through the water; and a control system, wherein while the craft is hydrofoil-borne, the control system is configured to facilitate transition of the craft from hydrofoil-borne operation to wing-borne operation via a process comprising:

while the upwards aero lift generated by the at least one wing is below a threshold lift, controlling one or both of the front hydrofoil and the rear hydrofoil to generate a downward hydrofoil lift that causes the front hydrofoil and the rear hydrofoil to remain at least partially submerged in the water; and after the upwards aero lift generated by the at least one wing has increased above the threshold lift, transitioning the craft from hydrofoil-borne operation to wing-borne operation at least in part by controlling one or both of the front hydrofoil and the rear hydrofoil to switch from (a) generating the downward hydrofoil lift to (b) generating an upward hydrofoil lift that pushes the craft up and out of the water.

Clause 2. The craft of clause 1, wherein transitioning the craft from hydrofoil-borne operation to wing-borne operation further comprises causing the rear hydrofoil and the front hydrofoil to exit from the water at about the same time while the craft transitions from hydrofoil-borne operation to wing-borne operation, wherein causing the rear hydrofoil and the front hydrofoil to exit from the water at about the same time comprises one of (i) causing the rear hydrofoil to exit the water within less than about 5-7 seconds after the front hydrofoil has exited the water or (ii) causing the rear hydrofoil to exit the water within less than about 5-7 seconds before the front hydrofoil exits the water.

Clause 3. The craft of clause 2, wherein causing the rear hydrofoil and the front hydrofoil to exit from the water at about the same time comprises adjusting one or both of the front hydrofoil strut or the rear hydrofoil strut to cause the rear hydrofoil and the front hydrofoil to exit from the water at about the same time while the craft transitions from hydrofoil-borne operation to wing-borne operation.

Clause 4. The craft of clause 2, wherein causing the rear hydrofoil and the front hydrofoil to exit from the water at about the same time comprises:

as a pitch angle of the craft increases and the rear hydrofoil becomes less co-planar with the front hydrofoil relative to the surface of the water, retracting or otherwise adjusting the rear hydrofoil strut in a manner to cause the rear hydrofoil and the front hydrofoil to exit from the water at about the same time while the craft transitions from hydrofoil-borne operation to wing-borne operation.

Clause 5. The craft of clause 2, wherein causing the rear hydrofoil and the front hydrofoil to exit from the water at about the same time comprises:

as a pitch angle of the craft increases and the rear hydrofoil becomes less co-planar with the front hydrofoil relative to the surface of the water, adjusting the front hydrofoil strut in a manner to cause the rear hydrofoil and the front hydrofoil to exit from the water at about the same time while the craft transitions from hydrofoil-borne operation to wing-borne operation.

Clause 6. The craft of clause 1, wherein transitioning the craft from hydrofoil-borne operation to wing-borne operation further comprises one or more of (i) adjusting the front hydrofoil strut so that the front hydrofoil is further from the at least one hull than the rear hydrofoil, or (ii) retracting or otherwise adjusting the rear hydrofoil strut so that the rear hydrofoil is closer to the at least one hull than the front hydrofoil.

Clause 7. The craft of clause 1, wherein transitioning the craft from hydrofoil-borne operation to wing-borne operation in part by controlling one or both of the front hydrofoil and the rear hydrofoil to switch from (a) generating the downward hydrofoil lift to (b) generating an upward hydrofoil lift that pushes the craft up and out of the water comprises:

while the front hydrofoil is generating downward hydrofoil lift, positioning one or more elements of the rear hydrofoil into a pre-takeoff arrangement that one or both (i) generates downward hydrofoil lift while in hydrofoil-borne operation or (ii) causes the front of the craft to pitch upwards while in hydrofoil-borne operation; and after positioning the one or more elements of the rear hydrofoil into the pre-takeoff arrangement, positioning one or more elements of one or both of the front hydrofoil and the rear hydrofoil to implement a push-up procedure configured to push the craft upwards and out of the water to achieve wing-borne operation.

Clause 8. The craft of clause 7, wherein positioning one or more elements of the rear hydrofoil into the pre-takeoff arrangement comprises positioning the one or more elements of the rear hydrofoil according to one of a plurality of states, wherein the plurality of states comprises (i) a wave state that configures the one or more elements of the rear hydrofoil to cause the front of the craft to pitch upwards in weather conditions comprising waves having any one or more of a wave height greater than a wave height threshold, wave amplitude greater than a wave amplitude threshold, a wave period greater than a wave period threshold, a wavelength greater than a wavelength threshold, a wave frequency greater than a wave frequency threshold, and/or a wave speed that is greater than a wave speed threshold, (ii) a wind state that configures the one or more elements of the rear hydrofoil to cause the front of the craft to pitch upwards in weather conditions comprising wind having any one or more of a wind speed greater than a wind speed threshold, a wind gust greater than a wind gust threshold, and/or a wind direction that differs from a desired wind direction by more than a threshold direction, and (iii) a craft weight state that configures the one or more elements of the rear hydrofoil to cause the front of the craft to pitch upwards in craft weight conditions comprising any one or more of a craft weight greater than a threshold craft weight, or a craft center of gravity that deviates more than a threshold amount from a desired center of gravity.

Clause 9. The craft of clause 7, wherein positioning one or more elements of the rear hydrofoil into the pre-takeoff arrangement comprises positioning one or more elements of the rear hydrofoil to cause the front of the craft to maintain pitch within a preconfigured range of values between (i) about flat relative to a center of gravity of the craft and (ii) an upward pitch relative to the center of gravity of the craft.

Clause 10. The craft of clause 7, wherein positioning the one or more elements of the rear hydrofoil into the pre-takeoff arrangement comprises one or more of (i) setting a depth of the rear hydrofoil to an initial depth to cause a desired upward pitch of the front of the craft, (ii) after setting the depth of the rear hydrofoil to the initial depth, adjusting the rear hydrofoil strut to maintain the desired upward pitch of the front of the craft, (iii) setting one or more flaps or other control surfaces of the rear hydrofoil to one or more initial positions configured to cause the desired upward pitch of the front of the craft, and (iv) after setting the one or more flaps or other control surfaces of the rear hydrofoil to one or more initial positions, adjusting the one or more flaps or other control surfaces of the rear hydrofoil to maintain the desired upward pitch of the front of the craft.

Clause 11. The craft of clause 7, wherein positioning one or more elements of one or both of the front hydrofoil and the rear hydrofoil to implement the push-up procedure comprises:

positioning one or more elements of one or both of the front hydrofoil and the rear hydrofoil based on one or both of (i) a desired upward velocity of the craft and (ii) a desired pitch angle of the craft, wherein positioning one or more elements of one or both of the front hydrofoil and the rear hydrofoil comprises one or more of:

adjusting the front hydrofoil strut to control a depth of the front hydrofoil;

controlling one or more flaps and/or other control surfaces of the front hydrofoil to generate upward hydrofoil lift;

adjusting the rear hydrofoil strut to control a depth of the rear hydrofoil; and controlling one or more flaps and/or other control surfaces of the rear hydrofoil to generate upward hydrofoil lift.

Clause 12. The craft of clause 7, wherein positioning one or more elements of one or both of the front hydrofoil and the rear hydrofoil to implement the push-up procedure comprises:

setting a trailing edge of one more flaps or other control surfaces of the rear hydrofoil at a first angle down relative to the surface of the water to generate an upward hydrofoil lift; and setting a trailing edge of one more flaps or other control surfaces of the front hydrofoil at a second angle down relative to the surface of the water to generate an upward hydrofoil lift, wherein the first angle down and the second angle down are configured to cause one or more of (i) a total amount of hydrofoil lift or (ii) a desired upward pitch of the front of the craft.

Clause 13. The craft of clause 12, wherein the first angle down relative to the surface of the water for the trailing edge of the one more flaps or other control surfaces of the rear hydrofoil is between about 2-5 degrees, and wherein the second angle down relative to the surface of the water for the trailing edge of the one more flaps or other control surfaces of the front hydrofoil is between about 3-7 degrees.

Clause 14. The craft of clause 7, wherein positioning one or more elements of one or both of the front hydrofoil and the rear hydrofoil to implement the push-up procedure comprises:

controlling the one or more elements of one or both of the front hydrofoil and the rear hydrofoil to cause the front of the craft to pitch upwards by one or more of (i) adjusting the front hydrofoil strut to cause the front of the craft to pitch upwards, (ii) causing the front hydrofoil to generate more upward hydrofoil lift than the rear hydrofoil during the push-up procedure, or (iii) causing the front hydrofoil to switch from generating downward hydrofoil lift to generating upward hydrofoil lift before causing the rear hydrofoil to switch from generating downward hydrofoil lift to generating upward hydrofoil lift.

Clause 15. The craft of clause 1, wherein controlling one or both of the front hydrofoil and the rear hydrofoil to switch from (a) generating the downward hydrofoil lift to (b) generating an upward hydrofoil lift that pushes the craft up and out of the water comprises:

causing one or both of the front hydrofoil and the rear hydrofoil to switch from generating downward hydrofoil lift to generating upward hydrofoil lift at about the same time, wherein causing one or both of the front hydrofoil and the rear hydrofoil to switch from generating downward hydrofoil lift to generating upward hydrofoil lift at about the same time comprises one of (i) switching the front hydrofoil from generating downward hydrofoil lift to generating upward hydrofoil lift within less than about 1-3 seconds before switching the rear hydrofoil from generating downward hydrofoil lift to generating upward hydrofoil lift, or (ii) switching the front hydrofoil from generating downward hydrofoil lift to generating upward hydrofoil lift within less than about 1-3 seconds after switching the rear hydrofoil from generating downward hydrofoil lift to generating upward hydrofoil lift.

Clause 16. The craft of clause 35, wherein causing one or both of the front hydrofoil and the rear hydrofoil to switch from generating downward hydrofoil lift to generating upward hydrofoil lift at about the same time comprises (i) for the front hydrofoil, initiating the switch from generating downward hydrofoil lift to generating upward hydrofoil lift based least in part on how quickly one or more elements of the front hydrofoil can be repositioned from generating downward hydrofoil lift to generating upward hydrofoil lift considering one or more of the front hydrofoil actuation speed, actuation distance, or magnitudes of the downward hydrofoil lift and desired upward hydrofoil lift, and (ii) for the rear hydrofoil, initiating the switch from generating downward hydrofoil lift to generating upward hydrofoil lift based least in part on how quickly one or more elements of the rear hydrofoil can be repositioned from generating downward hydrofoil lift to generating upward hydrofoil lift considering one or more of the rear hydrofoil actuation speed, actuation distance, or magnitudes of the downward hydrofoil lift and desired upward hydrofoil lift.

Clause 17. The craft of clause 1, wherein controlling one or both of the front hydrofoil and the rear hydrofoil to switch from (a) generating the downward hydrofoil lift to (b) generating an upward hydrofoil lift that pushes the craft up and out of the water comprises:

switching the front hydrofoil from generating downward hydrofoil lift to generating upward hydrofoil lift before switching the rear hydrofoil from generating downward hydrofoil lift to generating upward hydrofoil lift to cause the front of the craft to pitch upward during a time between switching the front hydrofoil from generating downward hydrofoil lift to generating upward hydrofoil lift and switching the rear hydrofoil from generating downward hydrofoil lift to generating upward hydrofoil lift.

Clause 18. The craft of clause 1, wherein after the upwards aero lift generated by the at least one wing has increased above the threshold lift, transitioning the craft from hydrofoil-borne operation to wing-borne operation at least in part by controlling one or both of the front hydrofoil and the rear hydrofoil to switch from (a) generating the downward hydrofoil lift to (b) generating an upward hydrofoil lift that pushes the craft up and out of the water comprises:

while the front hydrofoil is generating downward hydrofoil lift, removing the rear hydrofoil from the water by retracting the rear hydrofoil strut and using one or more elements of the at least one wing to control the pitch of the craft; and after removing the rear hydrofoil from the water and while the one or more elements of the at least one wing are controlling the pitch of the craft, switching the front hydrofoil from generating downward lift to generating upward hydrofoil lift, thereby pushing the craft up and out of the water.

Group C

Clause 1. A craft comprising:

at least one hull;

at least one wing coupled to the at least one hull and configured to facilitate wing-borne flight of the craft;

at least one extendable hydrofoil coupled to the at least one hull and configured to facilitate hydrofoil-borne movement of the craft through water; and a control system that comprises data storage having instruction code stored thereon that when executed by one or more processors of the control system causes the control system to:

while the craft is in wing-borne flight and the at least one extendable hydrofoil is in a first position, receive an indication to land the craft on the water;

after receiving the indication to land the craft on water, cause the craft to descend towards the water; and after determining that the craft is within a threshold proximity of the water, cause the at least one extendable hydrofoil to extend from a first position to a second position that is further from the at least one hull.

Clause 2. The craft according to clause 1, wherein determining that the craft is within the threshold proximity of the water comprises:

determining that the craft is on water.

Clause 3. The craft according to clause 2, wherein determining that the craft is on water comprises:

determining that the craft is on the water based on an estimated center of mass of the craft.

Clause 4. The craft according to clause 1, wherein the at least one extendable hydrofoil comprises a rear hydrofoil that is proximate a tail of the craft and a main hydrofoil that is forward of the rear hydrofoil, wherein:

determining that the craft is within the threshold proximity of the water comprises receiving an indication that the rear hydrofoil is in contact with the water surface; and causing the at least one extendable hydrofoil to extend from a first position to a second position that is further from the at least one hull comprises causing the rear hydrofoil to at least partially extend into the water while maintaining the main hydrofoil in a retracted position.

Clause 5. The craft according to clause 4, wherein causing the rear hydrofoil to at least partially extend into the water occurs before the at least one hull substantially breaks the water surface.

Clause 6. The craft according to clause 5, wherein the control system is further configured to, after a water speed of the craft is below a threshold water speed and the at least one hull substantially breaks the water surface, cause the rear hydrofoil and the main hydrofoil to extend to a position that facilitates a hydrofoil-borne mode of operation.

Clause 7. The craft according to clause 6, wherein the control system is further configured to, after the at least one hull substantially breaks the water surface, cause the craft to transition to a hydrofoil-borne mode of operation.

Clause 8. The craft according to clause 1, wherein the second position to which the at least one extendible hydrofoil is extended is based at least in part on a water speed of the craft.

Clause 9. The craft according to clause 1, wherein the control system is further configured to:

determine a third position of the extendable hydrofoil based on at least a desired amount of drag; and cause the at least one extendable hydrofoil to extend to the determined third position.

Clause 10. The craft according to clause 1, wherein the control system is further configured to:

determine a third position of the extendable hydrofoil based on at least a desired amount of pitch; and cause the at least one extendable hydrofoil to extend to the determined third position.

Clause 11. The craft according to clause 1, wherein after receiving the indication to land the craft on the water and before it is determined that the craft is within the threshold proximity of the water, the control system is configured to:

control one or more control surfaces of the at least one wing to adjust a pitch of the craft to be less than about 2.5 degrees.

Clause 12. The craft according to clause 1, wherein the control system is configured to, after receiving the indication to land the craft on the water surface and the craft descends to a threshold distance above the water surface, and before it is determined that the craft is within the threshold proximity of the water at which the at least one extendable hydrofoil is extended, cause a reduction or removal of power to one or more motors of the craft.

Clause 13. The craft according to clause 12, wherein the control system is configured to, after it is determined that the craft is at the threshold distance above the water surface, cause power to the one or more motors to be maintained for a threshold amount of time before causing the reduction or removal of the power to the one or more motors.

Clause 14. The craft according to clause 13, wherein the control system is configured to, while the power to the one or more motors is maintained for the threshold amount of time, control one or more control surfaces of the at least one wing to maintain the craft at the threshold distance above the water surface.

Clause 15. The craft according to clause 12, wherein the control system is configured to, after the craft descends to the threshold distance above the water surface and before it is determined that the craft is within the threshold proximity of the water at which the at least one extendable hydrofoil is extended, cause rotation of the one or more motors to cease.

Clause 16. The craft according to clause 12, wherein the control system is configured to, after causing the reduction or removal of power to one or more motors of the craft, control one or more control surfaces of the at least one wing to limit a rate of descent of the craft towards the water.

Clause 17. The craft according to clause 1, wherein the threshold proximity of the water is less than 1 meter.

Clause 18. The craft according to clause 1, wherein after receiving the indication to land the craft on the water and before causing the craft to descend towards the water, the control system is configured to reduce airspeed of the craft to a target airspeed while substantially maintaining an altitude of the craft.

Clause 19. The craft according to clause 1, wherein the control system is configured to, after receiving the indication to land the craft on the water:

cause a deflection angle of a hydro rudder of the at least one extendable hydrofoil to be about zero degrees;

control a tail wing rudder of the craft to set a heading of the craft; and control one or more ailerons of the craft to set a roll angle of the craft to be about zero degrees.

Clause 20. The craft according to clause 19, wherein the control system is configured to, after receiving the indication to land the craft on the water:

control the tail wing rudder of the craft to perform a de-crabbing operation while maintaining the roll angle of the craft at about zero degrees.

Clause 21. A craft comprising:

at least one hull;

at least one wing coupled to the at least one hull and configured to facilitate wing-borne flight of the craft;

at least one extendable hydrofoil coupled to the at least one hull and configured to facilitate hydrofoil-borne movement of the craft through water; and a control system that comprises data storage having instruction code stored thereon that when executed by one or more processors of the control system causes the control system to:

while the craft is in wing-borne flight and the at least one extendable hydrofoil is in a first position, receive an indication to land the craft on the water;

after receiving the indication to land the craft on water:

cause the craft to descend towards the water;

before the craft has contacted the water, cause the at least one extendable hydrofoil to extend from a first position to a second position that is further from the at least one hull; and after the at least one extendable hydrofoil has been extended, cause the craft to initiate contact with the water.

Clause 22. The craft according to clause 21, wherein the instruction code is executable by the control system to cause the at least one extendable hydrofoil to extend from the second position to a third position further from the hull after the craft has contacted the water.

Clause 23. The craft according to clause 22, wherein the at least one extendable hydrofoil comprises a rear hydrofoil that is proximate a tail of the craft and a main hydrofoil that is forward of the rear hydrofoil, wherein:

causing the at least one extendable hydrofoil to extend from the first position to the second position comprises causing the rear hydrofoil to extend from a first position to a second position further from the hull while maintaining the main hydrofoil in a retracted position; and causing the at least one extendable hydrofoil to extend from the second position to the third position after the craft has contacted the water comprises causing the rear hydrofoil to extend from a second position to a third position further from the hull after the craft has contacted the water and the main hydrofoil to extend from the retracted position to an extended position after the craft has contacted the water.

Group D

Clause 1. A craft comprising:

at least one hull;

at least one wing coupled to the at least one hull and configured to facilitate wing-borne flight of the craft;

at least one hydrofoil coupled to the at least one hull and configured to facilitate hydrofoil-borne movement of the craft through water; and a control system that comprises data storage having instruction code stored thereon that, when executed by one or more processors of the control system, causes the control system to:

while the craft is wing-borne and descending towards the water, determine an altitude and an orientation of the craft with respect to a surface of the water;

after the craft is within a threshold distance of the surface of the water, and based on the determined altitude and an orientation of the craft, infer whether the at least one hydrofoil has made contact with the water; and after inferring that the at least one hydrofoil has made contact with the water, cause the craft to change one or more operational settings related to the positioning of the at least one hydrofoil.

Clause 2. The craft according to clause 1, wherein the instruction code executed by the one or more processors of the control system to cause the craft to change one or more operational settings comprises instruction code that, when executed by the one or more processors of the control system causes the control system to:

perform one or more procedures that facilitate landing the craft in the water.

Clause 3. The craft according to clause 1, wherein the instruction code executed by the one or more processors of the control system to determine that the at least one hydrofoil has made initial contact with the water comprises instruction code that, when executed by the one or more processors of the control system causes the control system to:

apply a rigid body translation and displacement matrix that specifies the altitude and orientation of the craft to a body model of the craft to determine positions of one or more leading and trailing tips of the at least one hydrofoil with respect to a center of gravity of the craft.

Clause 4. The craft according to clause 3, wherein the at least one hydrofoil is extendable and retractable, wherein the instruction code executed by the one or more processors of the control system to perform the rigid body translation and displacement calculation to determine one or more tip positions of the at least one hydrofoil with respect to a center of gravity of the craft comprises instruction code that when executed by the one or more processors of the control system causes the control system to:

apply the rigid body translation and displacement matrix that specifies the altitude and orientation of the craft to a body model of the craft that represent the at least one hydrofoil in a retracted configuration or in an extended configuration.

Clause 5. The craft according to clause 3, wherein the instruction code executed by the one or more processors of the control system to determine that the at least one hydrofoil has made initial contact with the water comprises instruction code that, when executed by the one or more processors of the control system causes the control system to:

determine that the at least one hydrofoil has made contact with the water when coordinates associated with any one of the leading and trailing tip positions is at or below a surface plane that represents a surface of the water.

Clause 6. The craft according to clause 3, wherein the instruction code executed by the one or more processors of the control system to determine that the at least one hydrofoil has made initial contact with the water comprises instruction code that, when executed by the one or more processors of the control system, causes the control system to:

determine the at least one hydrofoil has made contact with the water when coordinates associated with all of a plurality of tip positions is at or below a surface plane that represents a surface of the water.

Clause 7. The craft according to clause 3, wherein the instruction code executed by the one or more processors of the control system to determine that the at least one hydrofoil has made initial contact with the water comprises instruction code that, when executed by the one or more processors of the control system, causes the control system to:

generate a first model of at least one surface of the at least one hydrofoil according to a continuous mathematical representation;

generate a second model of curves of waves according to a second mathematical representation; and determine that the at least one hydrofoil has made contact with the water when the first model of the at least one surface of the at least one hydrofoil has intersected the second model of the curves of waves.

Clause 8. The craft according to clause 7, wherein the instruction code executed by the one or more processors of the control system to determine that the at least one hydrofoil has made initial contact with the water when the first model of the at least one surface of the at least one hydrofoil has intersected the model of the curves of waves comprises instruction code that, when executed by the one or more processors of the control system, causes the control system to:

apply the rigid body translation and displacement matrix to the first model of the at least one surface of the at least one hydrofoil with respect to a center of gravity of the craft.

Clause 9. The craft according to clause 3, wherein the instruction code executed by the one or more processors of the control system to determine that the at least one hydrofoil has made initial contact with the water comprises instruction code that, when executed by the one or more processors of the control system, causes the control system to:

apply environmental data from the craft's surroundings to a digital representation model of the craft;

receive from the digital representation model one or more indications of how one or more control surfaces of the craft will behave in response to the environmental data;

update representations of control surfaces specified in the body model based on the one or more indications.

Clause 10. The craft according to clause 1, wherein the instruction code executed by the one or more processors of the control system to perform one or more procedures that facilitate landing the craft comprises instruction code that, when executed by the one or more processors of the control system, causes the control system to:

transition the craft to a hydrofoil-borne mode of operation.

Clause 11. The craft according to clause 3, wherein the at least one hydrofoil is extendable and retractable, wherein the instruction code executed by the one or more processors of the control system to transition the craft to a hydrofoil-borne mode of operation comprises instruction code that, when executed by the one or more processors of the control system, causes the control system to:

extend the at least one hydrofoil from a retracted or partially retracted position to a fully extended position.

Clause 12. The craft according to clause 1, wherein the instruction code executed by the one or more processors of the control system to determine the altitude and the orientation of the craft comprises instruction code that, when executed by the one or more processors of the control system, causes the control system to:

determine the altitude and the orientation of the craft based on information communicated from one or more of: an inertial measurement unit (IMU), an altimeter, and a global navigation satellite system (GNSS).

Clause 13. The craft according to clause 1, wherein the instruction code executed by the one or more processors of the control system to determine that the at least one hydrofoil has made initial contact with the water comprises instruction code that, when executed by the one or more processors of the control system, causes the control system to:

determine that the at least one hydrofoil has made contact with the water based on information communicated from one or more of: pressure sensors, conductivity sensors, or laser diode-based sensors positioned on the at least one hydrofoil.

Clause 14. The craft according to clause 1, wherein the instruction code executed by the one or more processors of the control system to determine that the at least one hydrofoil has made initial contact with the water comprises instruction code that, when executed by the one or more processors of the control system, causes the control system to:

determine that the at least one hydrofoil has made contact with the water based on information communicated from one or more acoustic sensors that is indicative of noise that occurs when the at least one hydrofoil makes initial contact with the water.

Clause 15. A craft comprising:

at least one hull;

at least one wing coupled to the at least one hull and configured to facilitate wing-borne flight of the craft;

at least one hydrofoil coupled to the at least one hull and configured to facilitate hydrofoil-borne movement of the craft through water; and a control system that comprises data storage having instruction code stored thereon that, when executed by one or more processors of the control system, causes the control system to:

while the craft is hydrofoil-borne, determine an altitude and an orientation of the craft;

based on the determined altitude and orientation of the craft, determine a moment at which the at least one hydrofoil has left the water; and after determining the moment at which the at least one hydrofoil has left the water, cause the craft to change one or more operational settings related to the positioning of the at least one hydrofoil.

Clause 16. The craft according to clause 15, wherein the instruction code executed by the one or more processors of the control system to cause the craft to change one or more operational settings comprises instruction code that, when executed by the one or more processors of the control system, causes the control system to:

perform one or more procedures that facilitate wing-borne operations.

Clause 17. The craft according to clause 15, wherein the at least one hydrofoil is extendable and retractable, wherein the instruction code executed by the one or more processors of the control system to transition the craft to a hydrofoil-borne mode of operation comprises instruction code that, when executed by the one or more processors of the control system, causes the control system to:

retract the at least one hydrofoil from an extended or partially extended position to a fully retracted position.

IX. Conclusion

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A craft comprising:

at least one hull;

at least one wing configured to generate upwards aero lift as air flows past the at least one wing to facilitate wing-borne flight of the craft;

at least one retractable hydrofoil configured to generate upwards hydrofoil lift during a first mode of operation as water flows past the at least one retractable hydrofoil to facilitate hydrofoil-borne movement of the craft through the water; and a control system that comprises data storage having instruction code stored thereon that, when executed by one or more processors of the control system, causes the control system to:

during a takeoff operation when the craft is accelerating through the water and is supported by the at least one retractable hydrofoil, control the at least one retractable hydrofoil to generate downwards hydrofoil lift that maintains the at least one retractable hydrofoil submerged at a predetermined hydrofoil depth threshold below the water surface; and when the craft reaches a takeoff condition, cause the at least one retractable hydrofoil to release the craft from the water to facilitate wing-borne flight of the craft.

2. The craft according to claim 1, wherein the instruction code executed by the one or more processors of the control system to cause the craft to, when the craft reaches the takeoff condition, cause the at least one retractable hydrofoil to release the craft from the water to facilitate wing-borne flight of the craft comprises instruction code that, when executed by the one or more processors of the control system, causes the control system to:

after the craft reaches the takeoff condition, cause the at least one retractable hydrofoil to generate an upward hydrofoil lift that pushes the craft up and out of the water.

3. The craft according to claim 1, wherein the instruction code executed by the one or more processors of the control system to cause the craft to, when the craft reaches the takeoff condition, cause the at least one retractable hydrofoil to release the craft from the water to facilitate wing-borne flight of the craft comprises instruction code that, when executed by the one or more processors of the control system, causes the control system to:

when the aero lift generated by the at least one wing is sufficient to facilitate wing-borne flight of the craft, cause the at least one retractable hydrofoil to release the craft from the water to facilitate wing-borne flight of the craft.

4. The craft according to claim 1, wherein the instruction code executed by the one or more processors of the control system comprises instruction code that, when executed by the one or more processors of the control system, causes the control system to:

after determining that the craft is wing-borne, retract the at least one retractable hydrofoil.

5. The craft according to claim 1, wherein the instruction code executed by the one or more processors of the control system to, after determining that the craft is wing-borne, retract the at least one retractable hydrofoil, comprises instruction code that, when executed by the one or more processors of the control system causes the control system to:

apply a rigid body translation and displacement matrix that specifies an altitude and orientation of the craft to a body model of the craft to determine positions of one or more leading and trailing tips of the at least one retractable hydrofoil with respect to a center of gravity of the craft; and based on the determined positions of one or more leading and trailing tips of the at least one retractable hydrofoil, infer that the at least one retractable hydrofoil has left the water.

6. The craft according to claim 1, wherein the instruction code executed by the one or more processors of the control system to cause the craft to control the at least one retractable hydrofoil to generate downwards hydrofoil lift that maintains the at least one retractable hydrofoil submerged at a predetermined hydrofoil depth threshold below the water surface comprises instruction code that, when executed by the one or more processors of the control system, causes the control system to:

control the at least one retractable hydrofoil to increase the downwards hydrofoil lift generated by the at least one retractable hydrofoil in proportion to an increase in the upwards aero lift generated by the at least one wing.

7. The craft according to claim 1, wherein the instruction code comprises instruction code that, when executed by the one or more processors of the control system, causes the control system to:

determine a speed of the craft; and determine the upwards aero lift generated by the at least one wing based at least in part on the determined speed of the craft.

8. The craft according to claim 1, wherein the instruction code comprises instruction code that, when executed by the one or more processors of the control system, causes the control system to:

determine the upwards aero lift generated by the at least one wing based at least in part on an angle of attack of the at least one wing, a speed of the craft, and respective deflection angles of one or more control surfaces of the at least one wing.

9. The craft according to claim 1, wherein the at least one retractable hydrofoil comprises one or more flaperons, ailerons, or elevators, wherein the control system is configured to adjust respective deflection angles of the one or more flaperons, ailerons, or elevators to thereby control the downwards hydrofoil lift generated by the at least one retractable hydrofoil.

10. The craft according to claim 1, wherein an angle of incidence of the at least one retractable hydrofoil is adjustable, wherein the control system is further configured to adjust the angle of incidence of the at least one retractable hydrofoil to thereby control the downwards hydrofoil lift generated by the at least one retractable hydrofoil.

11. The craft according to claim 1, wherein the at least one retractable hydrofoil comprises a front hydrofoil proximate to a middle section of the craft and a rear hydrofoil proximate to a tail section of the craft, wherein the instruction code executed by the one or more processors of the control system to control the at least one retractable hydrofoil to generate downwards hydrofoil lift that maintains the at least one retractable hydrofoil submerged at a predetermined hydrofoil depth threshold below the water surface, and cause the at least one retractable hydrofoil to release the craft from the water to facilitate wing-borne flight of the craft comprises instruction code that, when executed by the one or more processors of the control system, causes the control system to:

control the front hydrofoil and the rear hydrofoil to generate downwards hydrofoil lift that maintains the front hydrofoil and the rear hydrofoil submerged at a predetermined hydrofoil depth threshold below the water surface, and cause the front hydrofoil and the rear hydrofoil to release the craft from the water to facilitate wing-borne flight of the craft.

12. The craft according to claim 11, wherein the instruction code executed by the one or more processors of the control system to control the front hydrofoil and the rear hydrofoil to generate downwards hydrofoil lift that maintains the front hydrofoil and the rear hydrofoil submerged at a predetermined depth below the water surface comprises instruction code that, when executed by the one or more processors of the control system causes the control system to:

control the front hydrofoil and the rear hydrofoil to cause the craft to pitch upwards at a particular angle.

13. The craft according to claim 11, wherein the instruction code executed by the one or more processors of the control system comprises instruction code that, when executed by the one or more processors of the control system, causes the control system to:

when the rear hydrofoil cannot be maintained at the predetermined hydrofoil depth threshold, cause both the front hydrofoil and the rear hydrofoil to release the craft from the water.

14. The craft according to claim 11, wherein the instruction code executed by the one or more processors of the control system to cause the front hydrofoil and the rear hydrofoil to release the craft from the water to facilitate wing-borne flight of the craft comprises instruction code that, when executed by the one or more processors of the control system, causes the control system to:

cause the front hydrofoil and the rear hydrofoil to simultaneously release the craft from the water to facilitate wing-borne flight of the craft such that the front hydrofoil and the rear hydrofoil exit the water at substantially a same time.

15. The craft according to claim 11, wherein the instruction code executed by the one or more processors of the control system to cause the front hydrofoil and the rear hydrofoil to release the craft from the water to facilitate wing-borne flight of the craft comprises instruction code that, when executed by the one or more processors of the control system, causes the control system to:

cause the rear hydrofoil to exit the water within less than about 5-7 seconds after the front hydrofoil has exited the water or (ii) causing the rear hydrofoil to exit the water within less than about 5-7 seconds before the front hydrofoil exits the water.

16. The craft according to claim 11, wherein while the craft is hydrofoil-borne, the at least one hull is lifted above the water.

* * * * *